(12) United States Patent
Takahashi et al.

(10) Patent No.: US 11,998,819 B2
(45) Date of Patent: Jun. 4, 2024

(54) VIRTUAL ENVIRONMENT CONSTRUCTION APPARATUS, VIDEO PRESENTATION APPARATUS, MODEL LEARNING APPARATUS, OPTIMAL DEPTH DECISION APPARATUS, METHODS FOR THE SAME, AND PROGRAM

(71) Applicant: NIPPON TELEGRAPH AND TELEPHONE CORPORATION, Chiyoda-ku (JP)

(72) Inventors: Kosuke Takahashi, Yokosuka (JP); Dan Mikami, Yokosuka (JP); Mariko Isogawa, Yokosuka (JP); Akira Kojima, Yokosuka (JP); Hideaki Kimata, Yokosuka (JP); Ayumi Matsumoto, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 169 days.

(21) Appl. No.: 17/845,010

(22) Filed: Jun. 21, 2022

(65) Prior Publication Data

US 2022/0314092 A1    Oct. 6, 2022

Related U.S. Application Data

(63) Continuation of application No. 17/078,418, filed on Oct. 23, 2020, now Pat. No. 11,395,947, which is a (Continued)

(30) Foreign Application Priority Data

Jan. 28, 2016 (JP) ................................. 2016-014487
Jan. 28, 2016 (JP) ................................. 2016-014488
(Continued)

(51) Int. Cl.
*G06T 19/00* (2011.01)
*A63B 69/00* (2006.01)
*G06F 17/18* (2006.01)

(52) U.S. Cl.
CPC .......... *A63B 69/0002* (2013.01); *G06F 17/18* (2013.01); *G06T 19/00* (2013.01);
(Continued)

(58) Field of Classification Search
CPC .... A63B 69/0002; G06T 19/00; G06T 19/006
See application file for complete search history.

(56) References Cited

U.S. PATENT DOCUMENTS 8,411,931 B2   4/2013 Zhou
9,298,356 B2   3/2016 Song
(Continued)

FOREIGN PATENT DOCUMENTS

JP    2012-40071 A    3/2012

OTHER PUBLICATIONS

International Search Report dated Apr. 18, 2017, in PCT/JP2017/002665, filed Jan. 26, 2017.
(Continued)

*Primary Examiner* — David L Lewis
*Assistant Examiner* — Robert E Mosser
(74) *Attorney, Agent, or Firm* — Oblon, McClelland, Maier & Neustadt, L.L.P.

(57) ABSTRACT

A virtual reality system is provided that includes a video presentation apparatus, the virtual reality system comprising: the video presentation apparatus which includes circuitry configured to: obtain as input a video sequence composed of a plurality of frames and mask information specifying a complementation target region in the video sequence; separate a frame into a foreground region and a background region based on binary images representing
(Continued)

differences between the plurality of frames included in the video sequence; determine either one of patch-search-based completion and paste synthesis as a complementation method for the complementation target region based on a number of pixels belonging to the foreground region and located within a given distance from a periphery of the complementation target region; and complement the complementation target region in accordance with the complementation method; and a virtual reality head mounted display which presents the complemented video sequence to the user.

9 Claims, 51 Drawing Sheets

Related U.S. Application Data continuation of application No. 16/070,382, filed as application No. PCT/JP2017/002665 on Jan. 26, 2017, now Pat. No. 10,850,177.

(30) Foreign Application Priority Data

| | | |
|---|---|---|
| May 30, 2016 | (JP) | 2016-107729 |
| May 30, 2016 | (JP) | 2016-107730 |
| Sep. 2, 2016 | (JP) | 2016-171420 |
| Oct. 31, 2016 | (JP) | 2016-212800 |

(52) U.S. Cl.
CPC .... *G06T 19/006* (2013.01); *A63B 2069/0006* (2013.01); *A63B 2069/0008* (2013.01)

(56) References Cited

U.S. PATENT DOCUMENTS

| | | | | |
|---|---|---|---|---|
| 10,515,482 | B2* | 12/2019 | Harviainen | G06F 3/147 |
| 2004/0105573 | A1* | 6/2004 | Neumann | G06T 17/00 |
| | | | | 382/103 |
| 2008/0001950 | A1 | 1/2008 | Lin | |
| 2015/0206335 | A1 | 7/2015 | Hugel | |

OTHER PUBLICATIONS

Takagi, M., "Study of New Baseball Batting Practice Method Using VR", The 19$^{th}$ annual meeting of The Virtual Reality Society of Japan, Sep. 17, 2014, pp. 210-213 (with English translation).

Inoue, T. et al., "Estimating System of the Rotational Velocity of the Baseball Using High-Speed Camera Movies", The 16$^{th}$ Symposium on Sensing via Image Information 2010, Jun. 9, 2010, 7 pages (with English translation).

Takagi, M. et al., "Development of Training Support System Realizing Effective Practice Swing", The 20$^{th}$ annual meeting of The Virtual Reality Society of Japan, Sep. 9, 2015, pp. 465-468 (with English translation).

Ochi, D. et al., "Live Streaming System for Omnidirectional Video", Virtual Reality (VR), 2105 IEEE, Mar. 2015, pp. 349-350.

STRIVR Labs, Inc., "STRIVR | Immersive Training Solutions", http://www.strivrlabs.com/home/about-us, retrieved on Jul. 20, 2016, 7 pages.

Matsumoto, A. et al., "Multi View Layered GPDM for View Invariant Human 3D Pose Estimation from Single RGB Camera Input", The transactions of the Institute of Electronics, Information and Communication Engineers, vol. J97-D, No. 7, Jul. 2014, pp. 1189-1201 (with partial English translation).

Vicon Motion Systems Ltd., "Motion Capture Systems | VICON", https://www.vicon.com, retrieved on Oct. 20, 2016, 1 page.

Hayashi, K. et al., "Synthesizing free-viewpoint images from mutiple view videos in soccer stadium", IPSJ SIG Technical Report, Information Processing Society of Japan, May 18, 2006, pp. 173-180 (with English abstract).

Takahashi, K. et al., "A Study on Virtual Omnidirectional Video Synthesis from Multiple Cameras", IEICE technical report, vol. 115, No. 76, Jun. 2015, pp. 43-48 (with English abstract).

Isogawa, M. et al. "Reduction and Synthesis of Feature Values for High Quality of Experience Image Completion", IEICE technical report, vol. 114, No. 239, Oct. 2014, pp. 37-42 (with English abstract).

Bai, X. et al., "Video SnapCut: Robust Video Object Cutout Using Localized Classifiers", ACM Transactions on Graphics (TOG), vol. 28, Issue 3, Aug. 2009, 11 pages.

Criminisi, A. et al., "Region Filling and Object Removal by Exemplar-Based Image Inpainting", IEEE Transactions On Image Processing, vol. 13, No. 9, Sep. 2004, pp. 1-13.

He, K. et al., "Image Completion Approaches Using the Statistics of Similar Patches", IEEE Transactions On Pattern Analysis And Machine Intelligence, vol. 36, No. 12, Dec. 2014, pp. 2423-2435.

Newson, A. et al., "Video Inpainting of Complex Scenes", SIAM Journal of Imaging Science, 2014, pp. 1-27.

Chen, S. et al., "Image Segmentation by MAP-ML Estimations", IEEE Transactions On Image Processing, vol. 19, No. 9, Sep. 2010, pp. 2254-2264.

Ida, H. et al., "Recognition of Tennis Serve Performed by a Digital Player: Comparison among Polygon, Shadow, and Stick-Figure Models", PLOS One, Mar. 2012, pp. 1-7.

Office Action dated Jul. 23, 2019 in corresponding Japanese Patent Application No. 2017-563805 (with English Translation), 7 pages.

* cited by examiner

| CONSTITUENT MATERIAL ID | VIRTUAL ENVIRONMENT MATERIAL ID | TIME | POSITION | POSTURE |
|---|---|---|---|---|
| Oi | Ei | 0 | Ti(0) | Ri(0) |
| | | 1 | Ti(1) | Ri(1) |
| | | ... | ... | ... |
| | | ti | Ti(ti) | Ri(ti) |
| Oj | Ej | 0 | Tj(0) | Rj(0) |
| | | 1 | Tj(1) | Rj(1) |
| | | ... | ... | ... |
| | | tj | Tj(tj) | Rj(tj) |
| ... | ... | ... | ... | ... |
| Ok | Ek | - | Tk | Rk |
| ... | ... | ... | ... | ... |

FIG. 2

| TIME | CONSTITUENT MATERIAL ID | EXAMPLE |
|---|---|---|
| 1 | O1 | INCORPORATE STADIUM |
| 2 | - | |
| ... | ... | ... |
| t1 | O2 | INCORPORATE PITCHER |
| ... | ... | ... |
| t2 | O3 | INCORPORATE BALL |

FIG. 3

| PRACTICE GOAL | TIME | CONSTITUENT MATERIAL ID |
|---|---|---|
| WANT TO IMPROVE ○○ ABILITY | 1 | - |
| | 2 | - |
| | ... | ... |
| | t1 | O1 |
| | ... | ... |
| | t2 | O2, O3 |
| WANT TO IMPROVE △△ ABILITY | 1 | O4 |
| | 2 | O5 |
| | ... | |
| | tj | O6 |
| ... | ... | ... |

FIG. 6

| PRACTICE GOAL | TIME | CONSTITUENT MATERIAL ID |
|---|---|---|
| WANT TO IMPROVE ABILITY FOR VARIATION IN SPEED | 1 | O1 (140 km/h STRAIGHT BALL) |
| | 2 | - |
| | ... | ... |
| | t1 | O2 (110 km/h CURVEBALL) |
| | ... | ... |
| | t2 | O3 (150 km/h STRAIGHT BALL) |
| WANT TO IMPROVE BATTING EYE | 1 | O4 (COURSE 2-A STRAIGHT BALL) |
| | 2 | - |
| | ... | ... |
| | tj | O5 (COURSE 2-B STRAIGHT BALL) |
| ... | ... | ... |

FIG. 7

| CONSTITUENT MATERIAL ID | BALL SPEED (km/h) | COURSE | PITCH TYPE |
|---|---|---|---|
| O1 | 140 | 1-A | STRAIGHT BALL |
| O2 | 120 | 3-B | CURVEBALL |
| ... | ... | ... | ... |
| Oi | 135 | 2-C | FORKBALL |
| ... | ... | ... | ... |

| ACTION ID | OPPONENT PLAYER ID | TIME | ACTION |
|---|---|---|---|
| 1 | 1 | 1 | FRAME IMAGE 1 |
| | | 2 | FRAME IMAGE 2 |
| | | ⋮ | ⋮ |
| | | T | FRAME IMAGE T |
| 2 | 1 | 1 | HAND $(x_{11}, y_{11}, z_{11})$, ARM $(x_{21}, y_{21}, z_{21})$ |
| | | 2 | HAND $(x_{12}, y_{12}, z_{12})$, ARM $(x_{22}, y_{22}, z_{22})$ |
| | | ⋮ | ⋮ |
| | | T | HAND $(x_{1T}, y_{1T}, z_{1T})$, ARM $(x_{2T}, y_{2T}, z_{2T})$ |
| ⋮ | ⋮ | ⋮ | ⋮ |
| n | 1 | ⋮ | ⋮ |
| 1 | 2 | ⋮ | ⋮ |
| 2 | 2 | ⋮ | ⋮ |
| ⋮ | ⋮ | ⋮ | ⋮ |

FIG. 27

VIRTUAL MATERIAL POSITION/POSTURE INFORMATION TABLE

| MATERIAL ID | VIRTUAL MATERIAL ID | TIME | POSITION | POSTURE | SYNC MATERIAL ID (1) | SYNC START TIME (1) | SYNC MATERIAL ID (2) | SYNC START TIME (2) |
|---|---|---|---|---|---|---|---|---|
| Oi | Ei | 1 | Ti(1) | Ri(1) | | | | |
| | | 2 | Ti(2) | Ri(2) | - | - | - | - |
| | | ⋮ | ⋮ | ⋮ | | | | |
| | | ti | Ti(ti) | Ri(ti) | | | | |
| Oj | Ej | 1 | Tj(1) | Rj(1) | | | | |
| | | 2 | Tj(2) | Rj(2) | Oi | Tji | - | - |
| | | ⋮ | ⋮ | ⋮ | | | | |
| | | tj | Tj(tj) | Rj(tj) | | | | |
| ⋮ | ⋮ | ⋮ | ⋮ | ⋮ | ⋮ | ⋮ | ⋮ | ⋮ |
| Ok | Ek | - | Tk | Rk | Oa | Tka | Ob | Tkb |
| ⋮ | ⋮ | ⋮ | ⋮ | ⋮ | ⋮ | ⋮ | ⋮ | ⋮ |

FIG. 33

VIDEO INFORMATION TABLE

| VIDEO ID | RELEVANT DYNAMIC MATERIAL ID (1) | TIME (1) | POSITION (1) | POSTURE (1) | RELEVANT DYNAMIC MATERIAL ID (2) | TIME (2) | POSITION (2) | POSTURE (2) | ... |
|---|---|---|---|---|---|---|---|---|---|
| Vi | Di1 | 1 | Ti1(1) | Ri1(1) | Di2 | 1 | Ti2(1) | Ri2(1) | ... |
|  |  | 2 | Ti1(2) | Ri1(2) |  | 2 | Ti2(2) | Ri2(2) | ... |
|  |  | ... | ... | ... |  | ... | ... | ... | ... |
|  |  | ti | Ti1(ti) | Ri1(ti) |  | ti | Ti2(ti) | Ri2(ti) | ... |
| ... |  |  |  |  |  |  |  |  | ... |

VIRTUAL MATERIAL POSITION/POSTURE INFORMATION TABLE

| MATERIAL ID | VIRTUAL MATERIAL ID | TIME | POSITION | POSTURE | SYNC MATERIAL ID (1) | SYNC START TIME (1) | SYNC MATERIAL ID (2) | SYNC START TIME (2) |
|---|---|---|---|---|---|---|---|---|
| Oi | Ei | 1 | Ti(1) | Ri(1) | | | | |
|  |  | 2 | Ti(2) | Ri(2) | | | | |
|  |  | ⋮ | ⋮ | ⋮ | | | | |
|  |  | ti | Ti(ti) | Ri(ti) | | | | |
| Oj | Ej | 1 | Tj(1) | Rj(1) | Oi | Tji | | |
|  |  | 2 | Tj(2) | Rj(2) | - | - | | |
|  |  | ⋮ | ⋮ | ⋮ | | | | |
|  |  | tj | Tj(tj) | Rj(tj) | - | - | | |
| Ok | Ek | - | Tk | Rk | Oa | Tka | Ob | Tkb |
| ⋮ | ⋮ | ⋮ | ⋮ | ⋮ | ⋮ | ⋮ | ⋮ | ⋮ |

FIG. 35

(1) WHEN ORIGINAL IMAGE/VIDEO AND MASK ARE GIVEN SEPARATELY
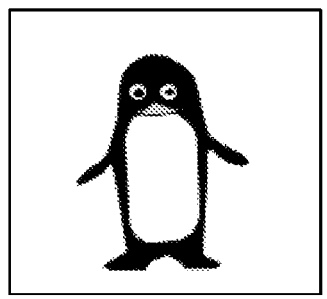
ORIGINAL IMAGE/VIDEO
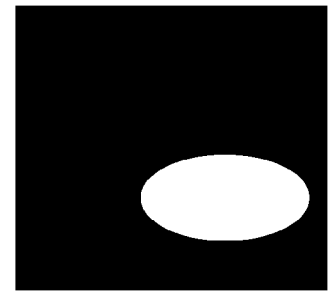
MASK
(2) WHEN MASK IS GIVEN AS OVERLAY ON ORIGINAL IMAGE/VIDEO
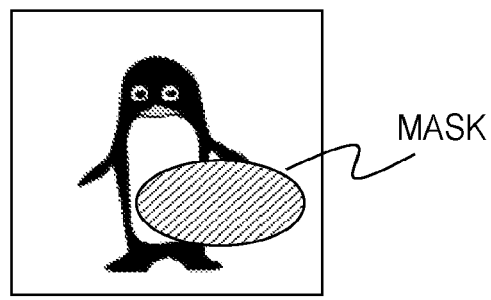
ORIGINAL IMAGE/VIDEO
FIG. 45

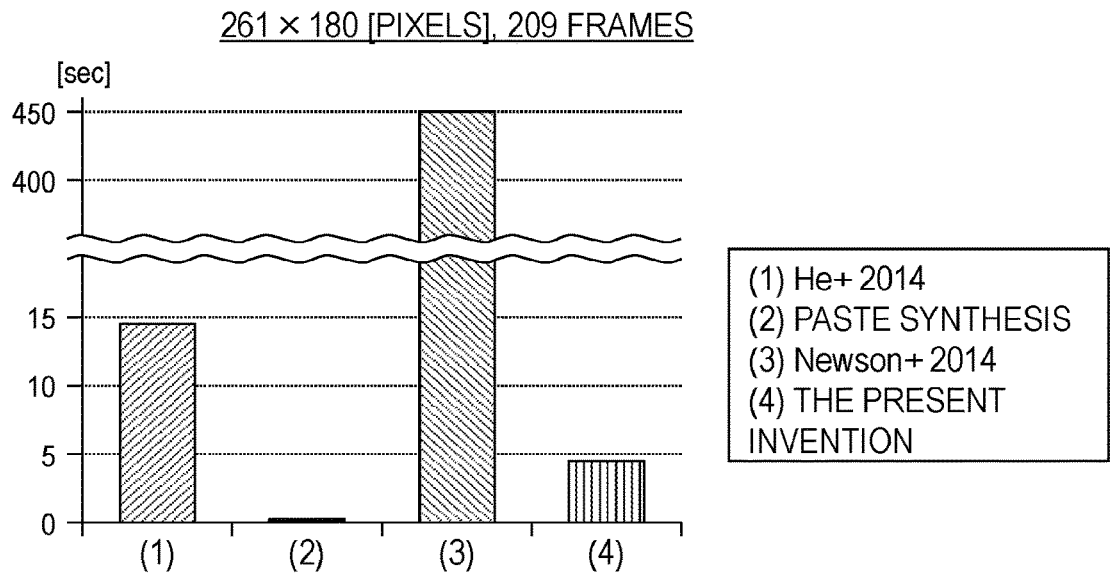
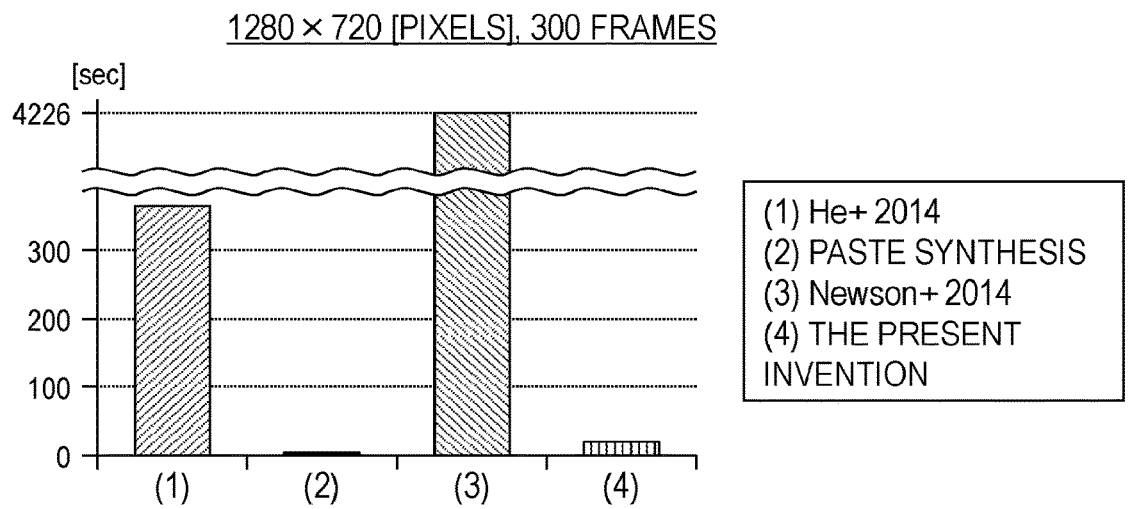
FIG. 48

| CAMERA ID | SYNTHESIS INFORMATION | | | | |
|---|---|---|---|---|---|
| | DEPTH | EXTRACTION REGION INFORMATION | | | CONVERSION INFORMATION |
| | | UPPER LEFT COORDINATES | WIDTH | HEIGHT | |
| $C_1$ | DEPTH 1 | (A, B) | C | D | $A1_{j1}$ |
| | ... | ... | ... | ... | ... |
| | DEPTH N | (A, B) | C | D | $A1_{jN}$ |
| $C_2$ | DEPTH 1 | (E, F) | C | D | $A2_{j1}$ |
| | ... | ... | ... | ... | ... |
| | DEPTH N | (E, F) | C | D | $A2_{jN}$ |

FIG. 50

| TIME | OPTIMAL DEPTH | |
|---|---|---|
| | $C_1$ | $C_2$ |
| t | d1(t) | d2(t) |
| t+1 | d1(t+1) | d2(t+1) |
| ... | ... | ... |

FIG. 51

VIRTUAL ENVIRONMENT CONSTRUCTION APPARATUS, VIDEO PRESENTATION APPARATUS, MODEL LEARNING APPARATUS, OPTIMAL DEPTH DECISION APPARATUS, METHODS FOR THE SAME, AND PROGRAM

CROSS-REFERENCE TO RELATED APPLICATIONS

This application is a continuation of and claims the benefit of priority under 35 U.S.C. § 120 from U.S. application Ser. No. 17/078,418 filed Oct. 23, 2020, which is a continuation of U.S. application Ser. No. 16/070,382 filed Jul. 16, 2018 (now U.S. Pat. No. 10,850,177 issued Dec. 1, 2020), the entire contents of which are incorporated herein by reference. U.S. application Ser. No. 16/070,382 is a National Stage of PCT/JP2017/002665 filed Jan. 26, 2017, which claims the benefit of priority under 35 U.S.C. § 119 from Japanese Application No. 2016-014487 filed Jan. 28, 2016, Japanese Application No. 2016-014488 filed Jan. 28, 2016, Japanese Application No. 2016-107729 filed May 30, 2016, Japanese Application No. 2016-107730 filed May 30, 2016, Japanese Application No. 2016-171420 filed Sep. 2, 2016 and Japanese Application No. 2016-212800 filed Oct. 31, 2016.

TECHNICAL FIELD

The present invention relates to a virtual environment construction technique for synthesizing a video taken from a virtual and movable viewpoint based on a video capturing a real environment.

BACKGROUND ART

In a sport match, one sometimes cannot fully exert his or her ability when encountering a first situation he or she has not experienced previously. In baseball, for example, a situation where a player has trouble in handling a pitcher he or she meets for the first time can be described by the expression "weak to a first-time opponent". To address such a situation, it would be effective for the player to experience some pitches of the pitcher from the player's perspective beforehand in the same environment as an actual match.

It is however difficult in terms of feasibility to actually experience the next opponent's pitches beforehand. A common alternative to this is viewing a video of past pitches of the opponent captured from a stand or the like; however, such a video is different from what the player sees when actually standing in a batter's box in terms of viewpoint and/or field of view, thus is not adequate as preliminary experience of a match situation.

Non-patent Literature 1 describes a method for realizing preliminary experience from a player's perspective. In the method, a camera capable of capturing a 360° panoramic image (hereinafter, referred to as an omnidirectional camera) is installed at the position of the player's perspective, and the player views a video from the player's perspective captured by the omnidirectional camera on a head mounted display.

PRIOR ART LITERATURE

Non-Patent Literature

Non-patent Literature 1: Ochi, D., Kunita, Y., Kameda, A., Kojima, A., Iwaki, S., "Live streaming system for omnidirectional video", Virtual Reality (VR), 2015 IEEE, pp. 349-350, March 2015.

SUMMARY OF THE INVENTION

Problems to be Solved by the Invention

However, the method described in Non-patent Literature 1 is difficult to implement in terms of feasibility because it requires installation of a camera in a batter's box during a match. A further problem is that the player can only preliminarily experience a viewpoint at which the camera is installed when viewing a video thus captured by the camera.

In view of these situations, an object of the present invention is to provide a technique for virtually constructing a match environment to enable one to experience a match from a player's perspective beforehand.

Means to Solve the Problems

To accomplish the object, in a first aspect of the invention a virtual reality system is provided that includes a video presentation apparatus, the virtual reality system comprising: the video presentation apparatus which includes circuitry configured to: obtain as input a video sequence composed of a plurality of frames and mask information specifying a complementation target region in the video sequence; separate a frame into a foreground region and a background region based on binary images representing differences between the plurality of frames included in the video sequence; determine either one of patch-search-based completion and paste synthesis as a complementation method for the complementation target region based on a number of pixels belonging to the foreground region and located within a given distance from a periphery of the complementation target region; and complement the complementation target region in accordance with the complementation method; and a virtual reality head mounted display which presents the complemented video sequence to the user.

In a second aspect of the invention, a virtual reality system is provided that includes a video presentation apparatus, the virtual reality system comprising: the video presentation apparatus which includes circuitry configured to: obtain as input a video sequence composed of a plurality of frames and mask information specifying a complementation target region in the video sequence; determine either one of patch-search-based completion and paste synthesis as a complementation method for the complementation target region based on a difference between an average color of pixels located within the complementation target region and an average color of pixels located within a given distance from a periphery of the complementation target region; and complement the complementation target region in accordance with the complementation method; and a virtual reality head mounted display which presents the complemented video sequence to the user.

In a third aspect of the invention, a virtual reality system is provided that includes a video presentation apparatus, the virtual reality system comprising: the video presentation apparatus which includes circuitry configured to: obtain as input a video sequence composed of a plurality of frames and mask information specifying a complementation target region in the video sequence; segment each frame in the video sequence to separate the frame into a foreground segment having a predefined feature and a background segment; determine either one of patch-search-based completion and paste synthesis as a complementation method for the complementation target region based on a number of pixels belonging to the foreground segment and located within a given distance from a periphery of the complementation target region; and complement the complementation target region in accordance with the complementation method; and a virtual reality head mounted display which presents the complemented video sequence to the user.

Effects of the Invention

The virtual environment construction technique of the present invention enables preliminary experience of a match from a player's perspective by virtually constructing a match environment.

BRIEF DESCRIPTION OF THE DRAWINGS

FIG. 2 is a diagram illustrating a data structure of a position/posture information table.

FIG. 3 is a diagram illustrating a data structure of a constituent material incorporation list.

FIG. 6 is a diagram illustrating a data structure of a presentation sequence table.

FIG. 7 is a diagram showing a specific example of the presentation sequence table.

FIG. 27 is a diagram illustrating a virtual material position/posture information table.

FIG. 33 is a diagram illustrating a video information table.

FIG. 35 is a diagram illustrating a virtual material position/posture information table.

FIG. 45 is a diagram showing an example of an original image or video and mask information.

FIG. 48 is a diagram showing experimental results.

FIG. 50 is a diagram showing a specific example of a synthesis information table.

FIG. 51 is a diagram showing a specific example of an optimal depth information table.

DETAILED DESCRIPTION OF THE EMBODIMENTS

Figure 1:
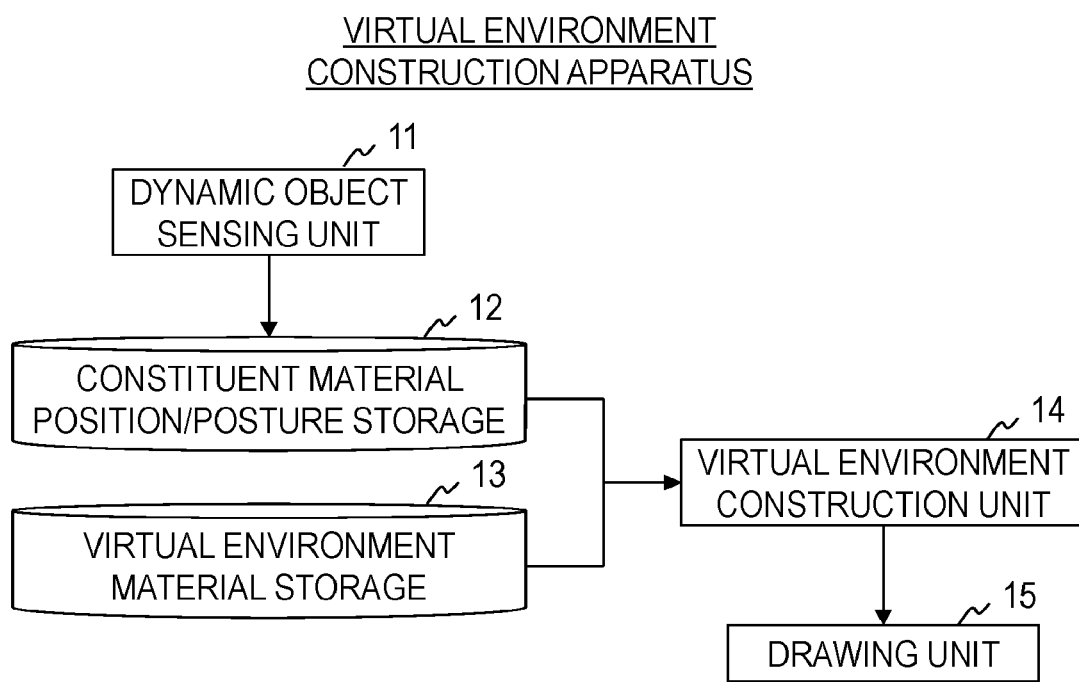
FIG. 1 is a diagram illustrating a functional configuration of a virtual environment construction apparatus in a first embodiment.

Embodiments of the present invention will now be described in detail. In the drawings, components having the same functions are denoted with the same numerals and repeated descriptions are omitted.

First Embodiment

First, a virtual environment construction apparatus according to a first embodiment will be generally described. To start with, a dynamic object sensing unit determines the position and posture of a dynamic object which is to be preliminarily experienced (for example, the path of a baseball pitch or a tennis serve) at each time and stores the position and posture information. It is assumed that position and posture information relating to a static object, which does not temporally change, (for example, a stadium or a ground) is prestored. Hereinafter, an object for constituting a virtual environment, such as a ball and a stadium, will be referred to as constituent material. Also, computer graphics (CG) data for reproducing a constituent material in a virtual environment will be referred to as virtual environment material, which is also assumed to be prestored. Among constituent materials, a material whose position transitions with time and that makes movements is referred to as dynamic material, a constituent material whose position does not transition with time and that does not make movements is referred to as static material, and a constituent material whose position is considered to not transition but that makes movements while staying at the position is referred to as special dynamic material. In the case of baseball, for example, a dynamic material will be a baseball, a static material will be a stadium, and a special dynamic material will be a pitcher. Dynamic objects are formed from dynamic materials and special dynamic materials. A static object is a static material. Virtual environment materials relating to a static object is not limited to CG data, but may be moving image or still image data clipped from an actually captured video. A virtual environment construction unit constructs a virtual environment by arranging virtual environment materials based on the position and posture information of the individual constituent materials. Finally, a drawing unit outputs the virtual environment as a video such as an omnidirectional video.

The virtual environment construction apparatus in the first embodiment includes a dynamic object sensing unit 11, a constituent material position/posture storage 12, a virtual environment material storage 13, a virtual environment construction unit 14, and a drawing unit 15, as shown in FIG. 1. By the virtual environment construction apparatus performing the processes at steps described below, a virtual environment construction method in the first embodiment is implemented.

The virtual environment construction apparatus is a special device configured by loading of a special program into a known or dedicated computer having a central processing unit (CPU), main memory (random access memory or RAM), and the like, for example. The virtual environment construction apparatus executes various kinds of processing under control of the central processing unit, for example. Data input to the virtual environment construction apparatus and/or data resulting from various kinds of processing are stored in the main memory, for example, and data stored in the main memory is read as required to be utilized for other processing. Also, at least part of the processing components of the virtual environment construction apparatus may be formed of hardware such as an integrated circuit. The storages provided in the virtual environment construction apparatus may be formed of main memory such as random access memory (RAM), an auxiliary storage device formed of a hard disk, optical disk, or a semiconductor memory device such as a flash memory, or middleware such as a relational database or a key value store, for example. The storages provided in the virtual environment construction apparatus may be each logically partitioned or they may be stored in a single physical storage device.

The dynamic object sensing unit 11 measures the position and posture of a dynamic object in a real environment to generate position and posture information composed of one movement action. The generated position and posture information of the dynamic object is stored in the constituent material position/posture storage 12. Specifically, a sensor (not shown) connected with the virtual environment construction apparatus measures the position and posture of a dynamic object during one movement action, and uses the resulting values as input to estimate three-dimensional position and posture information of the dynamic object. A dynamic object refers to an object whose three-dimensional position changes with time in a virtual environment, for example, a baseball or an opponent player such as a pitcher in the case of baseball, or a tennis ball or an opponent player such as a server in the case of tennis. One movement action is an action corresponding to a single pitch by a pitcher in the case of a baseball or an action corresponding to a single serve in the case of a tennis ball, for example.

Multiple cameras may be utilized as sensors for computing the three-dimensional position and posture of a dynamic object. A specific example of an approach to compute three-dimensional position information of a ball utilizing multiple cameras is one that employs triangulation. Specifically, for videos captured by cameras which have undergone camera calibration in advance, the position of a ball on the images is determined. Here, the position of the ball on an image may be manually given, or the ball may be detected via a detection approach such as template matching, and the center position thereof may be set as the position of the ball. By applying triangulation using the positions detected in the images and camera parameters determined in camera calibration, the three-dimensional position of the ball can be determined. For the posture, to how much extent the ball is rotated relative to a reference posture can be determined, for example, from a stitching pattern on the ball captured in an image. Other examples of sensors for determining the position and posture of a dynamic object include a Doppler radar. As this sensor is a well-known technique, detailed description of the sensor is omitted. Any other sensors and approaches that are capable of obtaining three-dimensional position and posture information of a ball may be used.

The constituent material position/posture storage 12 stores position and posture information relating to constituent materials. Position and posture information relating to a dynamic object is generated and stored by the dynamic object sensing unit 11. Position and posture information relating to a static object is prepared and stored in advance. Specifically, a constituent material position/posture information table composed of records each representing three-dimensional position and posture information of each constituent material at each time is stored.

The constituent material position/posture information table includes a "constituent material ID" uniquely identifying a constituent material, a "virtual environment material ID" uniquely identifying a virtual environment material, and "position" and "posture" values of an object at each "time" as shown in FIG. 2. Position is represented as a three-dimensional translation vector, and posture is represented as a three-dimensional vector that represents a rotation angle relative to each axis. For example, when assuming baseball pitching and imagining that constituent material Oi represents a straight ball, virtual environment material Ei corresponding to the constituent material Oi would be CG data for a baseball stored in the virtual environment material storage 13. Then, the position and posture corresponding to each time represents at which position and in which posture the ball is present at that time. More specifically, positions Ti(0), Ti(1), . . . , Ti(ti) represent the ball path, and postures Ri(0), Ri(1), . . . Ri(ti) represent how the ball is rotating. In FIG. 2, a constituent material with "–" stored in the time means that it is a static object, which does not change in position or posture with time, such as a stadium. It is assumed that position and posture information of such a static object is prestored. Also, a time defined for a constituent material represents the time elapsed since when the constituent material was incorporated into a virtual environment by the virtual environment construction unit 14, which is discussed later. Specifically, if the constituent material Oi is incorporated into the virtual environment at the point of time ta, the position and posture of the constituent material Oi at time (ta+0) are Ti(0) and Ri(0) respectively, and the position and posture of the constituent material Oi at time (ta+1) are Ti(1) and Ri(1) respectively.

The virtual environment material storage 13 stores a virtual environment material corresponding to each constituent material. A virtual environment material is a material for constructing a virtual environment, such as CG data or live-action data, for example. The virtual environment material storage 13 stores each virtual environment material in association with a virtual environment material ID. Examples of virtual environment material are CG data for a stadium or a baseball in the case of baseball, or CG data for a tennis court or a tennis ball in the case of tennis. It is assumed that they are prepared and stored beforehand.

The virtual environment construction unit 14 reads position and posture information of each constituent material from the constituent material position/posture storage 12, reads data for the virtual environment material corresponding to the constituent material from the virtual environment material storage 13, and synthesizes a virtual environment material of a dynamic object with a virtual environment material of a static object, thereby constructing virtual environment data. The constructed virtual environment data is sent to the drawing unit 15. The virtual environment data refers to a virtual space in which data for one or more virtual environment materials have been arranged in a certain virtual space. As a specific example, a procedure for creating virtual environment data in the case of baseball will be described. First, a constituent material incorporation list for constructing a virtual environment is read. The constituent material incorporation list includes a "constituent material ID" uniquely identifying a constituent material and "time" indicating when the constituent material is incorporated into a virtual environment, as shown in FIG. 3. It is assumed that the constituent material incorporation list is manually prepared in advance. For example, in the case of creating virtual environment data for baseball, constituent material IDs and times relating to a stadium, a pitcher, a ball, and the like are described in the constituent material incorporation list. Next, if there is a constituent material to be drawn at each time, a virtual environment material corresponding to that constituent material is incorporated into the virtual environment. Here, the position and posture of the constituent material are read from the constituent material position/posture storage 12, and the constituent material is arranged in the virtual space based on the position and posture. After all the constituent materials described in the constituent material incorporation list have been incorporated into the virtual environment, the processing is terminated.

The drawing unit 15 outputs the constructed virtual environment data in a format viewable by the user. The video being output may be a video that sees one direction from a certain viewpoint in a virtual environment or a video that allows viewing in all directions like an omnidirectional video. For instance, in the case of outputting a video that sees one direction from a certain viewpoint, a perspective projection camera C may be virtually set at a certain position and a CG model present in the virtual environment space may be projected onto the image plane of the camera C. Specifically, when T is a position as an extrinsic parameter of the camera C, R is the posture, and K is an intrinsic parameter, a certain point p within the space in which the virtual environment data exists will be projected as point q on the image plane of the camera C as follows.

$$q = K(Rp + T)$$

Here, the intrinsic parameter K is a 3×3 matrix composed of the focal distance and/or the image center of the camera C.

In the case of outputting an omnidirectional video that allows viewing in all the directions from a certain viewpoint, an omnidirectional camera O may be virtually set at the certain viewpoint and a CG model present in the virtual environment space may be projected onto the image plane of the camera O. Specifically, when T is a position as an extrinsic parameter of the camera O, R is the posture, W is the width of the image plane of projection, and H is the height thereof, a certain point p within the space in which the virtual environment data exists will be projected as point $q=(q_x, q_y)^T$ onto the image plane of the camera O as follows.

$$p' = Rp + T = (p'_x p'_y p'_z)^T$$

$$q_x = \left(\frac{\theta W}{2\pi}\right) + \frac{W}{2}$$

$$q_y = \frac{\varphi H}{\pi}$$

where $$\theta = \arctan\left(\frac{p'_z}{p'_x}\right),$$

$$\varphi = \arccos\left(\frac{p'_y}{|p'|}\right)$$

While the present example employs equidistant cylindrical projection as a projection for representing an omnidirectional video as a two-dimensional image, other kinds of projection such as Mercator's projection may be employed.

Second Embodiment

In the first embodiment, the drawing unit outputs only a video from a predefined viewpoint in a virtual environment. Thus, experience such as freely moving in a virtual environment is difficult to implement. Although output of videos at all points would possible, it is not realistic in terms of throughput. The second embodiment adds a user sensing unit for sensing the position and posture of a user to the configuration of the first embodiment and senses a position and a direction in which the user wants to view, thereby allowing the user to view a video while freely moving in a virtual environment.

Figure 4:
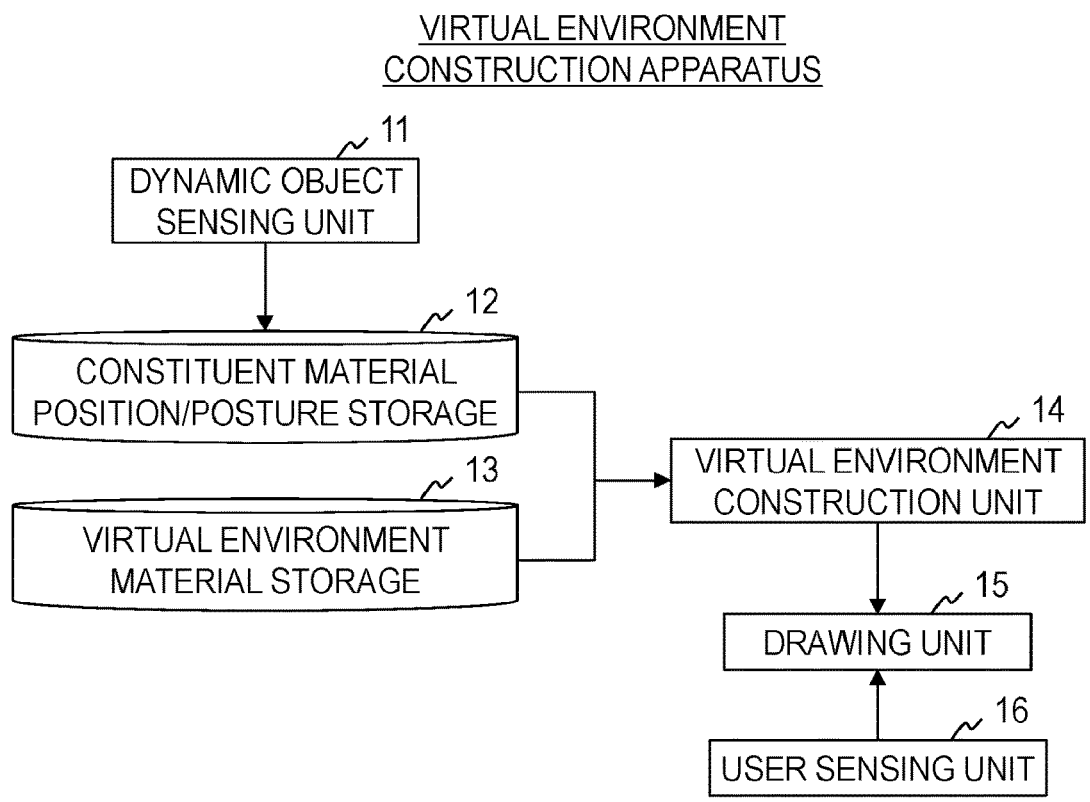
FIG. 4 is a diagram illustrating a functional configuration of a virtual environment construction apparatus in a second embodiment.

The virtual environment construction apparatus in the second embodiment includes the dynamic object sensing unit 11, the constituent material position/posture storage 12, the virtual environment material storage 13, the virtual environment construction unit 14, and the drawing unit 15 similarly to the first embodiment, and further includes a user sensing unit 16, as shown in FIG. 4. By the virtual environment construction apparatus performing the processes at steps described below, a virtual environment construction method in the second embodiment is implemented.

In the following, a processing procedure of the virtual environment construction method in the second embodiment will be described mainly for differences from the first embodiment.

The user sensing unit 16 measures the position and posture of the head of the user to generate user position and posture information. The generated user position and posture information is sent to the drawing unit 15. Specifically, a sensor (not shown) provided in the virtual environment construction apparatus measures the position and posture of the user's head, and uses the resulting values as input to estimate three-dimensional position and posture information of the user's head.

The sensor for computing the three-dimensional position and posture of the user's head may be any kind of sensor. A specific example of such a sensor is a motion sensor represented by those from OptiTrack. Alternatively, a head mounted display (HMD) represented by those from Oculus and an accompanying infrared (IR) camera may be employed. As they are implemented using well-known techniques, detailed descriptions of these are omitted.

The drawing unit 15 outputs virtual environment data in a format viewable by the user based on the user position and posture information received from the user sensing unit 16. Here, it may output a video in the direction of the user's line of sight in a virtual environment or may output an omnidirectional video.

Third Embodiment

In general, contents of training vary depending on what kind of ability one wants to improve. For example, when one wants to physically learn the feeling of tennis serves, intensive practice of serving would be effective. When one aims at increasing the strength of a serve, correction of his or her usage of the body or muscle training would be effective. The third embodiment enables change to a virtual environment that will be constructed depending on the user's practice goal by adding a presentation sequence acquisition unit to the first embodiment.

Figure 5:
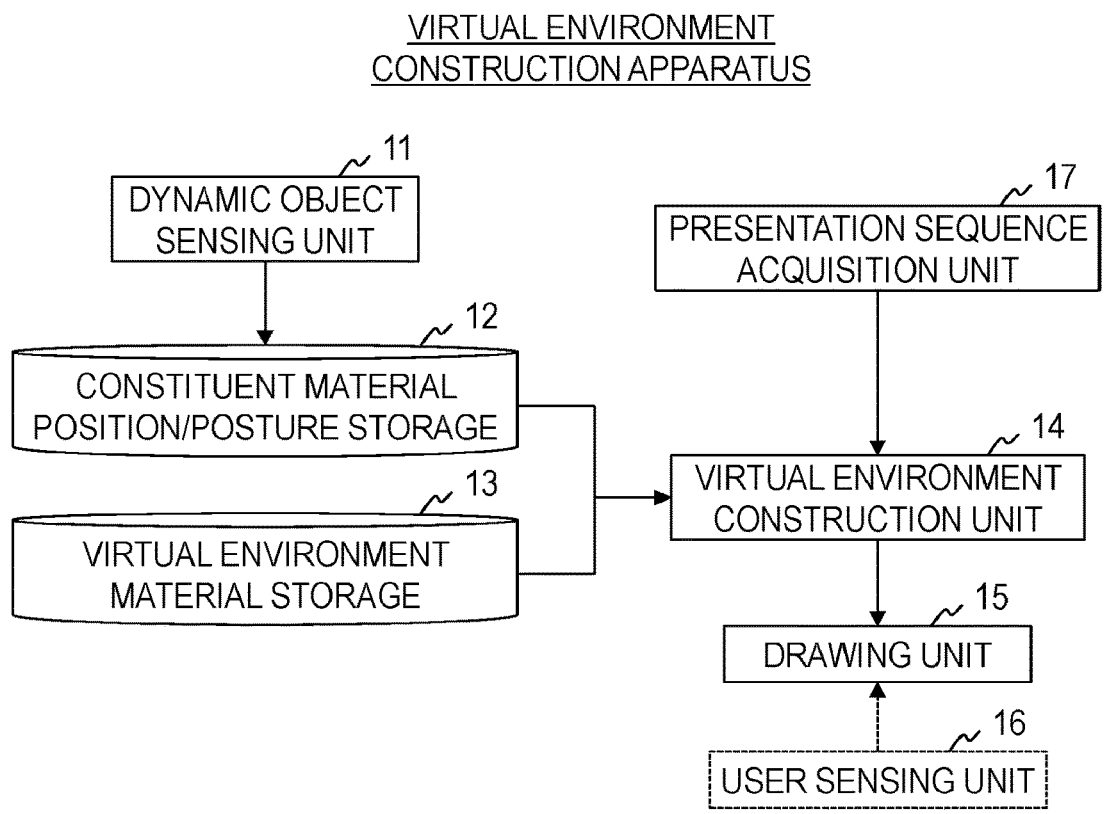
FIG. 5 is a diagram illustrating a functional configuration of a virtual environment construction apparatus in a third embodiment.

The virtual environment construction apparatus in the third embodiment includes the dynamic object sensing unit 11, the constituent material position/posture storage 12, the virtual environment material storage 13, the virtual environment construction unit 14, and the drawing unit 15 similarly to the first embodiment, and further includes a presentation sequence acquisition unit 17, as shown in FIG. 5. By the virtual environment construction apparatus performing the processes at steps described below, a virtual environment construction method in the third embodiment is implemented.

In the following, a processing procedure of the virtual environment construction method in the third embodiment will be described mainly for differences from the first embodiment.

The presentation sequence acquisition unit 17 obtains a presentation sequence stored in the constituent material position/posture storage 12 and representing a scene to be viewed by the user, including position and posture information of multiple kinds of different dynamic objects. The obtained presentation sequence is sent to the virtual environment construction unit 14. Specifically, input from the user is obtained, and a record relating to the presentation sequence corresponding to the user's input is extracted and output from a prepared presentation sequence table. Input from the user may be obtained in any manner, such as entering a key from a keyboard, clicking with a mouse, or entering a key using a game controller, for example. The presentation sequence table is composed of "practice goal", "constituent material ID" corresponding to the practice goal, and "time" at which each constituent material is incorporated into a virtual environment, as shown in FIG. 6. For example, in the example of FIG. 6, for the practice goal "want to improve the 00 ability", constituent material O1 is incorporated at time t1 and the constituent materials O2 and O3 are incorporated at time t2. Note that the time here is the time elapsed since the point of output to the virtual environment construction unit 14. That is, if a record (presentation sequence) relating to the practice goal "want to improve the ○○ ability" is output at a certain time t, constituent material O1 will be incorporated into a virtual environment at time (t+t1) and the constituent materials O2 and O3 will be incorporated into a virtual environment at time (t+t2). It is also assumed that in the presentation sequence table, each presentation sequence corresponds to a certain user input and such correspondences are predefined. That is, when a certain key is pressed, a record (a presentation sequence) relating to the practice goal "want to improve the ○○ ability" will be output. FIG. 7 is a specific example of a presentation sequence table for baseball as an example.

Figure 8:
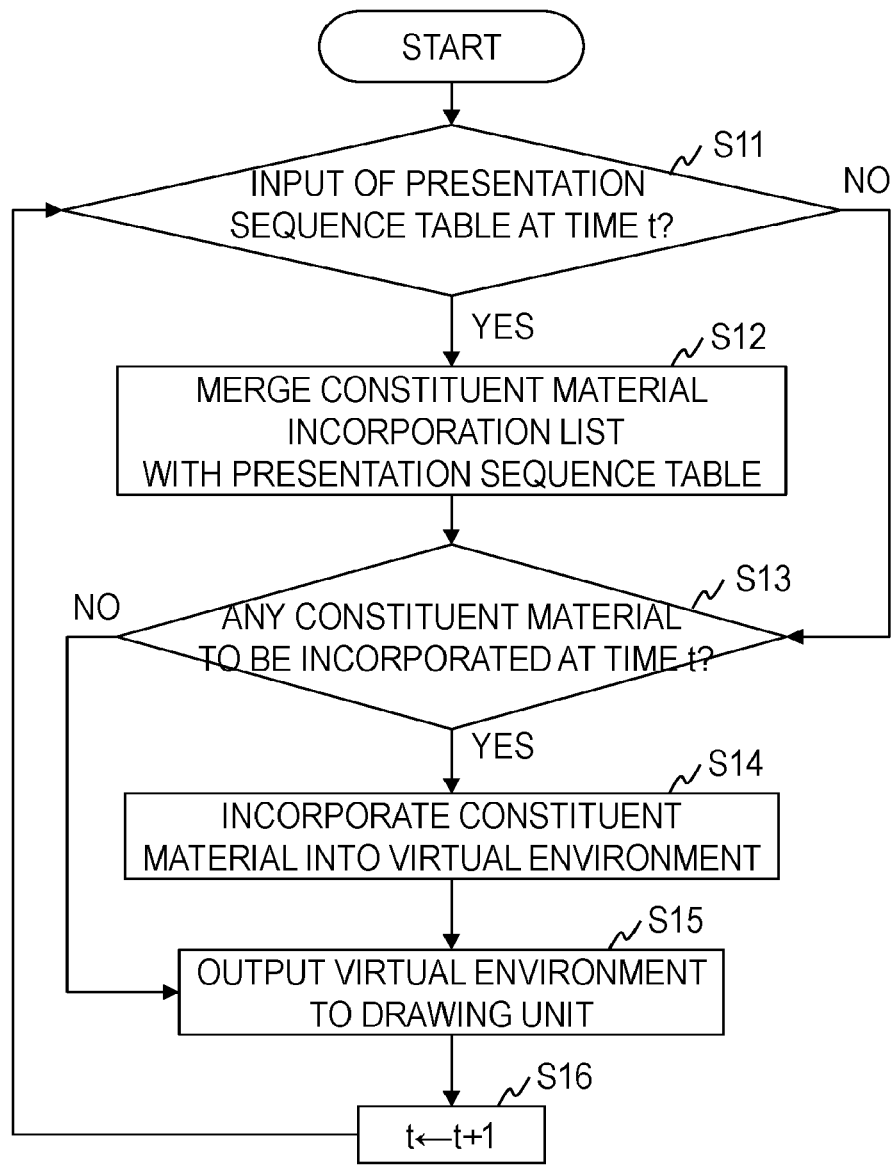
FIG. 8 is a diagram illustrating a processing procedure of a virtual environment construction unit.

The virtual environment construction unit 14 takes data on virtual environment materials, position and posture information of each constituent material, and the presentation sequence table as input, and constructs virtual environment data. FIG. 8 is a diagram illustrating the processing procedure of the virtual environment construction unit 14 in this embodiment. It is assumed that virtual environment construction unit 14 maintains the constituent material incorporation list shown in FIG. 3 in advance.

At step S11, the virtual environment construction unit 14 determines whether there has been input of the presentation sequence table at a certain time t or not. If there has been input (YES), the flow proceeds to step S12, and if there has been no input (NO), the flow proceeds to step S13. At step S12, the presentation sequence table is merged with the constituent material incorporation list. The merging of the table is performed using time as key. If there has been input of the presentation sequence table shown in FIG. 6 at a certain time t, the constituent material O1 is incorporated into the virtual environment at time (t+t1) and the constituent material O2 is incorporated into the virtual environment at time (t+t2). At step S13, it is determined whether there is any constituent material that should be incorporated at time t or not. If there is a constituent material that should be incorporated (YES), the flow proceeds to step S14, and if there is no constituent material that should be incorporated (NO), the flow proceeds to step S15. At step S14, the constituent material in question is incorporated into the virtual environment. At step S15, the virtual environment currently being constructed is output to the drawing unit 15. Then, at step S16, t is set to t=t+1 and the process returns to step S11.

Figures 9, 10:
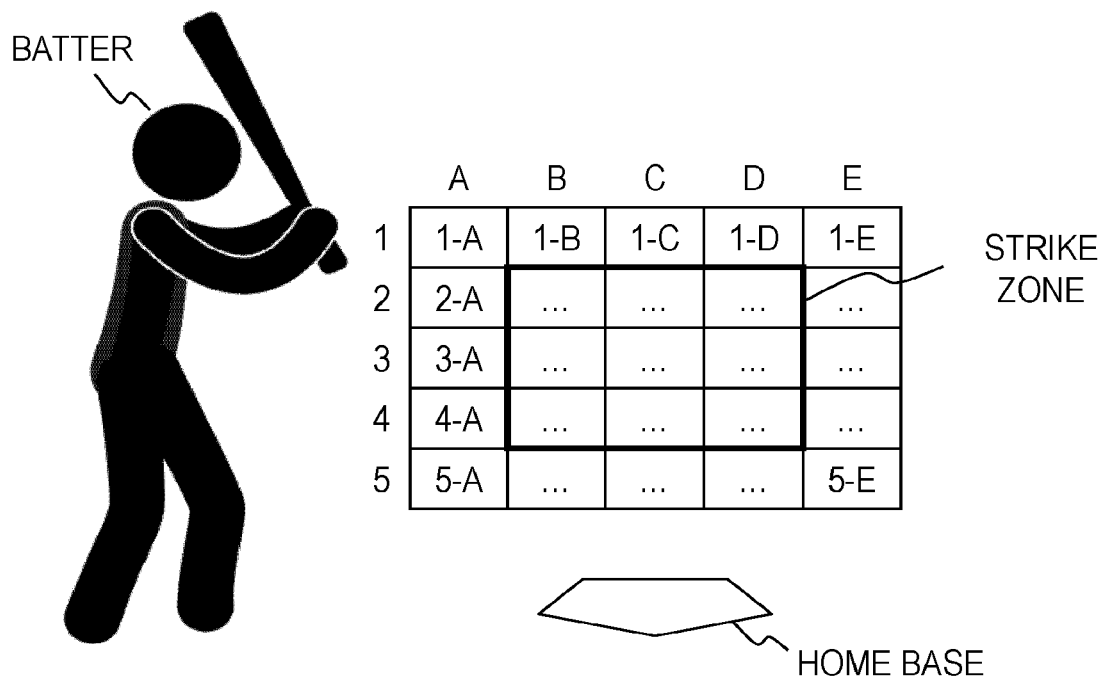
FIG. 9 is a diagram showing a specific example of an application effect table.
FIG. 10 is a diagram showing a specific example of pitch course.

In the following, taking a baseball batter as an example, an ability one wants to improve and the way of improving it will be described more specifically. In this specific example, as shown in FIG. 9, attributes such as "ball speed", "course", and "pitch type" are additionally maintained for each pitch during creation of the presentation sequence table, which is utilized in the presentation sequence acquisition unit 17, for easy and intuitive understanding of what kind of pitches should be performed in which sequence. These attributes can be determined from change in the position and posture of each constituent material stored in the constituent material position/posture storage 12. For example, a ball speed can be determined by dividing a distance travelled within a certain time by that time. Course can be determined by segmenting a plane on a home base as shown in FIG. 10 and determining the region closest to a ball when the ball passes over the plane. Pitch type can be determined by using the velocity vectors of the ball immediately after it is released and when it is received in a catcher's mitt (v1 and v2, respectively). For example, when v1 and v2 are in substantially the same direction, it indicates a straight ball; when the direction of v2 is oriented vertically downward in comparison between v1 and v2, it indicates a forkball; and when v2 is oriented obliquely downward, it indicates a curveball. These attributes are maintained for constituent materials corresponding to pitches. These are examples of attributes for baseball pitching and may be different attributes in the case of soccer or tennis according to the characteristics of the sport in question.

(a) Improving the Ability for Variation in Speed

When a slow ball is pitched after a fast ball or a fast ball is pitched after a slow ball, one may fail to swing a bat at an appropriate timing due to influence of the timing of the immediately preceding ball. To address it, the ability for variation in speed would be improved by experiencing fast balls and slow balls in a random order. In this case, the presentation sequence acquisition unit 17 prepares constituent material IDs in advance so that random pitches will be provided, allowing the user to perform training for the ability for such variation in speed. Exemplary orders of pitches for such a training are shown below.

Exemplary order of pitches (i): a straight ball (ball speed 140 km/h)–a curveball (ball speed 120 km/h)–a straight ball (ball speed 150 km/h)–a slow ball (ball speed 110 km/h) . . .

Exemplary order of pitches (ii): a straight ball (ball speed 140 km/h)–a straight ball (ball speed 145 km/h)–a curveball (ball speed 120 km/h)–a straight ball (ball speed 135 km/h)–a straight ball (ball speed 140 km/h) . . .

The pitches in these exemplary orders of pitches may take any course. The presentation sequence table for the exemplary order of pitches (i) is shown as the specific example in FIG. 7. Also, such an order of pitches may be determined either manually or automatically. In the case of automatic determination, pitch types may be randomly selected from all pitch types, or a pitch with a ball speed higher than a predefined threshold th may be categorized into group 1 and a pitch with a ball speed lower than the threshold th may be categorized into group 2, and pitch types may be randomly selected such that selection is made at a predefined ratio from the two groups (for example, ten from group 1 and five from group 2), for example.

(b) Improving Batting Eye (the Ability to Distinguish a Strike from a Ball)

Correct judgment is difficult with a ball that is pitched around the boundary between the strike zone and the ball zone. To address it, the batting eye could be improved by repeatedly experiencing a pitch judged as a strike and a pitch judged as a ball alternatingly in similar paths. Another example of a common order of pitches is once pitching to the batter's chest and then outside low. This is believed to have the effect of retarding the batter's response or blurring judgment between a strike and a ball by once accommodating the batter's eyes to around the chest and then pitching a ball outside low, that is, farthest from the chest. To address it, the batting eye would be improved by repeatedly experiencing a pitch to one corner of the strike zone and a pitch to the diagonally opposite corner alternatingly. By the presentation sequence acquisition unit 17 preparing constituent material TDs so that pitches will be provided in such a manner, the user can perform training for improving his or her batting eye.

Exemplary order of pitches (iii): a straight ball (course 2-A)–a straight ball (course 2-B)–a straight ball (course 1-B)–a straight ball (course 2-B) . . .

Exemplary order of pitches (iv): a straight ball (course 4-D)–a straight ball (course 2-B)–a straight ball (course 4-D)–a straight ball (course 2-D) . . .

The pitches in these exemplary orders of pitches may be delivered at any ball speed. The presentation sequence table for the exemplary order of pitches (iii) is shown as the specific example in FIG. 7.

While the virtual environment construction apparatus in the third embodiment has been described for configuration and processing procedure on the basis of the configuration of the first embodiment, it may be configured on the basis of the configuration of the second embodiment. That is, the virtual environment construction apparatus in the third embodiment may further include the user sensing unit 16.

Fourth Embodiment

The first to third embodiments assume that training is performed with construction of a trajectory that has been actually obtained, that is, the same environment as reality. However, some training methodologies are intended to improve the performance in an actual match by experiencing a more demanding environment than the reality. In baseball, for example, a player may experience pitches from a position closer than an actual mound in order to accommodate his or her eyes to fast balls, or may perform practice swing in an on-deck circle using a training bat heavier than a usual bat. The fourth embodiment realizes a virtual environment for experiencing a more demanding environment than the reality by additionally including an effect application unit.

Figure 11:
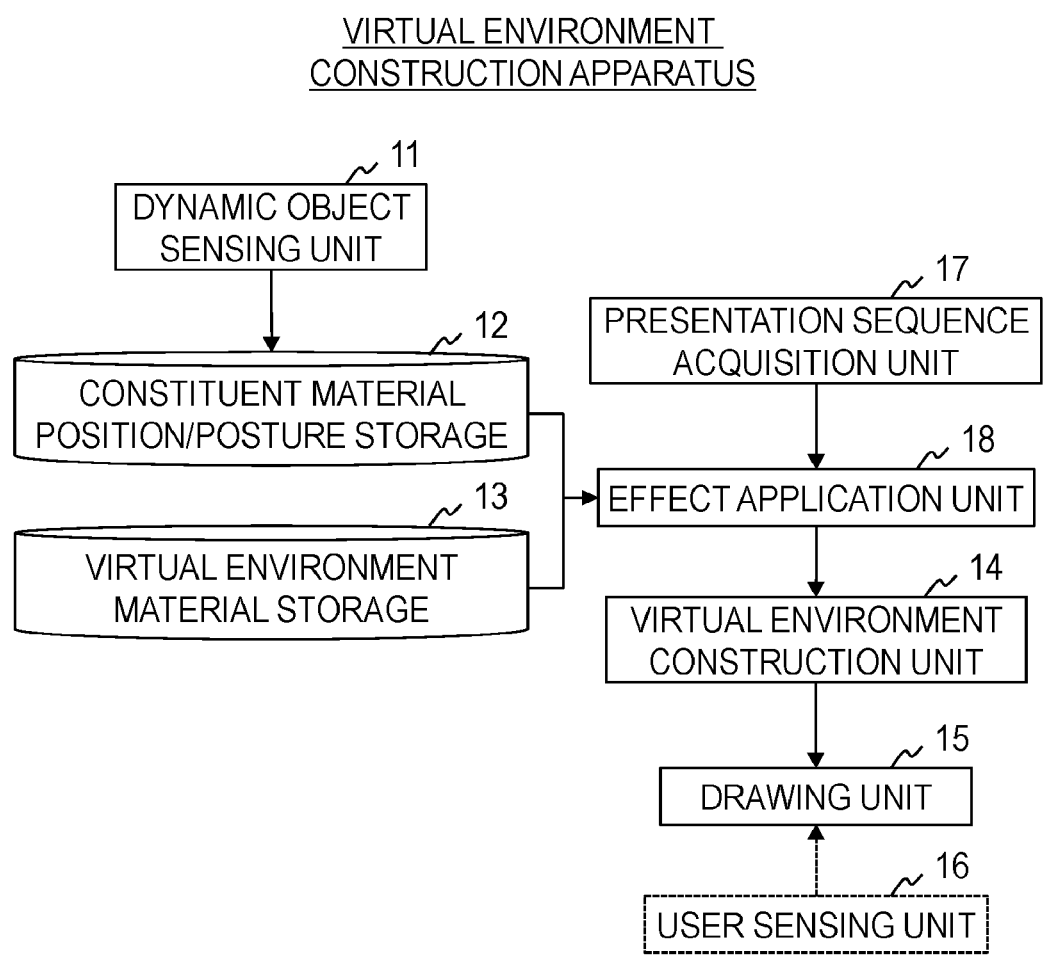
FIG. 11 is a diagram illustrating a functional configuration of a virtual environment construction apparatus in a fourth embodiment.

The virtual environment construction apparatus in the fourth embodiment includes the dynamic object sensing unit 11, the constituent material position/posture storage 12, the virtual environment material storage 13, the virtual environment construction unit 14, the drawing unit 15, and the presentation sequence acquisition unit 17 similarly to the third embodiment, and further includes an effect application unit 18, as shown in FIG. 11. By the virtual environment construction apparatus performing the processes at steps described below, a virtual environment construction method in the fourth embodiment is implemented.

In the following, a processing procedure of the virtual environment construction method in the fourth embodiment will be described mainly for differences from the third embodiment.

The presentation sequence acquisition unit 17 in this embodiment outputs information on an application effect in addition to a presentation sequence. The information on the application effect is sent to the effect application unit 18 along with the presentation sequence. An application effect refers to the function of an effect to be applied to a constituent material corresponding to a constituent material ID. For example, it may be an effect for increasing visual load on the user. Specifically, such an effect may be changing the rate of change in the position and posture of a constituent material (for example, increasing or decreasing of the ball speed, or increasing the amount of rotation), or providing a special effect relating to the appearance of a constituent material, such as making it transparent in midstream. It is assumed that an application effect corresponding to a certain user input is predefined, such as the ball speed being increased when a certain button is clicked.

The effect application unit 18 takes data on a virtual environment material, position and posture information of each constituent material, and information on an application effect as input, and outputs the data on the virtual environment material and the position and posture information of each constituent material on which an effect has been applied based on the information on the application effect.

In the following, how an effect is applied will be described more specifically taking baseball as an example like the third embodiment.

(a) Improving the Batting Ability for a Fast Ball

When one is visually and/or physically accustomed to fast balls, he or she would be able to swing a bat for a slower ball at an appropriate timing with leeway. However, when the trajectories of balls actually thrown by a pitcher are acquired, it is not always the case that the pitcher is able to pitch faster balls than any pitcher. In such a case, the presentation sequence acquisition unit 17 issues an instruction for an application effect "increase the ball speed by 10 km/h". Assuming that the ball speed of pitch Oi input to the effect application unit 18 is v1 in this case, the position and posture of a pitch with a ball speed increased by 10 km/h can be determined by multiplying the amount of change of the position and posture of Oi per unit time by $((v1+10)/v1)$. Using it, training for improving the batting ability for fast balls can be performed.

(b) Improving the Batting Ability for Breaking Balls

When one is visually and/or physically accustomed to breaking balls with a large amount of change, he or she would be able to swing a bat at appropriate timing and position with leeway for a ball with a small amount of change. However, when the position and posture of balls actually thrown by a pitcher are acquired, it is not always the case that the pitcher is able to pitch breaking ball with an appropriate amount of change. In such a case, the presentation sequence acquisition unit 17 issues an instruction for an application effect "increase the amount of change of the ball by $\Delta a$ %". If the acceleration of pitch Oi input to the effect application unit 18 is a at a certain point in this case, position and posture of a breaking ball with a greater amount of change can be created by re-calculating the position and posture with addition of $\Delta a$ to the acceleration. With this, training for improving the batting ability for breaking balls can be performed.

(c) Improving the Ability to Grasp an Overall Path from all Early Path of a Pitch For a ball speed of 130 km/h, there is only about 0.5 seconds from when the ball is released to when it is received by the catcher's mitt, leading a problem of delayed timing of swinging a bat after the batter delays the determination of the course or pitch type until the last minute. In such a case, the presentation sequence acquisition unit 17 issues an instruction for an application effect "obscure the ball". The effect application unit 18 then incorporates CG of a normal baseball up to a point d meters away from the point of release in relation to a pitch given as input, and applies an effect to obscure the ball after the d-meter point (for example, making it transparent or gradually making it transparent). The value of d and/or the effect to be applied may be set as appropriate. By the presentation sequence acquisition unit 17 alternatingly incorporating a pitch with such an obscuring effect applied and an identical pitch without application of the effect, the user can perform training for predicting the overall path of a pitch from an early path of the pitch, that is, change in the position and posture of the ball from the point of release to the point d meters away from it.

While the virtual environment construction apparatus in the fourth embodiment has been described for configuration and processing procedure on the basis of the configuration of the first embodiment, it may be configured on the basis of the configuration of the second embodiment. That is, the virtual environment construction apparatus in the fourth embodiment may further include the user sensing unit 16.

Fifth Embodiment

For training of sports and the like, for example, systems have been proposed that aim at improving performance in a match by virtually producing an experience close to a match and allowing a player to experience it beforehand (Reference Literature 1, for instance). Reference Literature 1 describes a system for coaching a football player, in which a 360° video from the player's perspective that reproduces the same environment as a match using virtual reality (VR) technique is viewed on a head mounted display.

Reference Literature 1: STRIVR Labs, Inc., "STRIVR|Immersive Training Solutions", [online], [searched on Jan. 4, 2017], the Internet <URL: http://www.strivrlabs.com/home/about-us>

In sports practice, one often experiences a more demanding environment than an actual match for the purpose of improving his or her performance in a match. For example, a female team may practice with a male team as an opponent, or a baseball batter may experience faster balls by a pitcher throwing at a position closer than the mound, or a batter may swing a bat heavier than one used in a match. However, the conventional technique described in Reference Literature 1 just presents a real situation captured in advance as it is and does not enable experience of a more demanding environment than the reality.

In view of the foregoing, an object of the fifth embodiment is to provide a virtual environment construction technique that enables experience of a virtual environment more demanding than the reality based on information obtained from a real environment.

To accomplish the object, a virtual environment construction apparatus according to a first aspect of the fifth embodiment is a virtual environment construction apparatus that constructs a virtual environment to be experienced by a user based on a real environment in which another party launches a flying object, the virtual environment construction apparatus including: a presentation sequence generation unit that generates a presentation sequence representing a time series of scenes to be presented to the user based on a probability combining a prior probability of a scene of the flying object with dynamics representing connection between a plurality of scenes; a presentation trajectory decision unit that decides a presentation trajectory representing a motion of the flying object corresponding to each scene included in the presentation sequence; a presentation action decision unit that decides a presentation action representing a motion of the other party corresponding to each scene included in the presentation sequence; and an experience synthesis unit that synthesizes the virtual environment to be experienced by the user based on the presentation trajectory and the presentation action.

The virtual environment construction apparatus according to a second aspect of the fifth embodiment is a virtual environment construction apparatus that constructs a virtual environment to be experienced by a user based on a real environment in which another party launches a flying object, the virtual environment construction apparatus including: a presentation sequence generation unit that generates a presentation sequence representing a time series of scenes to be presented to the user; a presentation trajectory decision unit that decides a presentation trajectory representing a motion of the flying object corresponding to each scene included in the presentation sequence; a presentation action decision unit that decides a presentation action representing a motion of the other party different from one in the real environment corresponding to each scene included in the presentation sequence; and an experience synthesis unit that synthesizes the virtual environment to be experienced by the user based on the presentation trajectory and the presentation action.

The fifth embodiment aims at improving sports performance through virtual experience. Here, assume a situation where an action of another party and associated movement of a ball occur in a certain phase of a sport, and one is trained for an action to handle it. For example, assume a situation such as a baseball batter hitting a ball thrown by a pitcher, a soccer keeper catching a ball kicked by a kicker in a penalty kick, a tennis receiver hitting back a ball hit by a server, or a volleyball receiver receiving a ball hit by a server. Hereinafter, a person that launches a ball, such as a pitcher, kicker, and server as listed above, will be referred to as "opponent player" or just "another party". Also, a video equivalent to a single pitch will be referred to as "scene" and a succession of multiple scenes will be referred to as "sequence". Also, information on ball motion will be referred to as "trajectory" and information on motion of an opponent player will be referred to as "action". The "trajectory" and the "action" may be a video captured in a real environment, or may be chronological arrangement of three-dimensional position information of an object or person as a subject.

Sports to which the fifth embodiment is applicable are not limited to sports that use a ball, such as those mentioned above. It may be utilized in sports and situations in general where some object is launched from an opponent player, such as Frisbee, for example. Hereinafter, an object that is launched by an opponent player, including a ball as described above, will be referred to as "flying object".

Figure 12:
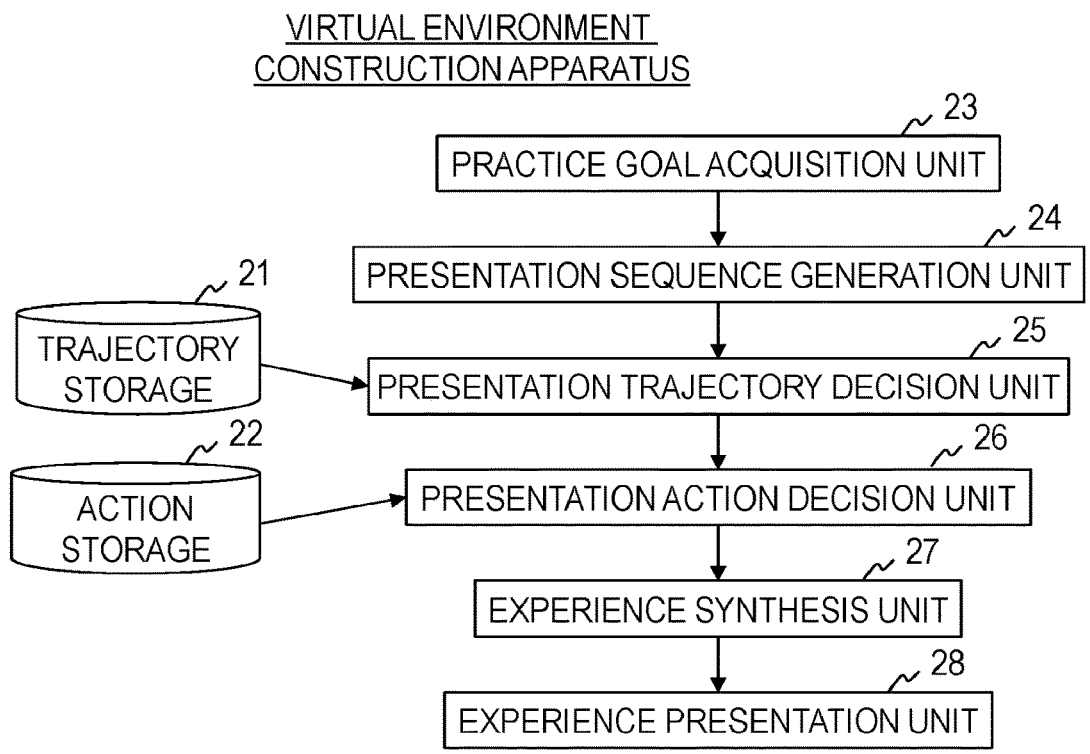
FIG. 12 is a diagram illustrating a functional configuration of a virtual environment construction apparatus in a fifth embodiment.

The virtual environment construction apparatus in the fifth embodiment includes a trajectory storage 21, an action storage 22, a practice goal acquisition unit 23, a presentation sequence generation unit 24, a presentation trajectory decision unit 25, a presentation action decision unit 26, an experience synthesis unit 27, and an experience presentation unit 28, as shown in FIG. 12. By the virtual environment construction apparatus performing the processes at steps shown in FIG. 13, a virtual environment construction method in the fifth embodiment is implemented.

The virtual environment construction apparatus is a special device configured by loading of a special program into a known or dedicated computer having a central processing unit (CPU), main memory (random access memory or RAM), and the like, for example. The virtual environment construction apparatus executes various kinds of processing under control of the central processing unit, for example. Data input to the virtual environment construction apparatus and/or data resulting from various kinds of processing are stored in the main memory, for example, and data stored in the main memory is read as required to be utilized for other processing. Also, at least part of the processing components of the virtual environment construction apparatus may be formed of hardware such as an integrated circuit. The storages provided in the virtual environment construction apparatus may be formed of main memory such as random access memory (RAM), an auxiliary storage device formed of a hard disk, optical disk, or a semiconductor memory device such as a flash memory, or middleware such as a relational database or a key value store, for example. The storages provided in the virtual environment construction apparatus may be each logically partitioned or they may be stored in a single physical storage device.

Figure 13:
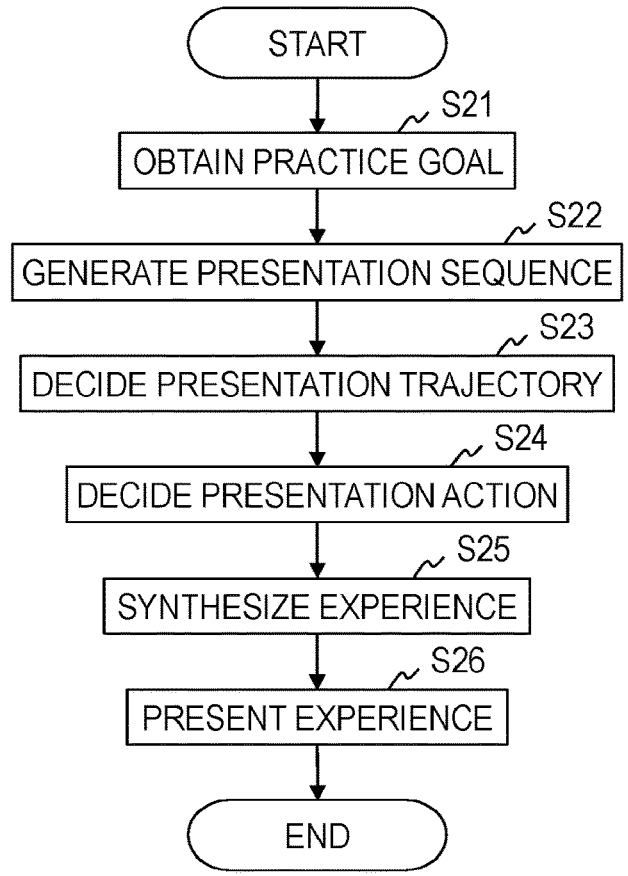
FIG. 13 is a diagram illustrating a processing procedure of a virtual environment construction method in the fifth embodiment.

Referring to FIG. 13, the processing procedure of the virtual environment construction method in the fifth embodiment is described.

The trajectory storage 21 has stored therein a trajectory database accumulating trajectory data in which action IDs, opponent player TDs, and trajectory information are associated with one another. An action ID is an identifier uniquely identifying an action of an opponent player. An opponent player ID is an identifier uniquely identifying an opponent player. Trajectory information is information representing the trajectory of a flying object after an action of the opponent player, assumed here to be a chronological arrangement of three-dimensional position information of the flying object.

The action storage 22 has stored therein an action database accumulating action data in which action IDs, opponent player TDs, and action videos are associated with one another. Action video may maintain three-dimensional action information including depth, or may be two-dimensional (that is, a normal video).

Figures 14, 15:
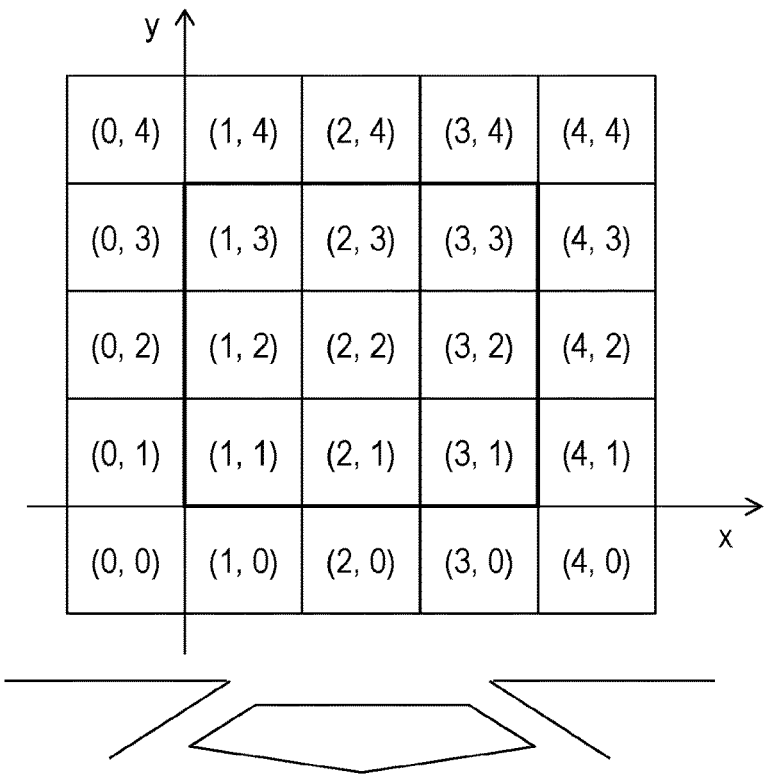
FIG. 14 is a diagram for describing an action database.
FIG. 15 is a diagram for describing an exemplary classification of courses.

FIG. 14 shows an example of the action database. In the action database, action videos are stored by setting frame images 1 to T corresponding to times 1 to T for an action ID and an opponent player TD (see action ID=1 and opponent player ID=1 in FIG. 14). Also, information that enables dynamic generation of action video may be set, such as three-dimensional coordinates of a body part (such as a hand or arm) of an opponent player, at times 1 to T for an action ID and an opponent player ID (see action ID=2 and opponent player ID=1 in FIG. 14).

It is assumed that trajectory data stored in the trajectory database and action data stored in the action database are associated with each other on a one-to-one basis and cross reference between them is possible. That is, a combination of an action ID and an opponent player ID uniquely determines action data and trajectory data.

At step S21, the practice goal acquisition unit 23 obtains information including at least a practice goal of a practice goal and a practice intensity from an input unit not illustrated, for example, a keyboard, and outputs it. Practice goal is information representing a scene to be experienced by the user. Practice intensity is information representing the difficulty level of practice. Practice goal and practice intensity are obtained by presenting multiple entries prepared in advance to the user by displaying them on a display, for example, and prompting the user to select one or more of the entries via touch panel operation, keyboard entry, or the like by the user. Practice goal and practice intensity do not have to be selected on each use, and may be obtained by reading settings made by the user beforehand. In the subsequent process, a configuration that does not employ practice intensity is possible, in which case only the practice goal has to be obtained.

Practice goal is specifically selected from entries such as:
1. Course distinction enhancement,
2. Speed enhancement, and
3. Speed change enhancement, for example.

For the course distinction enhancement of 1, further options are prepared such as:
1-1. high/low,
1-2. outside strike/ball,
1-3. inside strike/ball,
1-4. targeted ball/others.

For the speed enhancement of 2, further options are prepared such as:
2-1. ○○ km/h to ΔΔ km/h
2-2. ΔΔ km/h to ☐☐ km/h For the speed change enhancement of 3, further options are prepared such as:
3-1. Two types (straight ball and curveball),
3-2. Three types (straight ball, curveball, and slider),
3-3. Four types (straight ball, curveball, slider, and change-up)
. . .

The practice intensity is set as integers from 1 to 6, for example, which may be defined as:
1. Practice with a video of a real pitcher that delivered the pitch to be trained;
2. Practice with a video in which a real pitcher is replaced with a stick figure;
3. Practice with a video of one of multiple template pitchers prepared;
4. Practice with the same video of the same pitcher throughout;
5. Practice with a video modified so that the pitcher's hand is not visible;
6. Practice with a video showing nothing at the location where the pitcher should be present.

While in the above example the difficulty level becomes higher as the value of the practice intensity increases, such definition is not necessarily required.

If a practice intensity is input, the practice goal acquisition unit 23 outputs the practice intensity to the experience synthesis unit 27.

At step S22, the presentation sequence generation unit 24 receives the practice intensity from the practice goal acquisition unit 23, and generates and outputs a presentation sequence representing the time series of scenes to be presented to the user based on the practice goal.

In the presentation sequence, pieces of scene information, including information on course, speed, and pitch type, for example, are arranged as many as the number of scenes to be presented. Here, the number of scenes refers to the number of pitches in baseball, for example, not the number of frames in a video. Scene information is set as follows, for example.

Presentation No. 1: course=(1, 3), speed=140 km/h, pitch type=straight ball

Figure 16:
FIG. 16 is a diagram for describing an exemplary classification of courses.

The course is two-dimensionally represented, including ball zones falling outside the strike zone on the top, bottom, left, and right, by dividing the strike zone into 3×3, or nine, blocks in the horizontal and vertical directions as shown in FIG. 15, where the horizontal direction is the x-axis and the vertical direction is the y-axis. FIG. 15 is an example of course classification for a case where the lower left corner of the strike zone seen from the batter's side, enclosed by a bold line, is defined as the origin. For example, course=(1, 3) indicates a ball that passes through the block that is positioned first from the left and third from the bottom among the nine blocks of the strike zone (an inside, higher strike zone seen from a right-handed batter). For designation of a ball zone, values equal to or smaller than 0 or equal to or greater than 4 may be set. For example, course=(4, 0) indicates a ball that passes through the block that is one block outside the strike zone to the right and one block outside to the bottom (an outside, lower ball zone seen from a right-handed batter). However, classification is not limited thereto but may be made in a different way, such as 5-classification, which divides a space including above the home base and the strike zone into five positions: "top", "middle left", "middle right", "lower left", and "lower right" as shown in FIG. 16, for example. For designation of ball zones, spaces falling outside the strike zone on the top, bottom, left, and right may be divided into "upper outside (a space further above the 'top')", "upper left outside (a space to the left of 'top')", "upper right outside (a space to the right of 'top')", "middle left outside (a space further left of the 'middle left')", "middle right outside (a space further right of the 'middle right')", "lower left outside (a space further left of the 'lower left')", "lower right outside (a space further right of the 'lower right')", and "lower outside (a space further below the 'lower left' and 'lower right')", for example.

Figure 17:
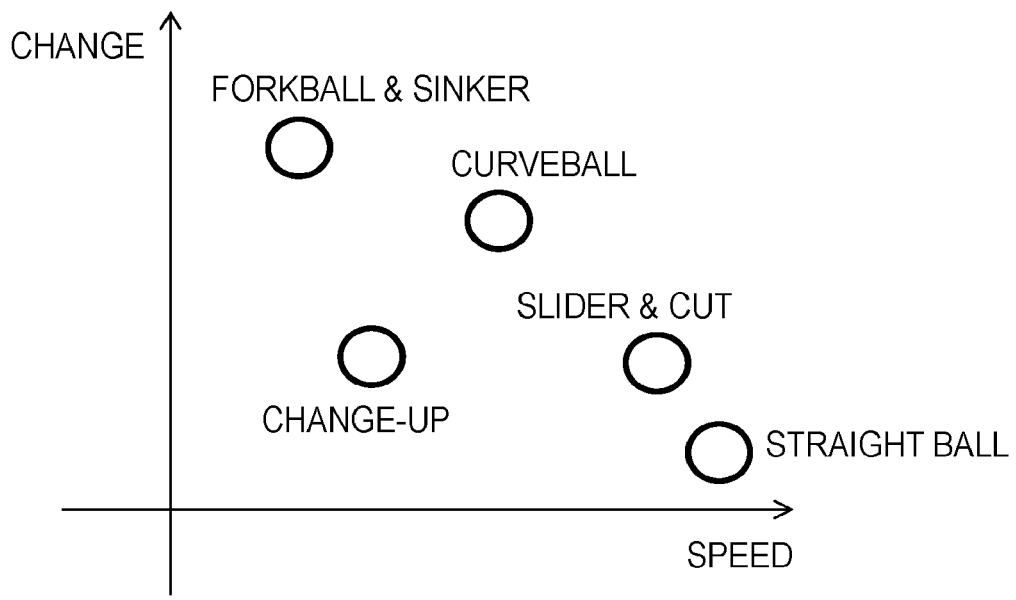
FIG. 17 is a diagram for describing classification of pitch types.

Pitch types may be classified in any manner. For example, a pitch type classification may be defined with a range of speed and a magnitude of change, as shown in FIG. 17. In the example of FIG. 17, pitch type classification is defined on a graph with speed indicated on the horizontal axis and change on the vertical axis, where a shorter distance on the graph represents closer pitch types. In general, pitch types are considered to be closer in the order of straight ball, slider, change-up, curveball, and forkball. Consideration of similarity of pitch types enables more flexible practice. For example, control becomes possible such that pitch types of high similarity will not be repeated over a predetermined number of times, or such that pitches separate from each other in similarity by a predetermined value or more will be provided in succession.

The classification can be considered to indicate the distance between ones classified into the same class as α, and otherwise as 1. Defining classification as in FIG. 17 enables flexible control in terms of dynamics, which is discussed later, because it allows the similarity between pitch types to be treated as a continuous distance.

Classification and/or similarity specific to individual opponent players (for example, pitchers in baseball, or servers in tennis) may also be prepared.

The presentation sequence generation unit 24 maintains prior probability p(s) and dynamics $p(s_{t+1}|s_t)$ determined beforehand. Here, t is a number representing an index of a scene, and s is a parameter relating to the flying of a flying object in a certain scene, for example, one of course, speed, and pitch type. The prior probability of each parameter may be determined by computing an average from a database in which pitches of various types delivered by various pitchers are recorded, for example. The dynamics of a parameter may be determined from transition of the parameter in consecutive pitches delivered by a pitcher (change between the previous pitch to the next pitch), for example.

The method of creating a presentation sequence will be shown below. Since consecutive viewing of an identical scene can lower the effect of practice, an order of pitches that promotes effective practice is generated in a presentation sequence in accordance with the practice goal. The presentation sequence generation unit 24 creates a prototype of the presentation sequence. For example, a course is created in the manner as described below, and speed and pitch type are randomly determined and output.

Figure 18:
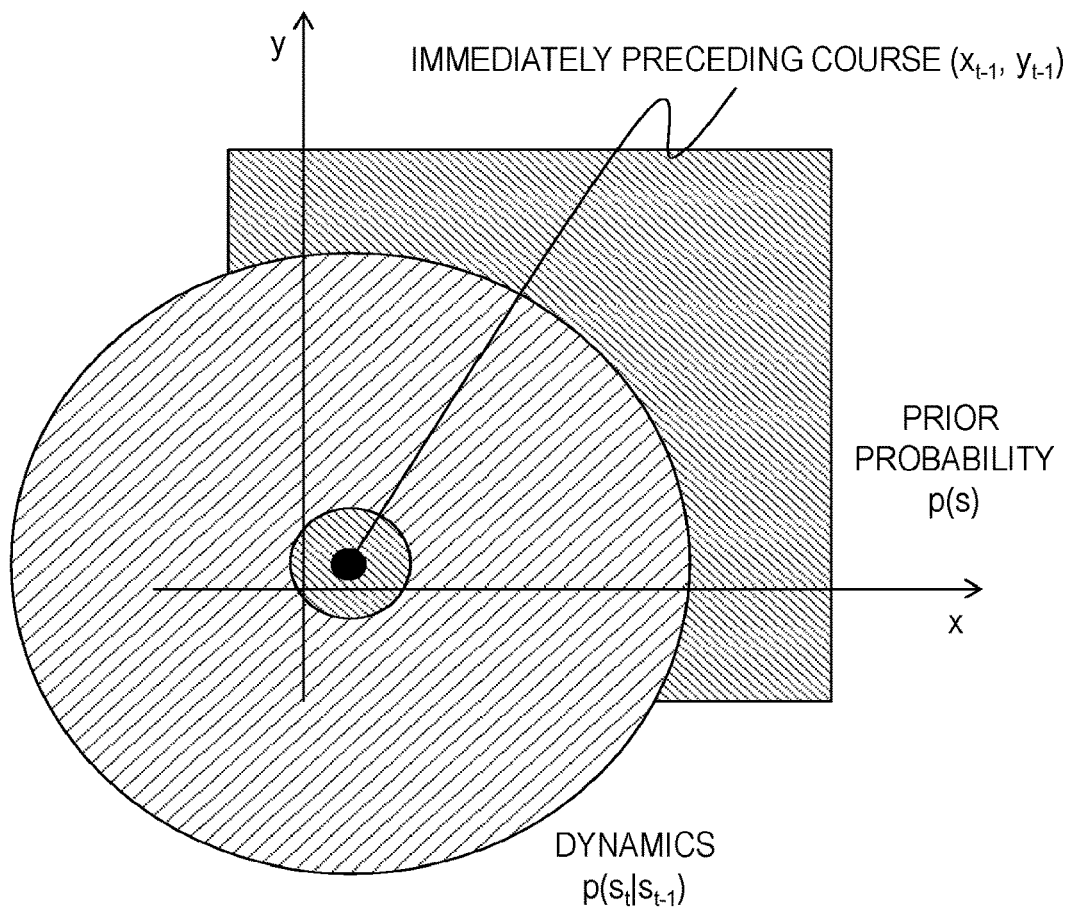
FIG. 18 is a diagram for describing how a sequence is generated.

As shown in FIG. 18, course $(x_1, y_1)$ for the first pitch is decided first by random sampling from the prior probability p(s). The course is decided based on definition similar to the course classification used in scene information. Herein, a course is shown by coordinate values indicating the two-dimensional position of a block, by dividing the strike zone into 3×3, or nine, horizontal and vertical blocks as shown in FIG. 15, where the lower left corner as seen from the batter's side is the origin, the horizontal direction is the x-axis, and the vertical direction is the y-axis. A subscript represents the index of a scene. Next, using the probability distribution p(s) for the course and the dynamics $p(s_t|s_{t-1})$ of transition of the course, course $(x_2, y_2)$ for the second pitch is decided by random sampling from $p(s)p(s_2|s_1)$. Subsequently, using the probability distribution p(s) for the course and the dynamics $p(s_t|s_{t-1})$ of transition of the course, course $(x_t, y_t)$ for the t-th pitch is decided by random sampling from $p(s)p(s_t|s_{t-1})$ in a similar manner.

The speed and the pitch type may be decided simultaneously when the presentation trajectory decision unit 25 decides the presentation trajectory with reference to the trajectory database and thus not decided by the presentation sequence generation unit 24, or may be decided by the presentation sequence generation unit 24 based on prior probability and dynamics as with the course.

When the presentation sequence generation unit 24 has decided all of multiple parameters relating to the flying of the flying object (for example, course, speed, and pitch type) by random sampling, the trajectory database may be checked to see if there is any trajectory data similar to the scene. If there is no trajectory data similar to the scene decided by random sampling, some of the multiple parameters relating to the flying of the flying object may be randomly sampled preferentially and parameters may be decided so that similar trajectory data is present. In doing so, which one of the parameters is given priority is predefined in accordance with the practice goal. Such a configuration allows generation of a scene close to real pitching, enhancing the reality of experience.

It is also possible for the presentation sequence generation unit 24 to control the prior probability p(s) and the dynamics $p(s_{t+1}|s_t)$ based on the practice goal received from the practice goal acquisition unit 23. This can realize 1. practice of course distinction, 2. practice for enhancing speed change, and 3. practice for enhancing pitch type change, for example. They will be individually described in detail.

Figure 19:
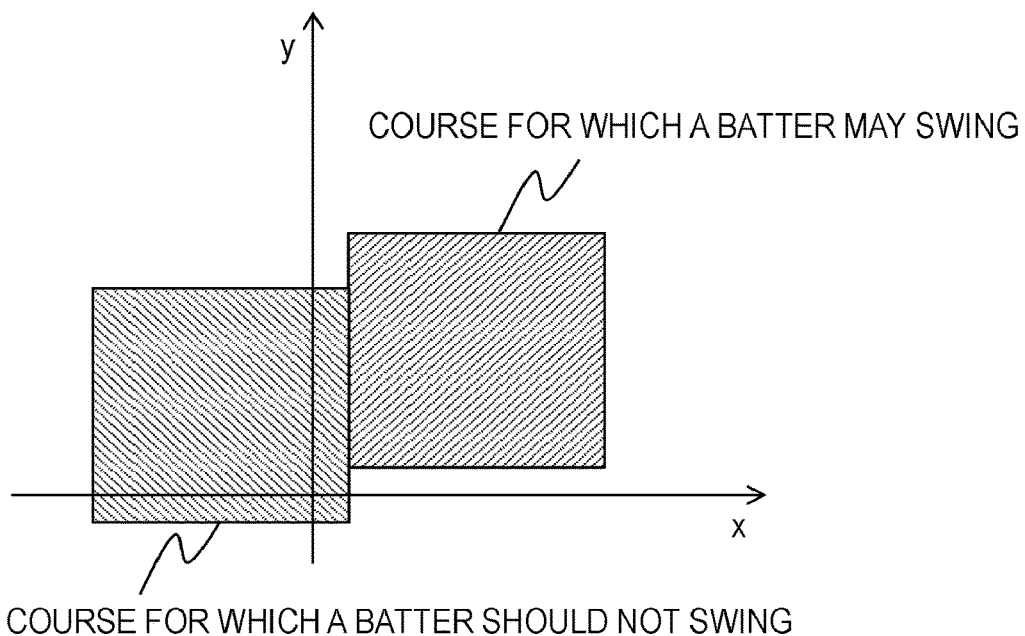
FIG. 19 is a diagram for describing a modification of probability distribution.

1. The practice of course distinction is practice for distinguishing between an outside strike and a ball, for example. For example, as shown in FIG. 19, the probability distribution of prior probability p(s) may be bimodal: a strike (a course for which a batter may swing) and a ball (a course for which a batter should not swing). For the dynamics $p(s_{t+1}|s_t)$, only the course is decided first, then the pitch type and the speed are decided by random sampling based on p(pitch type, speed|course).

2. For the practice for enhancing speed change, dynamics $p(s_{t+1}|s_t)$ is defined with speed; the speed is decided as $p(s_{t+1}|s_t)$, and then the course and the pitch type are decided by random sampling based on p(course, pitch type|speed).

3. For the practice for enhancing pitch type change, the dynamics $P(s_{t+1}|s_t)$ is defined with the pitch type; the pitch type is decided as $p(s_{t+1}|s_t)$, and then the course and speed are decided by random sampling based on p(course, speed|pitch type). However, as speed and pitch type generally have high correlation, it substantially has high similarity to the practice for enhancing speed change.

The prior probability distribution and the dynamics may also be decided based on actually pitched balls. For example, the prior probability distribution may be determined from an average of pitches of a particular player and the dynamics may be determined from the pitch transition of the player, or the prior probability distribution may be determined from an average of pitches of all pitchers and the dynamics may be determined from the pitch transition of the player in question.

The presentation sequence generation unit 24 generates each piece of scene information as described above and repeats this as many times as the number of scenes (pitches), thereby generating a presentation sequence. The generated presentation sequence is sent to the presentation trajectory decision unit 25.

At step S23, the presentation trajectory decision unit 25 receives the presentation sequence from the presentation sequence generation unit 24, selects most similar trajectory data from the trajectory database for each of the scenes included in the presentation sequence so as to decide a presentation trajectory representing the motion of a flying object, and outputs the decided presentation trajectory in association with the presentation sequence. A presentation trajectory DB_I is selected using the formula below.

$$DB\_I = \text{argmin } E(\text{course } q - \text{course } DB_i) + E(\text{pitch type} \\ q - \text{pitch type } DB_i) + E(\text{speed } q - \text{speed } DB_i)$$

Here, q represents scene information included in a presentation sequence, and $DB_1$ represents trajectory data contained in the trajectory database. That is, "course q" is the course for a certain scene, and "course $DB_i$" is the course for the i-th trajectory data. The presentation trajectory decision unit 25 outputs information that associates the presentation trajectory DB_I with the presentation sequence (hereinafter referred to as trajectory-added presentation sequence).

At step S24, the presentation action decision unit 26 receives the trajectory-added presentation sequence from the presentation trajectory decision unit 25, and selects action data from the action database for each of the scenes included in the trajectory-added presentation sequence, thereby deciding a presentation action representing the motion of the opponent player. Since action data stored in the action database is associated with trajectory data stored in the trajectory database on a one-to-one basis, action data identified by the action ID and the opponent player ID which are associated with the presentation trajectory DB_I is selected as the presentation action. Specifically, the presentation action decision unit 26 takes information associating presentation trajectories DB_I with the presentation sequence as input, retrieves action information corresponding to each DB_I (action ID, opponent player ID, and action video) from the action database and associates it with the trajectory-added presentation sequence, and outputs the trajectory-added presentation sequence with which the action data has been associated, as a trajectory-and-action-added presentation sequence. The trajectory-and-action-added presentation sequence is sent to the experience synthesis unit 27.

At step S25, the experience synthesis unit 27 receives the trajectory-and-action-added presentation sequence from the presentation action decision unit 26, constructs a virtual environment to be experienced by the user based on the presentation trajectory and the presentation action included in the trajectory-and-action-added presentation sequence, and outputs it.

While any known technique may be employed to construct a virtual environment, it can be carried out as follows, for example. First, objects for constituting a virtual environment, such as a ball and a stadium, are referred to as constituent materials, and computer graphics (CG) data for reproducing each such constituent material in a virtual environment are prestored as virtual environment material. A virtual environment material is not limited to CG data but may also be a moving image or still image data clipped from an actually captured video. Position and posture information relating to a constituent material is prestored as well. Here, the position and posture information is information including position information in the same coordinate system as a presentation trajectory and posture information in that coordinate system. The experience synthesis unit 27 reads virtual environment materials to be arranged in a virtual environment, and arranges the virtual environment material of a static object, which does not temporally change, in the virtual environment in accordance with its position and posture information. At the same time, the experience synthesis unit 27 arranges the virtual environment material of a dynamic object involving temporal change, such as an opponent player or a flying object, in the virtual environment based on the presentation trajectory and the presentation action associated with the trajectory-and-action-added presentation sequence. For example, if the presentation trajectory is a time series of three-dimensional position information, a virtual environment material corresponding to the flying object is read and arranged at a three-dimensional position and in a certain posture on the virtual environment.

Also, if the presentation action is a video clipped from a video of a real environment, a video of an opponent player is synthesized at a predetermined position on the virtual environment. Here, a configuration is also possible which measures the position and posture of the user's head using a motion sensor or the like and controls the line of sight in the virtual environment based on the position and posture information of the user.

The experience synthesis unit 27 may receive a practice intensity from the practice goal acquisition unit 23 as input and modify the video based on the practice intensity it received. The practice intensity decides the difficulty level of practice. However, it is not always the case that the difficulty level simply increases as the value of practice intensity becomes greater.

For example, practice intensities are classified with numbers from 1 to 6 and each defined as follows:
1. No modification.
2. Display a video of a pitcher as a stick figure (see Reference Literature 2). It has been found that presentation of a human as a stick figure makes its action appear to be slow. On the other hand, the sense of realism lowers compared to presentation with a live-action video.

Reference Literature 2: Ayumi Matsumoto, Dan Mikami, Xiaojun Wu, Harumi Kawamura, and Akira Kojima, "Multi View Layered GPDM for View Invariant Human 3D Pose Estimation from Single RGB Camera Input", the transactions of the Institute of Electronics, Information and Communication Engineers, Vol. J97-D, No. 7, July 2014.

3. Randomly shuffle videos. This serves as practice for not being affected by a preceding action prior to pitching of a ball.
4. Present the same video throughout. This produces a similar effect to the practice intensity 3.
5. Obscure a part (for example, the source of a ball) by image processing. This requires the player to judge the pitch at a position closer to his or her hand.
6. Present no video.

Specifically,
1. Train with a video of a real pitcher who delivered the pitch to be trained;
2. Train with a real pitcher replaced by a stick figure;
3. Train with a video of one of multiple template pitchers prepared;
4. Train all the pitches with the same video of the same pitcher;
5. Train with a video modified so that the pitcher's hand is not visible;
6. Train with a video showing nothing at the location where the pitcher should be present (only the ball).

For example, consider presentation with a stick figure. In this case, posture estimation is performed for each of the actions registered in the action database. Posture estimation from a monocular image can be achieved by the approach described in Reference Literature 2, for example. Reference Literature 2 mentions that motion is perceived to be slow when it is presented as a stick figure. This is presumably because cognitive burden is reduced as a result of human motions being simplified as mere sticks. In a certain respect, this can be considered as lower practice intensity. On the other hand, the facial expression or detailed hand motions of the pitcher cannot be viewed because stick figures are used instead of a video. This means more difficult practice because the user confronts reduced information.

Practice intensities 3, 4, 5, and 6 have the same concept. There can be information about a ball to be pitched in a motion prior to the actual pitching or serving of the ball. For example, the pitch type can be known from the form. However, since pitchers practice so that they can deliver a number of pitch types with the identical form, it is desirable to be able to judge only from the ball path and respond without being affected by the preceding form. It is thus effective to practice with balls pitched from random forms, balls pitched from an identical form, or even balls that abruptly pop out without any presentation of a video so that the form cannot be viewed at all, for example.

For practice intensity 3, a single action is randomly selected as the presentation action from action data for the pitcher in question stored in the action database. For practice intensity 4, a single action is randomly selected from action data for the pitcher in question stored in the action database, and the same action data is always selected during the subsequent practice. Thus, when the practice intensity 4 is set, the same video will be always selected while a video of the same pitcher is being viewed. For practice intensity 5, several methods are available for consideration. A first method is one that virtually shows an object that blocks the pitcher. A second method is one that applies processing such as blurring to a pitcher action registered in the action database in advance via image processing.

At step S26, the experience presentation unit 28 receives the constructed virtual environment data from the experience synthesis unit 27 and outputs it in a format viewable by the user. The video being output may be a video that sees one direction from a certain viewpoint in the virtual environment or a video that allows viewing in all directions like an omnidirectional video. For instance, in the case of outputting a video that sees one direction from a certain viewpoint, a perspective projection camera may be virtually set at a certain position and a CG model present in the virtual environment space may be projected onto the image plane of the perspective projection camera. In the case of outputting an omnidirectional video that allows viewing in the all the directions from a certain viewpoint, an omnidirectional camera may be virtually set at the certain viewpoint and a CG model present in the virtual environment space may be projected onto the image plane of the omnidirectional camera.

With the foregoing configuration, the virtual environment construction technique in the fifth embodiment can construct a virtual environment for the user to experience a more demanding environment than a real environment based on his or her practice goal during training for a sport or situation that involves a flying object from another party. This permits the user to easily experience an environment adapted for his or her practice goal and can improve the efficiency of practice without actually preparing a demanding environment.

According to the virtual environment construction technique in the fifth embodiment, it is possible to construct a virtual environment that enables experience of a more demanding environment than the reality based on information obtained from a real environment. This allows a player to experience a more demanding environment than a real environment beforehand to improve his or her performance in a match.

Sixth Embodiment

In sports, it is very important for improving performance in an actual match to experience a video taken from the viewpoint position of a player who is actually participating in a match with great sense of realism before a match. However, taking video from the location of a player during a match is difficult as it hinders play.

The aforementioned Reference Literature 1 describes a system that aims at improving performance in a match by virtually producing an environment close to a match and allowing a player to experience it beforehand in training of sports and the like. The system described in Reference Literature 1 is a system for coaching a football player, in which a 360° video from the player's perspective that reproduces the same environment as a match using virtual reality (VR) technique is viewed on a head mounted display.

In a conventional virtual training method, a video of a scene manually selected from prepared video by a coach or a player is viewed. For efficient training, however, it is important to decide a scene that should be intensively practiced in response to a player's motion.

In view of the foregoing, an object of the sixth embodiment is to provide a video presentation technique capable of deciding a scene to be presented to the user based on a response of the user.

To accomplish the object, the video presentation apparatus in the sixth embodiment is a video presentation apparatus that presents to a user a video of another party launching a flying object, the video presentation apparatus including: a user state storage that stores a user state representing a physical behavior of the user and scene information representing a scene of the other party launching the flying object in association with each other; a user state acquisition unit that obtains a user response, which is a user state occurring as a response to the scene presented to the user; a presentation management unit that obtains presentation scene information which is scene information associated with the user response, from the user state storage; and a video presentation unit that generates a video to be presented to the user based on the presentation scene information.

The sixth embodiment aims at improving sports performance through virtual experience. Assume here a situation where an action of another party and associated movement of a ball occur in a certain phase of a sport, and one is trained for an action to handle it. For example, assume a situation such as a baseball batter hitting a ball thrown by a pitcher, a soccer keeper catching a ball kicked by a kicker in a penalty kick, a tennis receiver hitting back a ball hit by a server, or a volleyball receiver receiving a ball hit by a server. Hereinafter, a person that launches a ball, such as a pitcher, kicker, and server as listed above, will be referred to as "opponent player" or just "another party". Also, a video equivalent to a single pitch will be referred to as "scene". A "scene" may be a video captured in a real environment, or may be a virtual video created with computer graphics (CG) based on information in which three-dimensional position information of an object or person as a subject is chronologically arranged. Alternatively, it may be a video of a virtual environment in which a live-action video and a CG video are synthesized in combination.

Sports to which the sixth embodiment is applicable are not limited to sports that use a ball, such as those mentioned above. It may be applicable to sports and situations in general where some object is launched from another party, such as Frisbee, for example. Hereinafter, an object that is launched by an opponent player, including a ball or Frisbee as described above, will be collectively referred to as "flying object".

The video presentation apparatus in the sixth embodiment is an information processing device that, in the case of baseball for example, presents a scene of a pitcher delivering a pitch to the user when the user enters a signal for requesting a next scene from an input device such as a keyboard. In the case of tennis, it similarly presents a scene of a server making a serve to the user when the user enters a signal for requesting a next scene from an input device such as a keyboard. The user wears a head mounted display to view the scene presented by the video presentation apparatus. The video to be presented on the head mounted display is decided in accordance with the user's physical states, such as the position and posture of the user's head.

Figure 20:
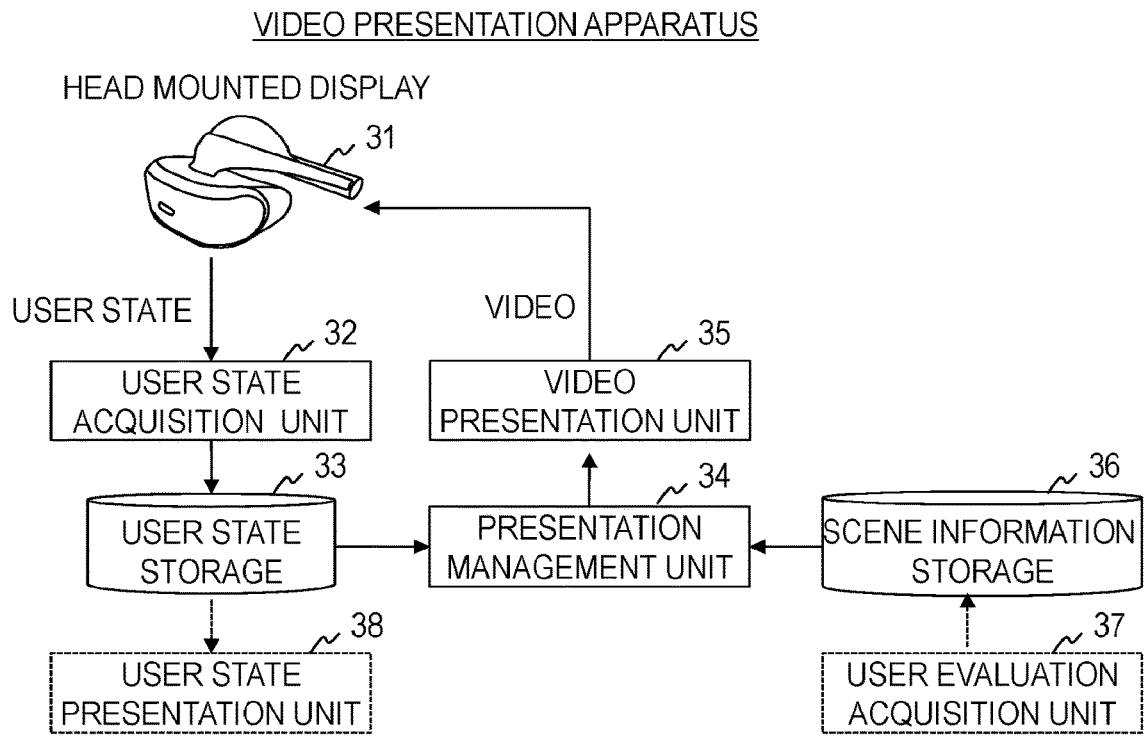
FIG. 20 is a diagram illustrating a functional configuration of a video presentation apparatus in a sixth embodiment.

The video presentation apparatus in the sixth embodiment includes a head mounted display 31, a user state acquisition unit 32, a user state storage 33, a presentation management unit 34, a video presentation unit 35, and a scene information storage 36 as shown in FIG. 20. The video presentation apparatus may further include a user evaluation acquisition unit 37 and a user state presentation unit 38. By the video presentation apparatus performing the processes at steps shown in FIG. 21, a video presentation method in the sixth embodiment is implemented.

The video presentation apparatus is a special device configured by loading of a special program into a known or dedicated computer having a central processing unit (CPU), main memory (random access memory or RAM), and the like, for example. The video presentation apparatus executes various kinds of processing under control of the central processing unit, for example. Data input to the video presentation apparatus and/or data resulting from various kinds of processing are stored in the main memory, for example, and data stored in the main memory is read as required to be utilized for other processing. Also, at least part of the processing components of the video presentation apparatus may be formed of hardware such as an integrated circuit. The storages provided in the video presentation apparatus may be formed of main memory such as random access memory (RAM), an auxiliary storage device formed of a hard disk, optical disk, or a semiconductor memory device such as a flash memory, or middleware such as a relational database or a key value store, for example. The storages provided in the video presentation apparatus may be each logically partitioned or they may be stored in a single physical storage device.

The head mounted display 31 is a device to be worn on the user's head for viewing video and/or hearing sound. The head mounted display 31 has a display in an area corresponding to the field of view when worn by the user and a headset at positions corresponding to the ears, for example. The head mounted display 31 contains various sensors, such as an acceleration sensor or displacement sensor, so that the position and posture of the head can be recognized when the user wears it. This enables the head mounted display 31 to present a video aligned with the user's viewpoint.

The user state storage 33 has stored a user state database therein. The user state database is a database that accumulates user states representing the physical behaviors of the user and scene information representing scenes to be presented to the user in association with each other. The user state database is specifically a table composed of view ID, scene ID, a number of views, and user state, as shown in the table below.

TABLE 1

| View ID | Scene ID | Number of views | User state |
|---------|----------|-----------------|------------|
| 1 | 2 | 1 | a |
| 2 | 1 | 1 | b |
| 3 | 2 | 2 | c |
| 4 | 2 | 3 | d |
| 5 | 1 | 2 | e |
| ... | ... | ... | ... |

The view ID is a unique sequential number that is assigned upon each viewing of one scene. The scene ID is a number assigned to each scene for identifying that scene. The number of views is a numerical value representing the number of times the scene has been viewed. The user state is time series information representing the physical behavior of the user at the time of viewing the scene.

The user state will be described in greater detail. The user state may be the position and posture of the head, whole body posture, or weight transfer, for example. The position and posture of the head can be obtained from the head mounted display 31. The whole body posture can be obtained using a motion capture system, such as products from VICON, for example (see Reference Literature 3). Weight transfer can be obtained using a balance evaluation system such as a force plate. Since the position and posture of the head are essential information for the head mounted display 31 to present a video as mentioned above, the user state includes at least the position and posture of the head. Other physical behaviors, including whole body posture and weight transfer, can be optionally added for acquisition of more detailed user states.

Reference Literature 3: Vicon Motion Systems Ltd., "Motion Capture Systems VICON", [online], [searched on Oct. 20, 2016], the Internet <URL: https://www.vicon.com/>

The scene information storage 36 has stored therein a scene information database. The scene information database is a database accumulating scene information representing the details of scenes to be presented to the user. The scene information database is specifically a table composed of scene ID, pitch type, ball speed, path, key bind, and practice probability as shown in the table below.

TABLE 2

| Scene ID | Pitch type | Ball speed | Path | Key bind | Practice probability |
|----------|------------|------------|------|----------|----------------------|
| 1 | Straight ball | 150 km/h | Inside high | "z" | 0.1 |
| 2 | Curveball | 110 km/h | Outside low | "x" | 0.08 |
| 3 | Straight ball | 135 km/h | Middle low | "c" | 0.03 |
| ... | ... | ... | ... | ... | ... |

The scene ID is a number assigned to each scene for identifying the scene. The scene ID is linked with a scene ID in the user state database. Pitch type is the pitch type of a ball pitched in the scene. Ball speed is the speed of a ball pitched in the scene. Path is the course of a ball pitched in the scene. Key bind is the type of a key which is pressed by the user in a normal mode, which is discussed later. The practice probability is a probability value for use in selecting a scene for presentation in a feedback mode, which is discussed later. The practice probability is set so that the total sum across the database is 1, and is initialized to be uniform in an initial state.

Figure 21:
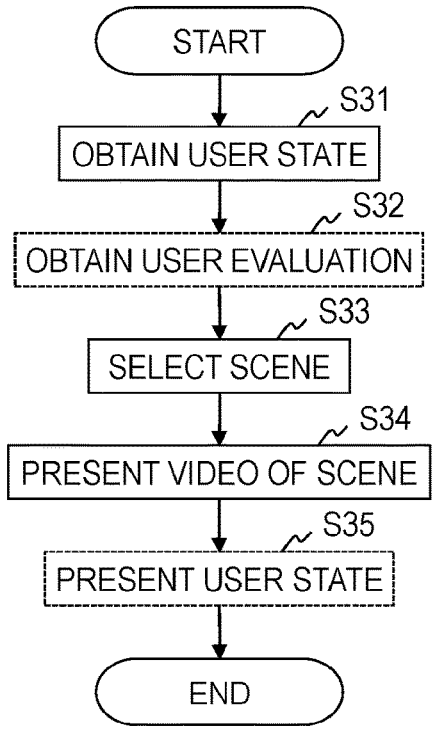
FIG. 21 is a diagram illustrating a processing procedure of a video presentation method in the sixth embodiment.

Referring to FIG. 21, the processing procedure of the video presentation method performed by the video presentation apparatus in the sixth embodiment will be described below.

At step S31, the user state acquisition unit 32 of the video presentation apparatus obtains and outputs a user state representing a physical behavior of the user. At the same time, the user state acquisition unit 32 accumulates scene information representing the most recently presented scene in association with a user state that was obtained while the user was viewing that scene in the user state database stored in the user state storage 33. Hereinafter, a user state exhibited by the user as a response during viewing of the most recently presented scene will be referred to as user response. The obtained user response is sent to the presentation management unit 34.

If there are multiple user states associated with a certain scene in the user state database, it means that the user state for that scene is not stable (that is, practice for that scene is insufficient); thus, the practice probability in the scene information database is increased so that the scene will be presented more. The practice probability may be increased in any manner. As an example, the practice probability is increased by a predefined rate a from the current value. Assuming that the current practice probability of scene information for which the practice probability is increased is x, the practice probability after being increased will be ax. Here, since the sum of the practice probabilities of all the scenes is 1+ax−x, the practice probabilities of all the scenes are multiplied by 1/(1+ax−x) so that the sum is 1. The value of a is about 1.1, for example.

At step S33, the presentation management unit 34 of the video presentation apparatus decides and outputs scene information representing the scene to be presented to the user (hereinafter referred to as presentation scene information). The way the presentation management unit 34 decides the presentation scene information is different when in the normal mode and when in the feedback mode. Mode setting is made by mammal operation of an input device, such as a keyboard, by the user.

In the normal mode, when the user performs a key entry for requesting the next scene from an input device such as a keyboard, the presentation management unit 34 obtains and outputs scene information associated with the entered key in advance from the scene information database stored in the scene information storage 36. For example, assuming that the scene information shown in Table 2 is stored in the scene information database, when the user enters "z" key, scene information representing a scene of pitching a 150-km/h straight ball inside high will be output. Here, multiple scenes may be set for one key and settings may be made such that a time series of scenes of multiple pitches is presented for a single key entry.

In the feedback mode, the presentation management unit 34 takes a user response obtained by the user state acquisition unit 32 as input, and obtains and outputs scene information associated with the user response from the user state database stored in the user state storage 33. For example, assuming the user states shown in Table 1 are stored in the user state database and the scene information shown in Table 2 is stored in the scene information database, when the user response "c" is input, a scene of pitching a 110-km/h curveball outside low will be presented to the user.

When multiple scenes are associated with a certain user state in the user information database, presentation scene information is selected based on the practice probability in the scene information database. Here, settings may be made such that the probability of appearance of a scene is varied by aggregating the most recently presented multiple scenes in consideration of connection between the scenes. For example, a ball at 140 km/h is perceived to be slow after seeing a ball at 160 km/h but perceived to be fast immediately after seeing a ball at 100 km/h. By presenting multiple scenes as a package taking such continuity into consideration, more efficient training becomes possible.

At step S34, based on the presentation scene information obtained by the presentation management unit 34, the video presentation unit 35 of the video presentation apparatus generates a video of the scene corresponding to that presentation scene information and outputs it to the head mounted display 31. This enables the user to view the scene being presented by the video presentation apparatus via the head mounted display 31. The video for presentation may be a live-action video of a scene of a pitcher's actual pitching captured from the position of the batter's box, or a video of a virtual environment generated by synthesis of constituent materials based on scene information as follows. First, objects for constituting a virtual environment, such as a ball and a stadium, are referred to as constituent materials, and CG data for reproducing each such constituent material in a virtual environment are prestored as virtual environment material. A virtual environment material is not limited to CG data but may also be a moving image or still image data clipped from an actually captured video. Position and posture information relating to a constituent material is prestored as well. The video presentation unit 35 reads virtual environment materials to be arranged in a virtual environment, and arranges the virtual environment material of a static object, which does not temporally change, in the virtual environment in accordance with its position and posture information. At the same time, the video presentation unit 35 arranges the virtual environment material of a dynamic object involving temporal change, such as an opponent player or a flying object, in the virtual environment based on the pitch type, ball speed, and path specified in scene information. Here, a configuration is also possible which controls the line of sight in the virtual environment based on the position and posture of the head obtained by the user state acquisition unit 32.

Modification 1 of the Sixth Embodiment

In modification 1, a user's self-evaluation for each scene is obtained and used in selection of a scene for presentation, thereby allowing the user to more intensively practice a scene that user thinks he or she is not good at. The video presentation apparatus of modification 1 further includes the user evaluation acquisition unit 37 in addition to the processing components of the video presentation apparatus according to the embodiment.

At step S32, the user evaluation acquisition unit 37 of the video presentation apparatus obtains a self-evaluation for the immediately preceding scene entered by the user from an input device such as a keyboard. Possible values of self-evaluation may be 2-grade evaluation like done well/failed to do well, or 5-grade evaluation, where integers from 1 to 5 are used and a greater value indicates that the user did better, for example. The user evaluation acquisition unit 37 adjusts the practice probability in the scene information database based on the self-evaluation obtained. For example, the practice probability for a scene with low self-evaluation is increased and the practice probability for a scene with high self-evaluation is decreased. As a result, a scene for which the self-evaluation is low and the user thinks he or she is not good at will be presented more frequently, while a scene for which the self-evaluation is high and the user thinks he or she is good at will be presented less frequently.

The user evaluation acquisition unit 37 may also estimate an evaluation value based on a user state obtained by the user state acquisition unit 32, thus eliminating the necessity for input of self-evaluation from the user. For example, a classifier is learned in advance using user states for which the user has manually assigned self-evaluations as learning data, and the classifier is used to classify an input user state and estimate an evaluation value. In this case, self-evaluations just enough for completion of learning have to be collected, so that input of self-evaluations by the user can be done in a certain amount of time. The certain amount of time may be until an error in learning of user states obtained converges below a threshold, or may be defined as the first thirty pitches. As a user state is chronological transition, a learning machine capable of handling time series information, such as a recurrent neural network, may be employed, or a certain number of user states may be re-sampled and learned via a support vector machine (SVM) or the like. For example, it is possible to re-sample user states during 0.4 seconds before catching of a ball at 30 fps (that is, twelve samples) and make binary classification into good/poor using a SVM with user states of a-dimensions (for example, six dimensions for the head's position and posture) as input. This enables self-evaluation to be estimated from a user state even without input of self-evaluation from the user.

Modification 2 of the Sixth Embodiment

Modification 2 is configured to present an obtained user state to enable the user to check his or her state. The video presentation apparatus of modification 2 further includes the user state presentation unit 38 in addition to the processing components of the video presentation apparatus according to the embodiment.

At step S35, the user state presentation unit 38 of the video presentation apparatus outputs a user state obtained by the user state acquisition unit 32 or a user state accumulated in the user state storage 33 to the head mounted display 31 or an extrinsic display unit, such as a liquid crystal display, connected to the video presentation apparatus. The user state may be displayed in any manner. For example, a method presenting the temporal transition of one user state as a time series graph (method 1), a method presenting the temporal transition of predefined N user states as a time series graph (method 2), and a method presenting the temporal transition of predefined N user states as an average and a distribution (method 3) can be considered.

Figure 22A:
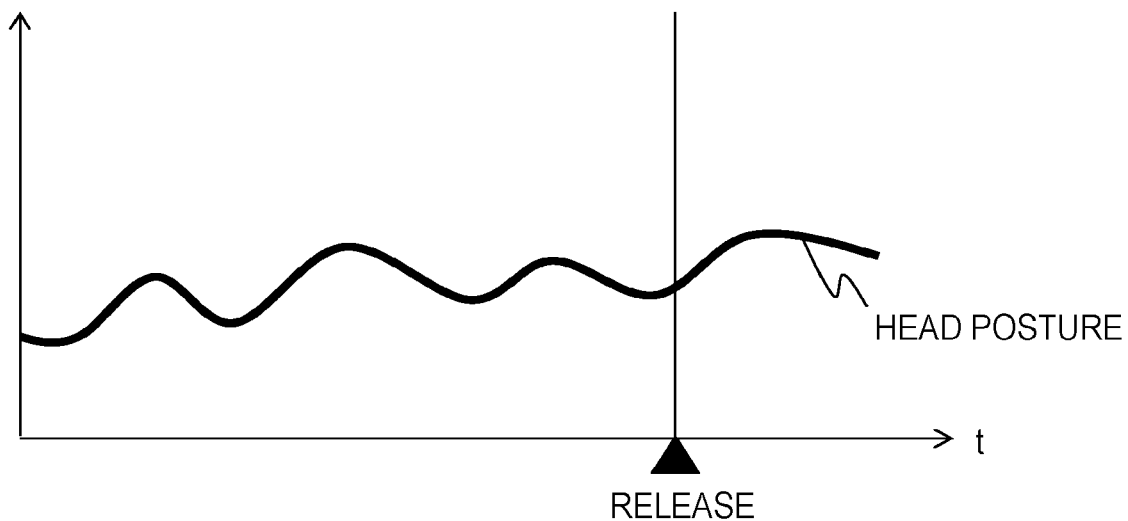
FIG. 22A and FIG. 22B is a diagram showing a specific example of user state.
Figure 22B:
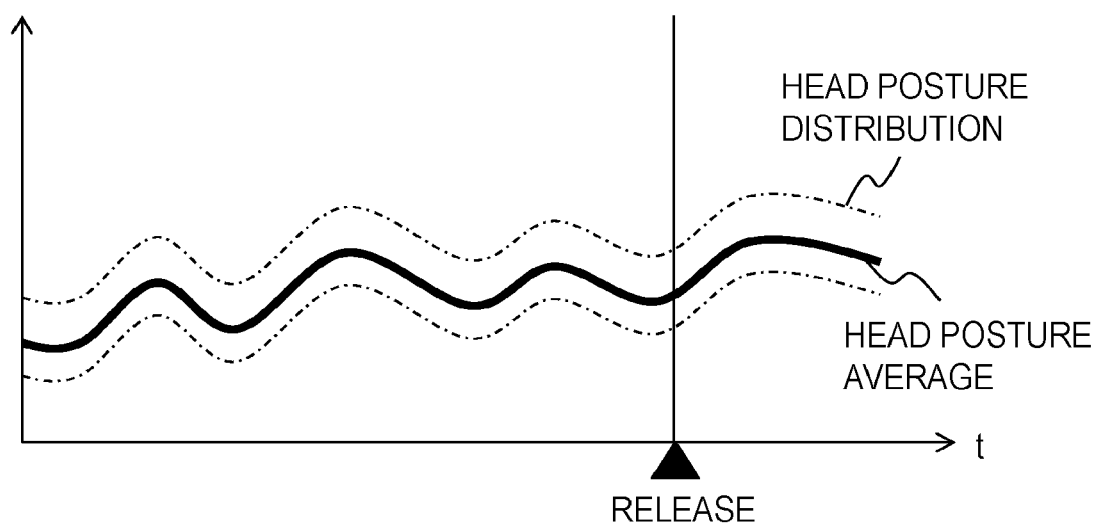

FIG. 22A is an example of plotting of transition of a user state (head posture) with the method 1. The vertical axis is an absolute coordinate value and the horizontal axis is time. FIG. 22 indicates that an opponent player launched a flying object at the time indicated by "release". Such visualization enables comparison with other players by visualization of behavior in the batter's box in the case of baseball, for example. In the case of presenting multiple instances as in the method 2, multiple graphs like the one in FIG. 22A will follow one after another. FIG. 22B is an example of plotting of transition of a user state (head posture) corresponding to multiple instances by the method 3. It is generated by collecting user states corresponding to multiple instances in response to the same scene and plotting the average and the distribution of them. It enables analysis such as the behavior largely varying and being unstable when the distribution is large, for example.

Figure 23:
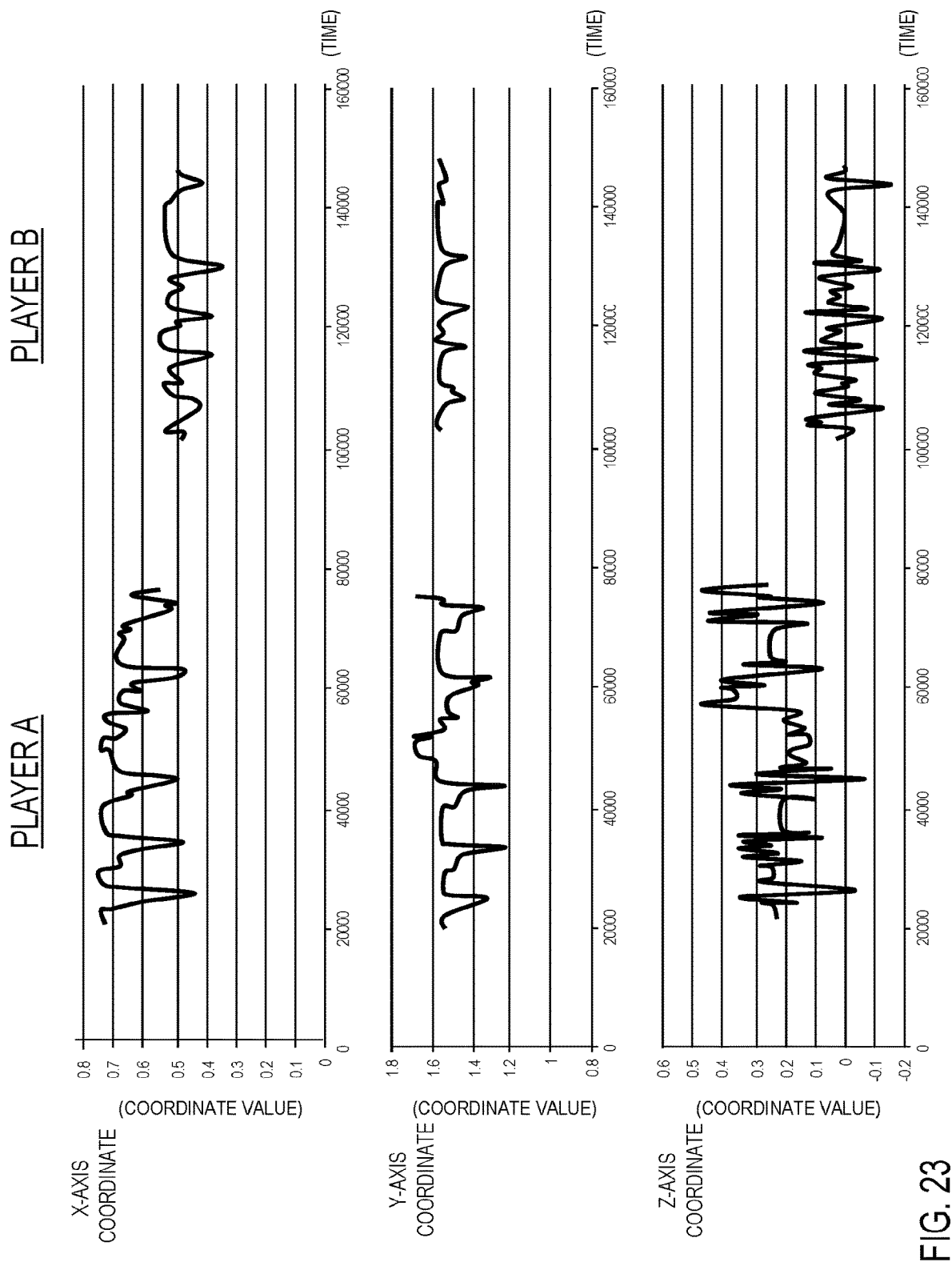
FIG. 23 is a diagram showing a specific example of user state.
Figure 24:
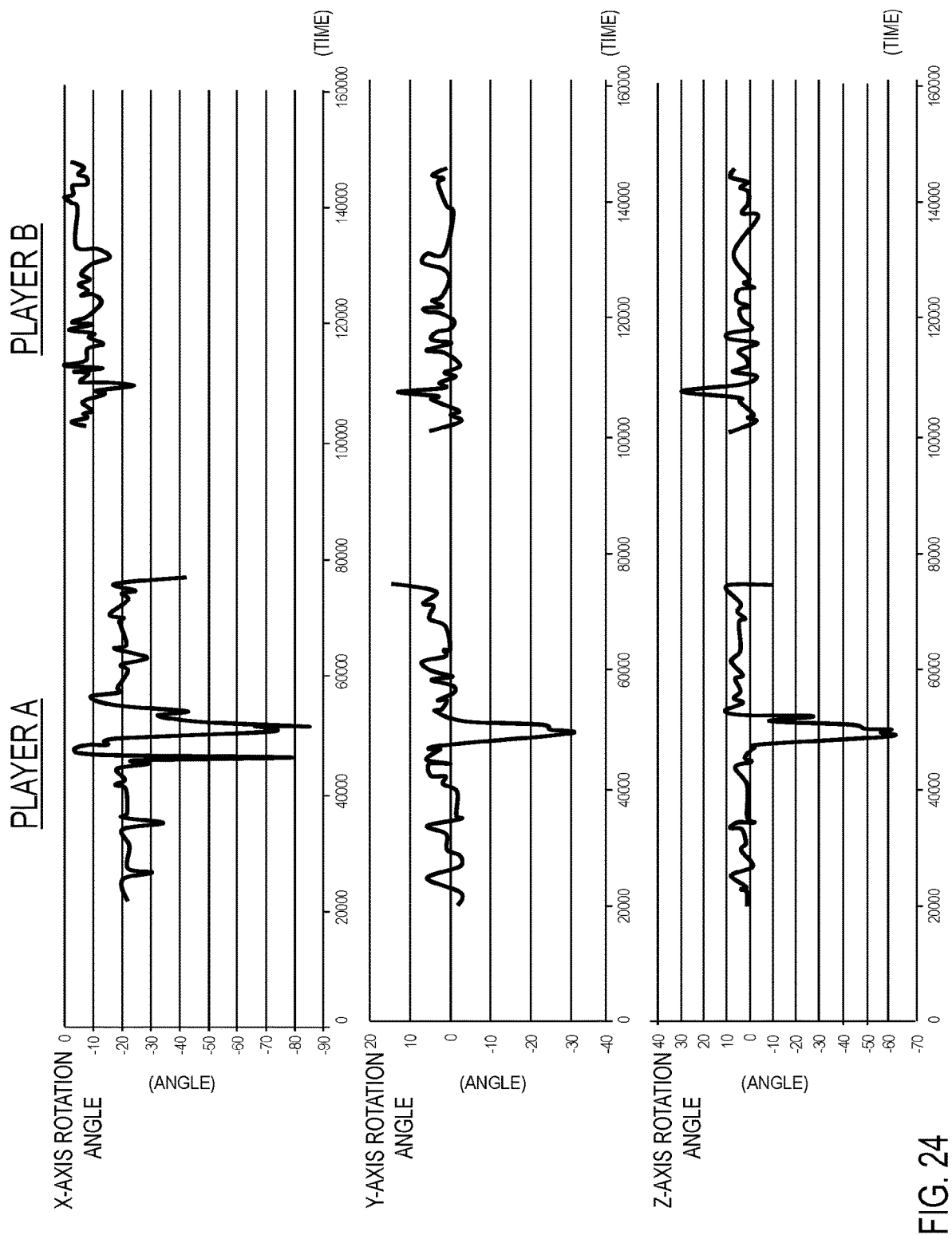
FIG. 24 is a diagram showing a specific example of user state.

FIGS. 23 and 24 are exemplary presentation of detailed user state in a case where the user state is the position and posture of the head. The head position is plotted on each of the x-axis, y-axis, and z-axis coordinate values (FIG. 23), and the head posture is plotted on each of the x-axis, y-axis, and z-axis rotation angles (FIG. 24). Arranging user states in these six dimensions for two different players (player A and player B) enables comparison and analysis thereof.

The video presentation technique of the sixth embodiment may be combined with the virtual environment construction techniques of the first to fifth embodiments.

As the sixth embodiment can decide a scene to be presented to the user based on the user's response to a certain scene, it enables efficient training.

Seventh Embodiment

In a sport match, one sometimes cannot fully exert his or her ability when encountering a first situation he or she has not experienced previously. In baseball, a situation where a player has trouble in handling a pitcher he or she meets for the first time can be described by the expression "weak to a first-time opponent". To address such a situation, it would be effective for the player to experience some pitches of the pitcher from the player's perspective beforehand in the same environment as an actual match.

It is however virtually difficult to preliminarily experience a next opponent's pitches in a complete fashion. For preliminarily experiencing a next opponent's pitches, a method for viewing a video of the opponent's past pitches captured from a stand and the like is known; however a video viewed in this method is different from the view seen by a player actually standing in the batter's box in terms of viewpoint and/or field of view, thus is not adequate as preliminary experience.

The aforementioned Non-patent Literature 1 discloses a method for realizing preliminary experience from a player's perspective. In the method, a camera capable of capturing a 360° panoramic image (hereinafter, referred to as an omnidirectional camera) is installed at the position of the player's perspective in the batter's box, and the player views a video from the player's perspective captured by the omnidirectional camera on a head mounted display.

However, since installation of an omnidirectional camera in the batter's box during a match is virtually difficult, the method of Non-patent Literature 1 is difficult to implement.

As a method for realizing preliminary experience other than that of Non-patent Literature 1, it is also possible to generate a virtual environment that reproduces a real environment entirely with CG, for example. However, to precisely create CG of players during play, players actually in play are required to wear accurate sensors; reproducing a real environment entirely with CG is fairly expensive. In contrast, reproducing players with simple CG data is also possible. However, CG data of reproduced players has unnatural motion and lacks the sense of realism, thus not being adequate for preliminary experience.

An object of the seventh embodiment is therefore to provide a virtual environment construction apparatus that is capable of easily generating a virtual environment with great sense of realism.

Assume that a dynamic material which is a material whose position transitions and that makes movements, a static material which is a material whose position does not transition and that makes no movements, and a special dynamic material which is a material whose position does not transition and that makes movements are present in a real environment. The virtual environment construction apparatus in the seventh embodiment is a virtual environment construction apparatus that generates a virtual environment reproducing such a real environment. The virtual environment construction apparatus according to a first aspect of the seventh embodiment includes a virtual material acquisition unit, a virtual dynamic material position/posture detection unit, a virtual special dynamic material generation unit, a synchronization unit, and a virtual environment generation unit.

The virtual material acquisition unit obtains a virtual dynamic material for reproducing an object which is a dynamic material on a virtual environment and a virtual static material for reproducing a static material on the virtual environment. The virtual dynamic material position/posture detection unit detects the position and posture of the virtual dynamic material to obtain its time series data. The virtual special dynamic material generation unit generates a virtual special dynamic material for reproducing a human, which is a special dynamic material, on the virtual environment based on a video capturing the real environment. The synchronization unit estimates the time of a moment at which the human and the object separate from each other by inputting at least one of a pre-separation image captured before separation between the human and the object and a post-separation image captured after separation between the human and the object into a model that has learned pairs of a video captured around a moment of separation between the human and the object at a high frame rate and the time of the moment of separation between the human and the object, and synchronizes the virtual dynamic material and the virtual special dynamic material based on the estimated time. The virtual environment generation unit generates a virtual environment based on the virtual static material, the synchronized virtual dynamic material, and the synchronized virtual special dynamic material.

The virtual environment construction apparatus according to a second aspect of the seventh embodiment includes a virtual material acquisition unit, a virtual dynamic material position/posture detection unit, a virtual special dynamic material generation unit, a synchronization unit, and a virtual environment generation unit. The virtual material acquisition unit obtains a virtual dynamic material for reproducing a dynamic material on a virtual environment, and a virtual static material for reproducing a static material on the virtual environment. The virtual dynamic material position/posture detection unit detects the position and posture of the virtual dynamic material to obtain its time series data. The virtual special dynamic material generation unit generates a virtual special dynamic material for reproducing a special dynamic material on the virtual environment based on a video capturing a real environment. The synchronization unit estimates the time of a moment at which a special dynamic material and a dynamic material separate from each other by inputting at least one of a pre-separation image captured before separation between the special dynamic material and the dynamic material and a post-separation image captured after separation between the special dynamic material and the dynamic material into a model that has learned pairs of a video captured around a moment of separation between the special dynamic material and the dynamic material at a high frame rate and the time of the moment of separation between the special dynamic material and the dynamic material, and synchronizes the virtual dynamic material and the virtual special dynamic material based on the estimated time. The virtual environment generation unit generates a virtual environment based on the virtual static material, the synchronized virtual dynamic material, and the synchronized virtual special dynamic material.

A model learning apparatus according to a third aspect of the seventh embodiment learns a model that outputs a time of a moment at which a human and an object separate from each other by means of a pair of a video captured around a moment of separation between the human and the object at a high frame rate and the time of the moment of separation between the human and the object, and using as input at least one of a pre-separation image captured before separation between the human and the object and a post-separation image captured after separation between the human and the object.

A model learning apparatus according to a fourth aspect of the seventh embodiment learns a model that outputs a time of a moment of separation between a special dynamic material which is a material whose position does not transition and that makes movements, and a dynamic material which is a material whose position transitions and that makes movements, by means of a pair of a video captured around a moment of separation between the special dynamic material and the dynamic material at a high frame rate and the time of the moment of separation between the special dynamic material and the dynamic material, and using as input at least one of a pre-separation image captured before separation between the special dynamic material and the dynamic material and a post-separation image captured after separation between the special dynamic material and the dynamic material.

In this embodiment, a human or an object that really exists, such as a pitcher, a ball, or a stadium, will be referred to as material. Among such materials, a material whose position transitions (with time) and that makes movements (for example, a ball) is referred to as dynamic material, a material whose position does not transition and that does not make movements (for example, a stadium, a scoreboard, a spectator stand) is referred to as static material, and a material whose position is considered to not transition but that makes movements while staying at the position (for example, a baseball pitcher or a tennis player hitting a serve) is referred to as special dynamic material.

Computer graphics data (CG data) for reproducing a material in a virtual environment is referred to as virtual material. Among virtual materials, a virtual material for reproducing a dynamic material on a virtual environment is referred to as virtual dynamic material, a virtual material for reproducing a static material on a virtual environment is referred to as virtual static material, and a virtual material for reproducing a special dynamic material on a virtual environment is referred to as virtual special dynamic material.

Figure 25:
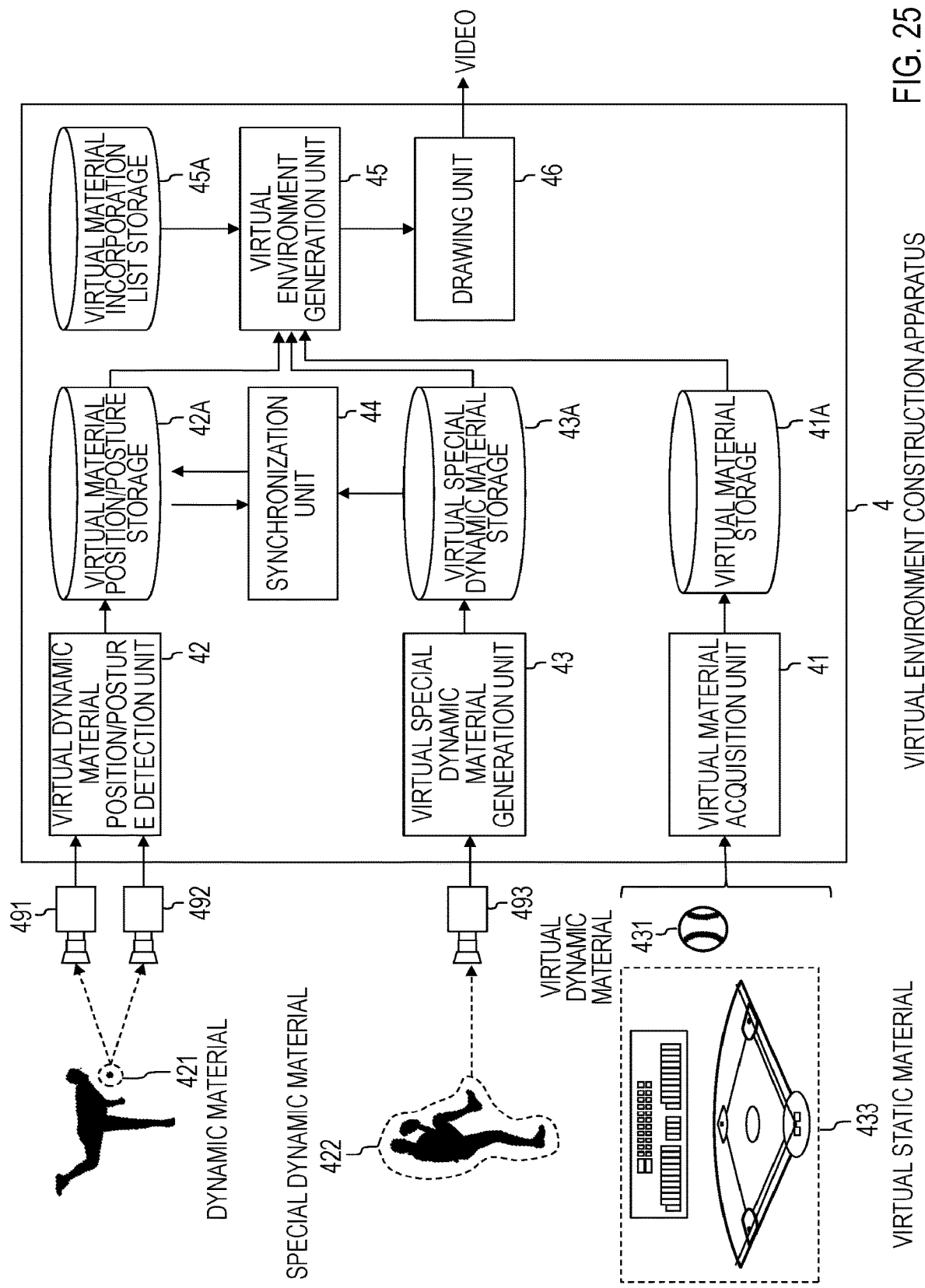
FIG. 25 is a block diagram showing a configuration of a virtual environment construction apparatus in a seventh embodiment.
Figure 26:
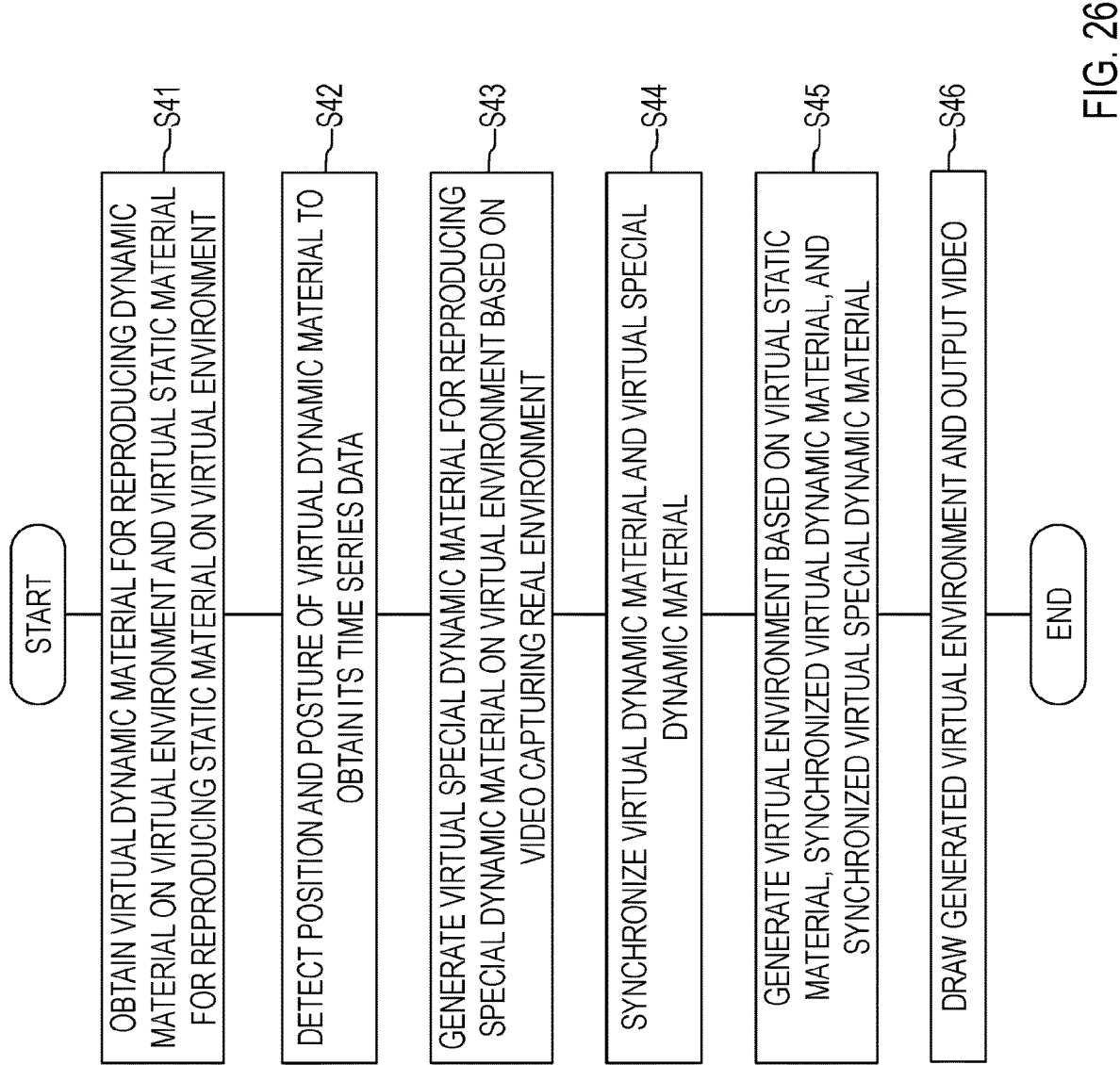
FIG. 26 is a flowchart showing the operation of the virtual environment construction apparatus in the seventh embodiment.

As shown in FIG. 25, a virtual environment construction apparatus 4 in the seventh embodiment includes a virtual material acquisition unit 41, a virtual material storage 41A, a virtual dynamic material position/posture detection unit 42, a virtual material position/posture storage 42A, a virtual special dynamic material generation unit 43, a virtual special dynamic material storage 43A, a synchronization unit 44, a virtual environment generation unit 45, a virtual material incorporation list storage 45A, and a drawing unit 46.

The virtual material acquisition unit 41 obtains a virtual dynamic material and a virtual static material (S41). As the virtual dynamic material and virtual static material are CG data necessary for generating a virtual environment, they are manually input to the virtual material acquisition unit 41 in advance, for example. The virtual dynamic material and virtual static material obtained at step S41 are stored in the virtual material storage 41A.

A dynamic material (for example, a baseball or a tennis ball) is captured by a first camera 491 and a second camera 492 shown in FIG. 25, for example. The virtual dynamic material position/posture detection unit 42 detects the position and posture of the virtual dynamic material corresponding to the dynamic material (for example, a path of CG data for a released baseball on a virtual space, or a path of CG data for a served tennis ball on a virtual space) to obtain its time series data, based on a video of the dynamic material (for example, a baseball or a tennis ball) captured by the first camera 491 and the second camera 492 shown in FIG. 25, for example (S42). The position and posture of the virtual dynamic material detected at step S42 are stored in the virtual material position/posture storage 42A. It is assumed that the virtual material position/posture storage 42A pre-stores the positions and postures of virtual static materials and virtual special dynamic materials (for example, the positions and postures for CG data of a stadium, scoreboard, or pitcher). The positions and postures of virtual static materials and virtual special dynamic materials may be manually input in advance.

A special dynamic material (for example, a baseball pitcher or a tennis player hitting a serve) is captured by a third camera 493 shown in FIG. 25, for example. The virtual special dynamic material generation unit 43 generates a virtual special dynamic material based on a video of the special dynamic material captured by the third camera 493 shown in FIG. 25, for example (S43). It is assumed that the virtual special dynamic material generation unit 43 creates simple CG data using a video of a special dynamic material. The details of the CG data generated at step S43 will be discussed later. The CG data (virtual special dynamic material) generated at step S43 is stored in the virtual special dynamic material storage 43A.

The synchronization unit 44 synchronizes the virtual dynamic material and the virtual special dynamic material (S44). The details of step S44 will be discussed later. The result of the synchronization at step S44 is stored in the virtual material position/posture storage 42A.

The virtual environment generation unit 45 generates a virtual environment based on the virtual static material, the synchronized virtual dynamic material, and the synchronized virtual special dynamic material (S45). The virtual environment generation unit 45 generates a virtual environment by arranging CG data based on position and posture information and synchronization information for each virtual material.

The drawing unit 46 draws the generated virtual environment and outputs it as a video such as an omnidirectional video (S46). In the following, the input, output, and processing operation of the individual components will be described in detail.

[Virtual material acquisition unit 41]
Input: Virtual static materials, virtual dynamic materials (source: an extrinsic device or the like, not shown)
Output: Virtual static materials, virtual dynamic materials (destination: the virtual material storage 41A)
Processing operation: The virtual material acquisition unit 41 obtains virtual static materials and virtual dynamic materials from an extrinsic device or the like, and stores the virtual static material and virtual dynamic materials it obtained in the virtual material storage 41A. It is assumed that virtual static materials and virtual dynamic materials are prepared in advance and input to the virtual material acquisition unit 41.

[Virtual Material Storage 41A]
Input: Virtual static materials, virtual dynamic materials (source: the virtual material acquisition unit 41)
Output: Virtual static materials, virtual dynamic materials (destination: the virtual environment generation unit 45)
Processing operation: The virtual material storage 41A stores the virtual static materials and virtual dynamic materials obtained by the virtual material acquisition unit 41 in association with virtual material IDs, and outputs virtual static materials and virtual dynamic materials in accordance with a request from the virtual environment generation unit 45. Specific examples of virtual static materials include CG data for a stadium in the case of baseball or CG data for a tennis court in the case of tennis. Specific examples of virtual dynamic materials include CG data for a baseball in the case of baseball or a tennis ball in the case of tennis.

[Virtual dynamic material position/posture detection unit 42]
Input: An output value of a sensor (a camera) (source: the first camera 491, the second camera 492, for example)
Output: The position and posture of a virtual dynamic material at each time (destination: the virtual material position/posture storage 42A)
Processing operation: The virtual dynamic material position/posture detection unit 42 estimates the position and posture of a dynamic material in the real environment based on an output value of a sensor (a camera), detects the position and posture of a virtual dynamic material corresponding to the dynamic material on a virtual space at each time based on the result of estimation, and obtains its time series data.

As mentioned above, multiple cameras (for example, the first camera 491, the second camera 492) can be utilized as sensors for estimating the three-dimensional position and posture of a dynamic material. A specific example of an approach that utilizes multiple cameras to compute three-dimensional position information of an object is one that employs triangulation. Specifically, for videos captured by a camera group that have undergone camera calibration in advance, the position of an object on the images is determined. Here, the position of the object on an image may be manually given, or the object may be detected via a detection approach such as template matching, and the center position thereof may be set as the position of the object. By applying triangulation using the positions detected on the images and camera parameters determined in camera calibration, the three-dimensional position of the object can be determined.

For posture information, to how much extent the object is rotated relative to a reference posture can be determined from details of the surface of the object captured (for example, stitches or a pattern on a ball). Another example of a sensor for determining the position and posture of a dynamic material can be a Doppler radar. As the Doppler radar is a well-known technique, detailed description of the Doppler radar is omitted. Any other sensors and approaches that are capable of obtaining three-dimensional position and posture information of an object may be used. Note that the position and posture of the dynamic material (for example, a baseball) estimated at step S42 are converted in the same step to a position and a posture of a corresponding virtual dynamic material (for example, CG data for the baseball) on a virtual space, and time series data relating to the position and posture of the virtual dynamic material is output.

[Virtual material position/posture storage 42A]

Input: Position and posture information and synchronization information for a virtual material (source: the virtual dynamic material position/posture detection unit 42, the synchronization unit 44)

Output: Position and posture information and synchronization information for the virtual material (destination: the synchronization unit 44, the virtual environment generation unit 45)

Processing operation: The virtual material position/posture storage 42A stores position and posture information and synchronization information for each virtual material. The virtual material position/posture storage 42A stores time series data obtained by the virtual dynamic material position/posture detection unit 42 as the position and posture of the virtual dynamic material at each time. In contrast, for position and posture information relating to static materials and special dynamic materials, whose position does not transition with time, such as a stadium, a ground, or a pitcher, the virtual material position/posture storage 42A stores data prepared in advance. Specifically, in the virtual material position/posture storage 42A, a virtual material position/posture information table (see FIG. 27) composed of records representing three-dimensional position and posture information of each virtual material at each time is stored.

The virtual material position/posture information table has a "material ID" uniquely identifying a material, a "virtual material ID" uniquely identifying a virtual material, and "position" and "posture" values of the virtual material at each "time", as shown in FIG. 27. The position is represented as a three-dimensional translation vector and the posture is represented as a three-dimensional vector representing a rotation angle with respect to each axis. For example, assuming baseball pitching, if material Oi represents a straight ball, virtual material Ei corresponding to the material Oi is CG data for a baseball stored in the virtual material storage 41A. Then, the position and posture corresponding to each time represent at which position on a virtual space and in which posture the CG data for a baseball is present at that time. More specifically, positions Ti(1) Ti(ti) represent a path of the CG data (virtual material Ei) for a baseball on a virtual space, and postures Ri(1), Ri(ti) represent how the CG data (virtual material Ei) for the baseball rotates on the virtual space. In FIG. 27, a virtual material with "-" stored in the time means that it is a virtual static material or a virtual special dynamic material, whose position or posture does not transition with time, such as a stadium and a pitcher. It is assumed that position and posture information of such a virtual material with no transition of position or posture is prestored. Also, a time defined for a virtual material represents the time elapsed since when the virtual material was incorporated into a virtual environment by the virtual environment generation unit 45, which is discussed later. Specifically, if the virtual environment generation unit 45 incorporates the virtual material Ei into the virtual environment at time ta, the position and posture of the virtual material Ei at time (ta+1) will be Ti(1) and Ri(1) respectively, and the position and posture of the virtual material Ei at time (ta+2) will be Ti(2) and Ri(2) respectively.

[Virtual Special Dynamic Material Generation Unit 43]

Input: Video (source: the third camera 493, for example)

Output: Virtual special dynamic materials (destination: the virtual special dynamic material storage 43A)

Processing operation: The virtual special dynamic material generation unit 43 takes a video captured by a camera (for example, the third camera 493) as input, pastes part or the all of the video to prepared CG data as texture to thereby create CG data based on live action, and outputs the CG data as a virtual special dynamic material.

Figure 28:
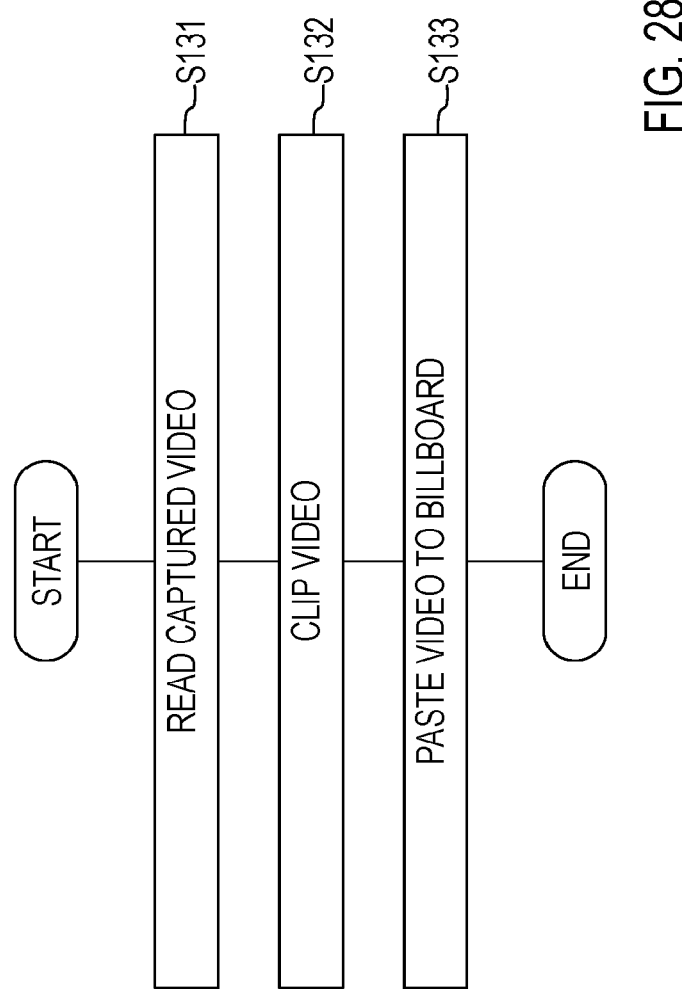
FIG. 28 is a flowchart showing an example of the operation of a virtual special dynamic material generation unit.

As a specific example, FIG. 28 shows the operations of the virtual special dynamic material generation unit 43 in the case of generating a virtual special dynamic material of a baseball pitcher.

In the example of FIG. 28, a rectangular plane (a billboard) is utilized as CG data serving as a base for pasting video. First, the virtual special dynamic material generation unit 43 reads video t' captured by a camera (for example, the third camera 493) (S131). Assume that the video V contains a pitcher. The virtual special dynamic material generation unit 43 then clips partial video V' from the video V (S132). An example of the region to be clipped can be a rectangular region containing a region in which the pitcher is present, for example. The size and/or position of the rectangular region may either be manually given in advance by a person viewing the video V or be automatically given. A method for automatically giving the size and/or position of the rectangular region can be background differential method, for example. Using the background differential method, the region in which the pitcher is present can be determined, and then a rectangular region may be defined so that it contains the region. Also, the region to be clipped is not limited to a rectangular region; only a region in which the pitcher is present may be clipped, for example. The aforementioned background differential method or the like can be employed as a method for clipping only the region in which the pitcher is present. Processing for clipping the partial video V' from the video V may be performed or not performed. When processing for clipping the partial video V' is not performed, it is deemed for the sake of convenience that the video V' has been obtained by clipping a rectangular region of the same size as the video V. Finally, the virtual special dynamic material generation unit 43 pastes the video V' on the rectangular plane (billboard) as texture (S133), and outputs the CG data as a virtual special dynamic material to the virtual special dynamic material storage 43A.

[Virtual special dynamic material storage 43A]

Input: Virtual special dynamic materials (source: the virtual special dynamic material generation unit 43)

Output: Virtual special dynamic materials (destination: the synchronization unit 44, the virtual environment generation unit 45)

Processing operation: The virtual special dynamic material storage 43A stores the virtual special dynamic material generated at step S43, and outputs a virtual special dynamic material to components in accordance with a request from the components.

[Synchronization unit 44]

Input: Virtual special dynamic materials (source: the virtual special dynamic material storage 43A), position and posture information of virtual dynamic materials (source: the virtual material position/posture storage 42A), and position and posture information of virtual special dynamic materials (source: the virtual material position/posture storage 42A)

Output: Synchronization information (destination: the virtual material position/posture storage 42A)

Processing operation: The synchronization unit 44 synchronizes a virtual special dynamic material (for example, CG data for a pitcher) and a virtual dynamic material relevant to the virtual special dynamic material (for example, CG data for a ball thrown by a pitcher). Another example of such combination can be CG data for a tennis player and CG data for a tennis ball served by that player. It is assumed that correspondence between a virtual special dynamic material and a virtual dynamic material is predefined. Synchronization is equivalent to determining a start time of synchronization between synchronization materials in the virtual material position/posture information table of FIG. 27.

As a specific example, consider synchronization between CG data for a pitcher and CG data for a ball thrown by that pitcher. In this case, in video V' pasted to a billboard as texture, the time of a moment at which the ball is released from the pitcher's hand may be set as the synchronization start time of the CG data for a ball as a synchronization material. Here, the time of the moment at which the ball is released from the hand may be determined using any method.

For example, template matching of the ball may be performed for each time of the texture (video V') and the time that is detected first may be set as the time of moment of ball release, namely the synchronization start time. Alternatively, template matching may be performed using a template of hand or arm form of the pitcher at the time of release for each time of the texture (video V') and the time that is detected first may be set as the synchronization start time.

Although the above method presumes that the moment of the pitcher releasing the ball is captured in video V', since the speed of swinging of the pitcher's arm is very high, the moment of release might not be captured in the resulting video V' at a common frame rate used for capturing a video (for example, 30 fps, 60 fps). If the moment of release is not captured in the video V', the time of release may be estimated from images before and after the release, instead of performing template matching for a ball, hand, or arm and setting the resulting time as the time of release as described above.

Methods for estimating the time of release from images before and after the release include a learning-based approach, for example. Specifically, the moment (time) of release is determined from images captured at a high frame rate (for example, 1000 fps) such that the moment of release is included, and multiple image pairs each consisting of a pre-release image and a post-release image corresponding to past and future times shifted by a predetermined number of frames relative to the moment (time) of release are created while varying the number of frames being shifted. Using the multiple image pairs and the moment (time) of release as teacher data, a model for determining the moment (time) of release from an image pair is learned. Using a thus learned model, the moment (time) of release can be estimated when a pair of a pre-release image at a low frame rate (also called a first image) and a post-release image at a low frame rate (also called a second image) is given. The model may be learned in any manner. For example, a linear classifier may be applied using coordinate values of a hand in a pre-release image and a post-release image, the direction of an arm, the position of the ball after release, and the like as feature amounts, or DNN may be applied including feature extraction.

Redefining step S44 with more general expression, the synchronization unit 44 extracts an image pair composed of the first image (a pre-release image), which is an image captured before separation (for example, the release) between a human (for example, a pitcher) and an object (for example, a ball), and the second image (a post-release image), which is an image captured after separation (for example, the release) between the human (for example, a pitcher) and the object (for example, a ball), from a video capturing a real environment (for example, video V'), matches the image pair against an already learned model to estimate the time at which the human (for example, a pitcher) and an object (for example, a ball) separate from each other (for example, the moment of release), and synchronizes a virtual dynamic material (for example, CG data for the ball) and a virtual special dynamic material (for example, CG data for the pitcher) based on the estimated time.

The model used for estimating the time of release from images before and after the release may be learned by the synchronization unit 44 in advance and stored therein, or may be learned by an extrinsic model learning apparatus different from the virtual environment construction apparatus in advance and stored in the synchronization unit 44.

Figure 29:
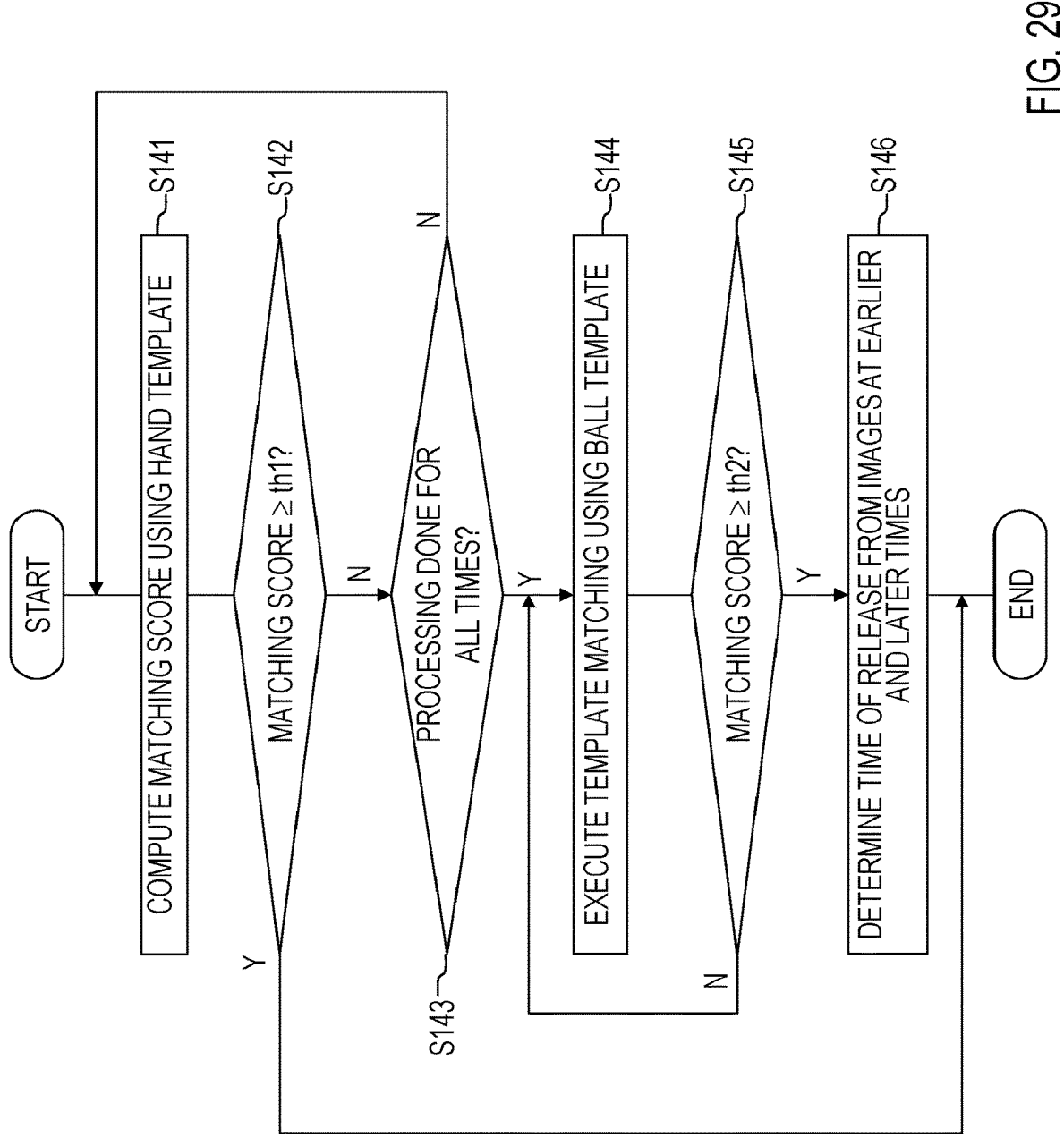
FIG. 29 is a flowchart showing an example of the operation of a synchronization unit.

An example of detection of the time of release using the above-described method is shown in FIG. 29. The synchronization unit 44 performs release determination for all the frames (for every time) of texture (video V') pasted to CG data for a pitcher. Specifically, the synchronization unit 44 executes template matching using a template of a pitcher's hand form at the time of release and computes a matching score (S141). If the matching score is equal to or greater than threshold th1 (S142Y, namely in the case of being similar), the time is set as the synchronization start time for the ball (end). The synchronization unit 44 performs the processing at step S141 for all the frames (for every time) of video V', and if a score equal to or greater than threshold th1 is not obtained for any of the frames of video V' (S143Y), the synchronization unit 44 executes template matching from the first frame (time) using a ball template and computes a matching score (S144). When the matching score is equal to or greater than threshold th2 (S145Y), the synchronization unit 44 sets the first time Ta at which the threshold th2 has been reached as a post-release time, and sets time Ta-1, one time earlier than time Ta, as a pre-release time (S146). The synchronization unit 44 estimates the time of release using an image pair composed of the first image at time Ta-1 and the second image at time Ta, and an already learned model (S146). The threshold th1 and threshold th2 are assumed to be predefined. The synchronization unit 44 sets the time estimated through the above process as the synchronization start time for synchronization materials in the virtual material position/posture information table shown in FIG. 27.

Redefining the operations at step S141 to S146 in the above-described flowchart with more general expression, the synchronization unit 44 estimates the time of separation (for example, the release) between the human (for example, a pitcher) and the object (for example, a ball) by executing template matching on a video capturing a real environment (for example, video V') using a first template (for example, a hand template) prepared in advance as a template for the human (for example, the pitcher)'s body at the moment of separation between the human (for example, the pitcher) and the object (for example, the ball) and a second template (for example, a ball template) prepared in advance as a template for the object (for example, the ball) at the moment of separation between the human (for example, the pitcher) and the object (for example, the ball), and synchronizes a virtual dynamic material and a virtual special dynamic material based on the estimated time. It is also possible to use only one of the first template (for example, a hand template) and the second template (for example, a ball template).

[Virtual environment generation unit 45]

Input: Virtual static materials (source: the virtual material storage 41A), virtual dynamic materials (source: the virtual material storage 41A), position and posture information of virtual materials (source: the virtual material position/posture storage 42A), virtual special dynamic materials (source: the virtual special dynamic material storage 43A), a virtual material incorporation list (source: the virtual material incorporation list storage 45A)

Output: Virtual environment data (destination: the drawing unit 46)

Processing operation: The virtual environment generation unit 45 reads virtual static materials and virtual dynamic materials from the virtual material storage 41A, reads position and posture information of each virtual material from the virtual material position/posture storage 42A, reads virtual special dynamic material from the virtual special dynamic material storage 43A, and merges them in accordance with the virtual material incorporation list to generate virtual environment data (S45).

The generated virtual environment data is sent to the drawing unit 46. The virtual environment data refers to data for a virtual space in which one or more virtual materials are arranged in a certain virtual space. The virtual environment generation unit 45 reads a virtual material incorporation list for generating a virtual environment from the virtual material incorporation list storage 45A. The virtual material incorporation list has a "virtual material ID" uniquely identifying a virtual material, and an "incorporation start time", which is the time at which the virtual material is incorporated into the virtual environment. It is assumed that the virtual material incorporation list is manually prepared in advance and prestored in the virtual material incorporation list storage 45A. The virtual environment generation unit 45 incorporates a virtual material into the virtual environment in accordance with the virtual material incorporation list. In doing so, the virtual environment generation unit 45 reads the position and posture of the virtual material from the virtual material position/posture storage 42A and arranges it on the virtual space based on the position and posture. After the virtual environment generation unit 45 has incorporated all the virtual materials described in virtual material incorporation list into the virtual environment, it ends processing.

[Drawing unit 46]

Input: Virtual environment data (source: the virtual environment generation unit 45)

Output: A video (destination: a video display device (not shown))

Processing operation: The drawing unit 46 draws virtual environment data generated at step S45 and outputs it in a state viewable by the user, for example, as a video (S46). The video output by the drawing unit 46 may be a video that sees one direction from a certain viewpoint in the virtual environment or a video that allows viewing in all directions like an omnidirectional video. For instance, in the case of outputting a video that sees one direction from a certain viewpoint, a perspective projection camera C may be virtually set at a certain position and CG data present in the virtual environment space may be projected onto the image plane of the camera C. Specifically, when T is a position as an extrinsic parameter of the camera C, R is the posture, and K is an intrinsic parameter, a certain point p within the space in which the virtual environment data exists will be projected as point q on the image plane of the camera C as follows.

$$q=K(Rp+T)$$

Here, the intrinsic parameter K is a 3×3 matrix composed of the focal distance and/or the image center of the camera C.

In the case of outputting an omnidirectional video that allows viewing in all the directions from a certain viewpoint, an omnidirectional camera O may be virtually set at the certain viewpoint and CG data present in the virtual environment space may be projected onto the image plane of the camera O. Specifically, when T is a position as an extrinsic parameter of the camera O, R is the posture, W is the width of the image plane of projection, and H is the height thereof, a certain point p within the space in which the virtual environment data exists will be projected as point $q=(q_x, q_y)^T$ onto the image plane of the camera O as follows.

$$p' = Rp + T = (p'_x p'_y p'_z)^T$$

$$q_x = \left(\frac{\theta W}{2\pi}\right) + \frac{W}{2}$$

$$q_y = \frac{\varphi H}{\pi}$$

where $$\theta = \arctan\left(\frac{p'_z}{p'_x}\right),$$

$$\varphi = \arccos\left(\frac{p'_y}{|p'|}\right)$$

While the present example employs equidistant cylindrical projection as a projection for representing an omnidirectional video as a two-dimensional image, other kinds of projection such as Mercator's projection may be employed.

The virtual environment construction apparatus in the seventh embodiment is capable of easily generating a virtual environment with great sense of realism.

Eighth Embodiment

In a sport match, one sometimes cannot fully exert his or her ability when encountering a first situation he or she has not experienced previously. In baseball, a situation where a player has trouble in handling a pitcher he or she meets for the first time can be described by the expression "weak to a first-time opponent". To address such a situation, it would be effective for the player to experience some pitches of the pitcher from the player's perspective beforehand in the same environment as an actual match.

It is however virtually difficult to preliminarily experience a next opponent's pitches in a complete fashion. For preliminarily experiencing a next opponent's pitches, a method for viewing a video of the opponent's past pitches captured from a stand and the like is known; however a video viewed in this method is different from the view seen by a player actually standing in the batter's box in terms of viewpoint and/or field of view, thus is not adequate as preliminary experience.

The aforementioned Non-patent Literature 1 discloses a method for realizing preliminary experience from a player's perspective. In the method, a camera capable of capturing a 360° panoramic image (hereinafter, referred to as an omnidirectional camera) is installed at the position of the player's perspective in the batter's box, and the player views a video from the player's perspective captured by the omnidirectional camera on a head mounted display.

However, since installation of an omnidirectional camera in the batter's box during a match is virtually difficult, the method of Non-patent Literature 1 is difficult to implement.

As a method for realizing preliminary experience other than that of Non-patent Literature 1, it is also possible to generate a virtual environment that reproduces a real environment entirely with CG, for example. However, to precisely create CG of players during play, players actually in play are required to wear accurate sensors; reproducing a real environment entirely with CG is fairly expensive. As a method for creating a virtual environment with great sense of realism in a simplified manner, the aforementioned Reference Literature 4 discloses a method of pasting a live-action video to CG data (a billboard) as texture in the case of a material that makes complicated motion, like a pitcher.

Figure 30:
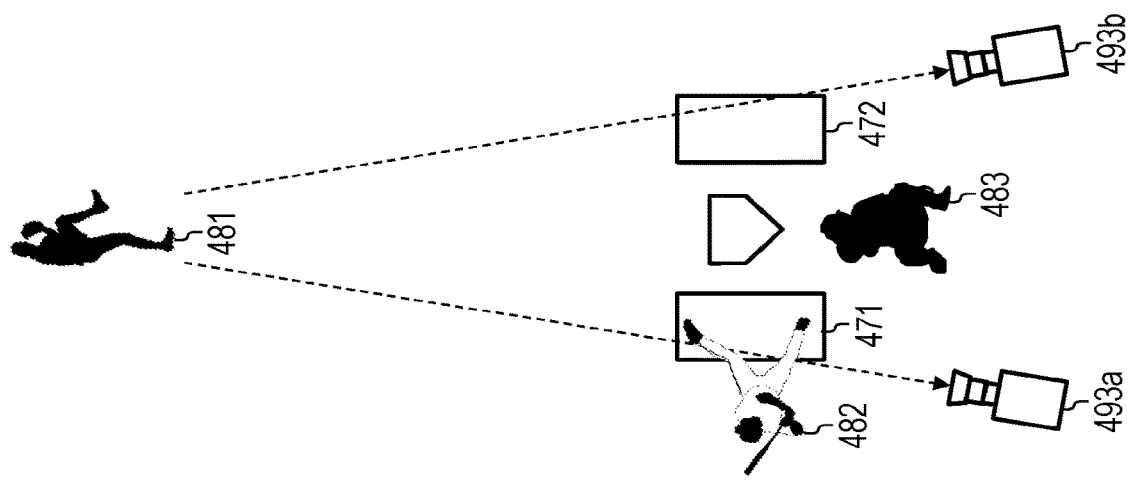
FIG. 30 is a schematic diagram showing an example of camera angle for reproducing the perspective of a batter standing in a batter's box.

For example, as shown in FIG. 30, imagine a case of generating a virtual environment for preliminary experience of a baseball batter 482 standing in a right batter's box 471. In this case, assuming that the pitcher 481 is rendered as CG using billboard representation based on a video captured by a camera, it is desirable that the angle of the camera capturing the pitcher 481 coincides with the direction seen by the batter 482 as much as possible. That is, it would be desirable that the camera is present on a straight line passing through pitcher 481 and the batter 482, and that the camera's image capturing direction is parallel with the straight line passing through the pitcher 481 and the batter 482, like a camera 493a. However, when the pitcher 481 is to be captured from the position of the camera 493a during an actual match, the batter 482 would be an occlusion, which leads a problem of increased sense of inconsistency of CG data created with a video captured by the camera 493a. As a way to avoid the occlusion of the batter 482, it is also possible to use a video captured from a different angle, such as by a camera 493b; however, since the camera 493b and the camera 493a have different viewpoints, this leads to the problem of increased sense of inconsistency concerning the orientation of the pitcher 481 in CG data created using a video captured by the camera 493b.

An object of the eighth embodiment is therefore to provide a virtual environment construction apparatus capable of generating a virtual environment with low sense of inconsistency.

Assume that a dynamic material which is a material whose position transitions and that makes movements, a static material which is a material whose position does not transition and that makes no movements, and a special dynamic material which is a material whose position does not transition and that makes movements are present in a real environment. The virtual environment construction apparatus in the eighth embodiment is a virtual environment construction apparatus that generates a virtual environment reproducing such a real environment. The virtual environment construction apparatus in the eighth embodiment includes a virtual material acquisition unit, a virtual dynamic material position/posture detection unit, a preliminary preparation unit, a similar video retrieval unit, a virtual special dynamic material generation unit, a synchronization unit, and a virtual environment generation unit.

The virtual material acquisition unit obtains a virtual dynamic material for reproducing a dynamic material on a virtual environment and a virtual static material for reproducing a static material on the virtual environment. The virtual dynamic material position/posture detection unit detects the position and posture of the virtual dynamic material to obtain its time series data. The preliminary preparation unit associates time series data obtained in a predefined preliminary preparation phase with a video of a special dynamic material relevant to the time series data. The similar video retrieval unit retrieves time series data of the preliminary preparation phase similar to time series data obtained in a predefined virtual environment generation phase, and outputs a video of a special dynamic material associated with the retrieved time series data. The virtual special dynamic material generation unit generates a virtual special dynamic material for reproducing the special dynamic material on a virtual environment based on the output video of the special dynamic material. The synchronization unit synchronizes the virtual dynamic material and the virtual special dynamic material. The virtual environment generation unit generates a virtual environment based on the virtual static material, the synchronized virtual dynamic material, and the synchronized virtual special dynamic material.

In the eighth embodiment, a human or an object that really exists, such as a pitcher, a ball, or a stadium, will be referred to as material. Among such materials, a material whose position transitions (with time) and that makes movements (for example, a ball) is referred to as dynamic material, a material whose position does not transition and that does not make movements (for example, a stadium, a scoreboard, a spectator stand) is referred to as static material, and a material whose position is considered to not transition but that makes movements while staying at the position (for example, a baseball pitcher or a tennis player hitting a serve) is referred to as special dynamic material.

Computer graphics data (CG data) for reproducing a material in a virtual environment is referred to as virtual material. Among virtual materials, a virtual material for reproducing a dynamic material on a virtual environment is referred to as virtual dynamic material, a virtual material for reproducing a static material on a virtual environment is referred to as virtual static material, and a virtual material for reproducing a special dynamic material on a virtual environment is referred to as virtual special dynamic material.

Figure 31:
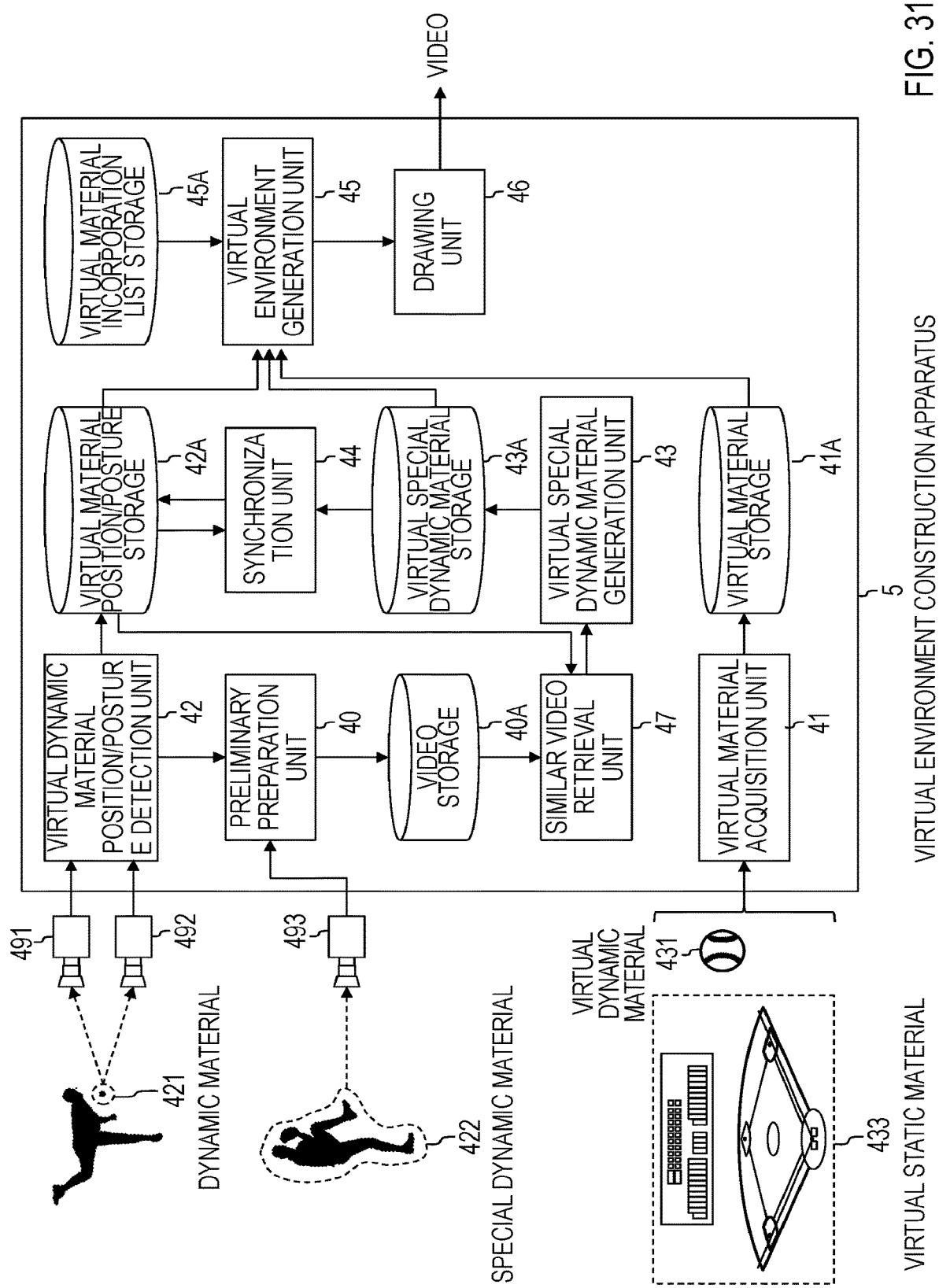
FIG. 31 is a block diagram showing a configuration of a virtual environment construction apparatus in an eighth embodiment.
Figure 32:
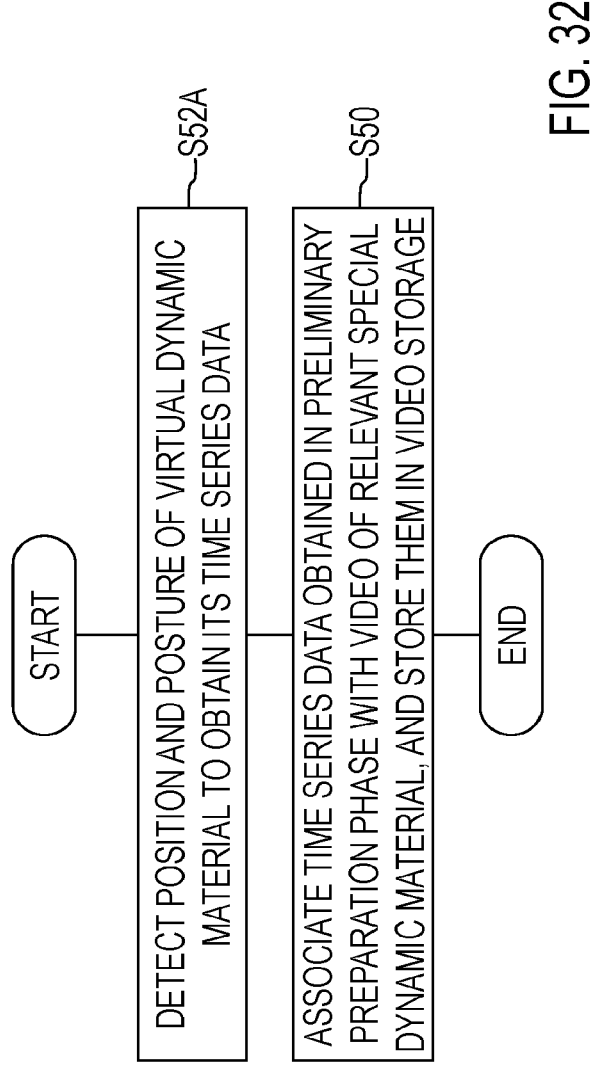
FIG. 32 is a flowchart showing the operation of the virtual environment construction apparatus in the eighth embodiment during a preliminary preparation phase.
Figure 34:
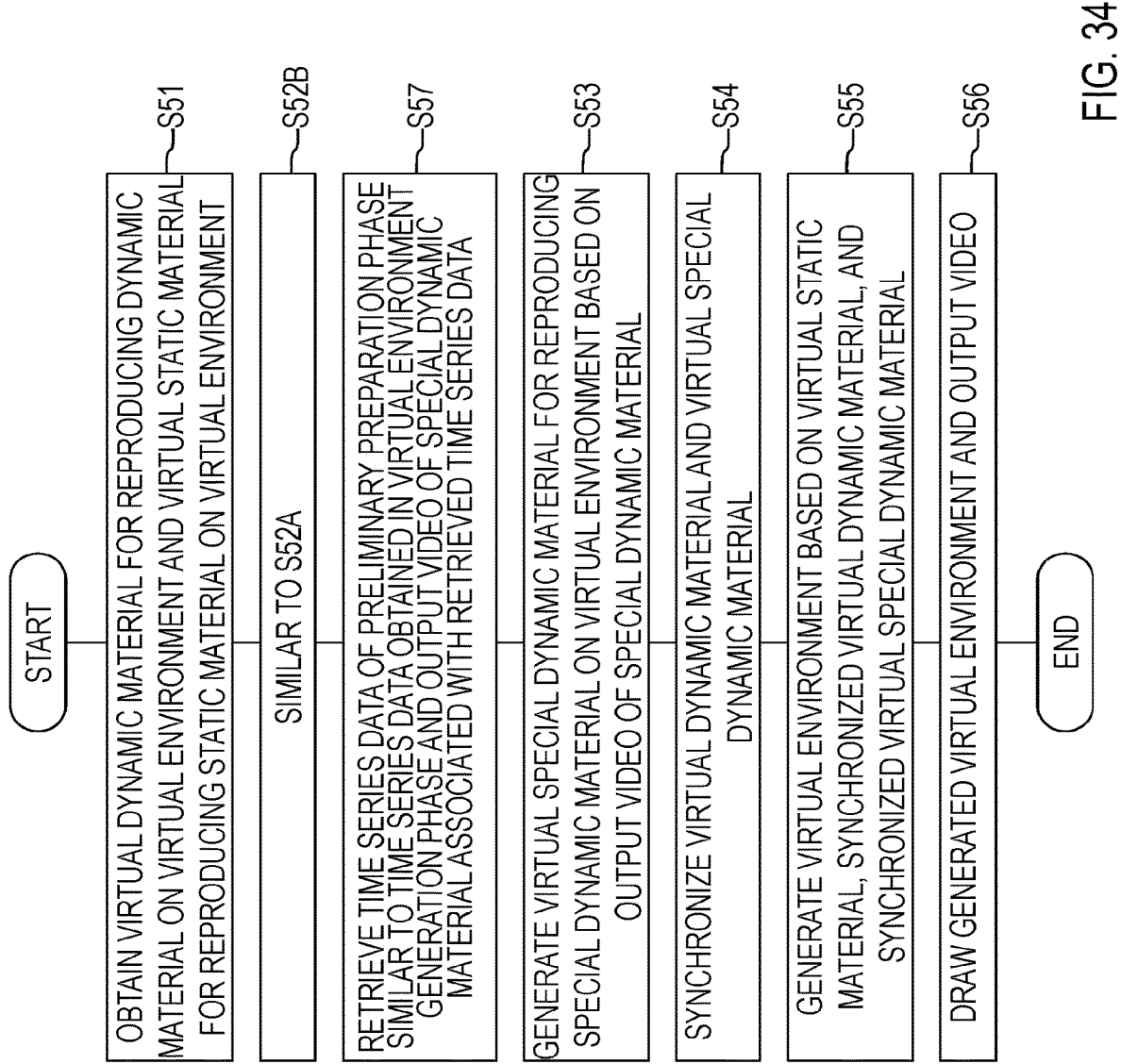
FIG. 34 is a flowchart showing the operation of the virtual environment construction apparatus in the eighth embodiment during a virtual environment generation phase.

A configuration of the virtual environment construction apparatus 5 in the eighth embodiment is shown in FIG. 31. In the eighth embodiment, one or more cameras are provided outside or inside the virtual environment construction apparatus 5. The at least one camera is installed on or near a straight line connecting between a subject of preliminary experience (hereinafter "subject of experience"; for example, the batter 482 in FIG. 30) and a subject to be captured in live-action video (hereinafter "image-capturing target"; for example, the pitcher 481 in FIG. 30) and is oriented in the direction of the image-capturing target, like the camera 493a in FIG. 30. In the example of FIG. 31, the first camera 491 and the second camera 492 for capturing dynamic materials and a third camera 493 for capturing special dynamic materials are provided outside the virtual environment construction apparatus 5, and the third camera 493 is installed on or near a straight line connecting between the subject of experience and the image-capturing target, like the camera 493a in FIG. 30. As discussed in more detail later, the first camera 491 and the second camera 492 may be replaced with other sensors.

The virtual environment construction apparatus 5 in the eighth embodiment includes a preliminary preparation unit 40, a video storage 40A, a virtual material acquisition unit 41, a virtual material storage 41A, a virtual dynamic material position/posture detection unit 42, a virtual material position/posture storage 42A, a similar video retrieval unit 47, a virtual special dynamic material generation unit 43, a virtual special dynamic material storage 43A, a synchronization unit 44, a virtual environment generation unit 45, a virtual material incorporation list storage 45A, and a drawing unit 46.

The operation of the virtual environment construction apparatus 5 in the eighth embodiment will be generally described. The following description takes baseball as an example, and assumes generation of a virtual environment that enables preliminary experience of a game in a right batter's box 471 with the batter 482 standing in the right batter's box 471, specifically as shown in FIG. 30. In this example, the operational flow of the virtual environment construction apparatus 5 can be roughly divided into two phases. One is the preliminary preparation phase. In the preliminary preparation phase, a video of the pitcher 481 and the path of a ball thrown by the pitcher 481 are saved in association with each other. The other is the virtual environment generation phase. In the virtual environment generation phase, virtual materials are combined to generate a virtual environment.

<Preliminary Preparation Phase>

In the preliminary preparation phase, a dynamic material (a ball) is captured by the first camera 491 and the second camera 492 shown in FIG. 31, for example. The virtual dynamic material position/posture detection unit 42 detects the position and posture of a virtual dynamic material corresponding to the dynamic material (the path of CG data for a released ball on a virtual space) and obtains its time series data based on videos of the dynamic material (the ball) captured by the first camera 491 and the second camera 492 shown in FIG. 31, for example (S52A).

A special dynamic material (a pitcher) is captured by the third camera 493 shown in FIG. 31, for example. The preliminary preparation unit 40 obtains a video of the special dynamic material (the pitcher) captured by the third camera 493 shown in FIG. 31, for example, and associates the time series data obtained at step S42A with a video of the special dynamic material (pitcher) relevant to it, and stores them in the video storage 40A (S50).

At step S50, a video of the special dynamic material (the pitcher) including no occlusion is selected. The preliminary preparation unit 40 may automatically select such a video or a video including no occlusion may be manually selected. For example, a video including no occlusion can be obtained by capturing a pitch from the angle of the camera 493a when the batter 482 is in the left batter's box 472. At step S42A, time series data corresponding to the special dynamic material (the pitcher) including no occlusion is obtained, and they are stored in the video storage 40A at step S50 in association with each other.

<Virtual Environment Generation Phase>

In the virtual environment generation phase, the virtual material acquisition unit 41 first obtains a virtual dynamic material and a virtual static material (S51). As virtual dynamic materials and virtual static materials are CG data necessary for generating a virtual environment, they are manually input to the virtual material acquisition unit 41 in advance, for example. The virtual dynamic material and the virtual static material obtained at step S51 are stored in the virtual material storage 41A.

A dynamic material (a ball) is captured by the first camera 491 and the second camera 492 in the aforementioned manner. The virtual dynamic material position/posture detection unit 42 detects the position and posture of the virtual dynamic material (the path of CG data for a baseball on a virtual space) and obtains its time series data (hereinafter also referred to as path data) as at step S52A (S52B). The position and posture of the virtual dynamic material detected at step S52B (time series data, path data) are stored in the virtual material position/posture storage 42A. The time series data (path data) at this point will be utilized as a query at step S47, which is discussed later. It is assumed that the virtual material position/posture storage 42A prestores positions and postures of virtual static materials and virtual special dynamic materials (for example, the positions and postures of CG data for a stadium, a scoreboard, and a pitcher). The positions and postures of virtual static materials and virtual special dynamic materials may also be manually input in advance.

The similar video retrieval unit 47 uses the time series data (path data) obtained at step S52B as a query to retrieve time series data (path data) of step S52A similar to it from the video storage 40A, and outputs a video of the special dynamic material (the pitcher) associated with the retrieved time series data (path data) (S57).

The virtual special dynamic material generation unit 43 generates a virtual special dynamic material based on the video of the special dynamic material output at step S57 (S53). It is assumed that the virtual special dynamic material generation unit 43 creates simple CG data using a video capturing the special dynamic material. The details of CG data generated at step S53 will be discussed later. The CG data (virtual special dynamic material) generated at step S53 is stored in the virtual special dynamic material storage 43A.

The synchronization unit 44 synchronizes the virtual dynamic material and the virtual special dynamic material (S54). The details of step S54 will be discussed later. The result of synchronization at step S54 is stored in the virtual material position/posture storage 42A.

The virtual environment generation unit 45 generates a virtual environment based on the virtual static material, the synchronized virtual dynamic material, and the synchronized virtual special dynamic material (S55). The virtual environment generation unit 45 generates a virtual environment by arranging CG data based on the position and posture information and synchronization information for each virtual material.

The drawing unit 46 draws the generated virtual environment and outputs it as a video such as an omnidirectional video (S56). The relationship between the pitcher and the ball in the above example can be considered as replaced with a player and a ball (or a shuttlecock or the like) in various ball sports, such as tennis, volleyball, table tennis, or badminton. In the following, the input, output, and processing operation of the individual components will be described in detail.

[Preliminary Preparation Unit 40]

Input: Time series data obtained in the preliminary preparation phase (source: the virtual dynamic material position/posture detection unit 42), and video V (source: the third camera 493)

Output: Time series data obtained in the preliminary preparation phase (destination: the video storage 40A), and video V (destination: the video storage 40A)

Processing operation: The preliminary preparation unit 40 associates the time series data (path data) for a virtual dynamic material (CG data for a ball) obtained in the preliminary preparation phase with video V of a special dynamic material (the pitcher) relevant to it, and stores them in the video storage 40A. It is assumed that video V contains a special dynamic material (the pitcher) as the image-capturing target. While in this example time series data (path data) represents a path of a virtual dynamic material (CG data for a ball) on a virtual space, time series data (path data) is not limited to this but may represent a path of a dynamic material that really exists (a real ball) on a real space. As discussed later, both a path on a real space and a path on a virtual space can be detected at step S52A (S52B).

[Video Storage 40A]
Input: Time series data obtained in the preliminary preparation phase (source: the preliminary preparation unit 40), video V (source: the preliminary preparation unit 40)
Output: Time series data obtained in the preliminary preparation phase (destination: the similar video retrieval unit 47), video V (destination: the similar video retrieval unit 47)
Processing operation: The video storage 40A obtains time series data (path data) and video V from the preliminary preparation unit 40, and stores them in association with each other. The video storage 40A outputs corresponding video V in accordance with a request (a query) from the similar video retrieval unit 47. Here, time series data similar to the query may be output together.

Specifically, the video storage 40A has stored therein a video information table composed of records relating to individual videos (see FIG. 33). As shown in FIG. 33, the video information table has a "video ID" uniquely identifying a video, a "relevant dynamic material ID" which is the ID of a dynamic material relevant to the video, and "position" and "posture" values at each "time". Notations of time, position, and posture are the same as in the virtual material position/posture information table discussed later. As an example of a video and a dynamic material relevant to it, if a pitcher is the subject to be captured in a video, then a dynamic material relevant to it will be a ball thrown by the pitcher. Such a correspondence is predefined in accordance with a virtual environment to be generated.

[Virtual Material Acquisition Unit 41]
Input: Virtual Static Materials, Virtual Dynamic Materials (Source: An Extrinsic Device or the Like, not Shown)
Output: Virtual static materials, virtual dynamic materials (destination: the virtual material storage 41A)
Processing operation: The virtual material acquisition unit 41 obtains virtual static materials and virtual dynamic materials from an extrinsic device or the like, and stores the virtual static material and virtual dynamic materials it obtained in the virtual material storage 41A. It is assumed that virtual static materials and virtual dynamic materials are prepared in advance and input to the virtual material acquisition unit 41.

[Virtual Material Storage 41A]
Input: Virtual Static Materials, Virtual Dynamic Materials (Source: The Virtual Material Acquisition Unit 41)
Output: Virtual static materials, virtual dynamic materials (destination: the virtual environment generation unit 45)
Processing operation: The virtual material storage 41A stores the virtual static materials and virtual dynamic materials obtained by the virtual material acquisition unit 41 in association with virtual material IDs, and outputs virtual static materials and virtual dynamic materials in accordance with a request from the virtual environment generation unit 45. Specific examples of virtual static materials include CG data for a stadium in the case of baseball or CG data for a tennis court in the case of tennis. Specific examples of virtual dynamic materials include CG data for a baseball in the case of baseball or a tennis ball in the case of tennis.

[Virtual Dynamic Material Position/Posture Detection Unit 42]
Input: An Output Value of a Sensor (a Camera) (Source: The First Camera 491, the Second Camera 492, for Example)
Output: The position and posture of a virtual dynamic material at each time (destination: the virtual material position/posture storage 42A)
Processing operation: The virtual dynamic material position/posture detection unit 42 estimates the position and posture of a dynamic material in the real environment based on an output value of a sensor (a camera), detects the position and posture of a virtual dynamic material corresponding to the dynamic material on a virtual space at each time based on the result of estimation, and obtains its time series data.

As mentioned above, multiple cameras (for example, the first camera 491, the second camera 492) can be utilized as sensors for estimating the three-dimensional position and posture of a dynamic material. A specific example of an approach that utilizes multiple cameras to compute three-dimensional position information of an object is one that employs triangulation. Specifically, for videos captured by a camera group that have undergone camera calibration in advance, the position of an object on the images is determined. Here, the position of the object on an image may be manually given, or the object may be detected via a detection approach such as template matching, and the center position thereof may be set as the position of the object. By applying triangulation using the positions detected on the images and camera parameters determined in camera calibration, the three-dimensional position of the object can be determined.

For posture information, to how much extent the object is rotated relative to a reference posture can be determined from details of the surface of the object captured (for example, stitches or a pattern on a ball). Another example of a sensor for determining the position and posture of a dynamic material can be a Doppler radar. As the Doppler radar is a well-known technique, detailed description of the Doppler radar is omitted. Any other sensors and approaches that are capable of obtaining three-dimensional position and posture information of an object may be used. Note that the position and posture of the dynamic material (for example, a baseball) estimated at step S52B are converted in the same step to a position and a posture of a corresponding virtual dynamic material (for example, CG data for the baseball) on a virtual space, and time series data relating to the position and posture of the virtual dynamic material is output.

[Virtual Material Position/Posture Storage 42A]
Input: Position and Posture Information and Synchronization Information for a Virtual Material (Source: The Virtual Dynamic Material Position/Posture Detection Unit 42, the Synchronization Unit 44)
Output: Position and posture information and synchronization information for the virtual material (destination: the synchronization unit 44, the virtual environment generation unit 45)
Processing operation: The virtual material position/posture storage 42A stores position and posture information and synchronization information for each virtual material. The virtual material position/posture storage 42A stores time series data obtained by the virtual dynamic material position/posture detection unit 42 as the position and posture of the virtual dynamic material at each time. In contrast, for position and posture information relating to static materials and special dynamic materials, whose position does not transition with time, such as a stadium, a ground, or a pitcher, the virtual material position/posture storage 42A stores data prepared in advance. Specifically, in the virtual material position/posture storage 42A, a virtual material position/posture information table (see FIG. 35) composed of records representing three-dimensional position and posture information of each virtual material at each time is stored.

The virtual material position/posture information table has a "material ID" uniquely identifying a material, a "virtual material ID" uniquely identifying a virtual material, and "position" and "posture" values of the virtual material at each "time", as shown in FIG. 35. The position is represented as a three-dimensional translation vector and the posture is represented as a three-dimensional vector representing a rotation angle with respect to each axis. For example, assuming baseball pitching, if material Oi represents a straight ball, virtual material Ei corresponding to the material Oi is CG data for a baseball stored in the virtual material storage 41A. Then, the position and posture corresponding to each time represent at which position on a virtual space and in which posture the CG data for a baseball is present at that time. More specifically, positions Ti(1), . . . , Ti(ti) represent a path of the CG data (virtual material Ei) for a baseball on a virtual space, and postures Ri(1), Ri(ti) represent how the CG data (virtual material Ei) for the baseball rotates on the virtual space. In FIG. 35, a virtual material with "-" stored in the time means that it is a virtual static material or a virtual special dynamic material, whose position or posture does not transition with time, such as a stadium and a pitcher. It is assumed that position and posture information of such a virtual material with no transition of position or posture is prestored. Also, a time defined for a virtual material represents the time elapsed since when the virtual material was incorporated into a virtual environment by the virtual environment generation unit 45, which is discussed later. Specifically, if the virtual environment generation unit 45 incorporates the virtual material Ei into the virtual environment at time ta, the position and posture of the virtual material Ei at time (ta+1) will be Ti(1) and Ri(1) respectively, and the position and posture of the virtual material Ei at time (ta+2) will be Ti(2) and Ri(2) respectively.

Figure 36:
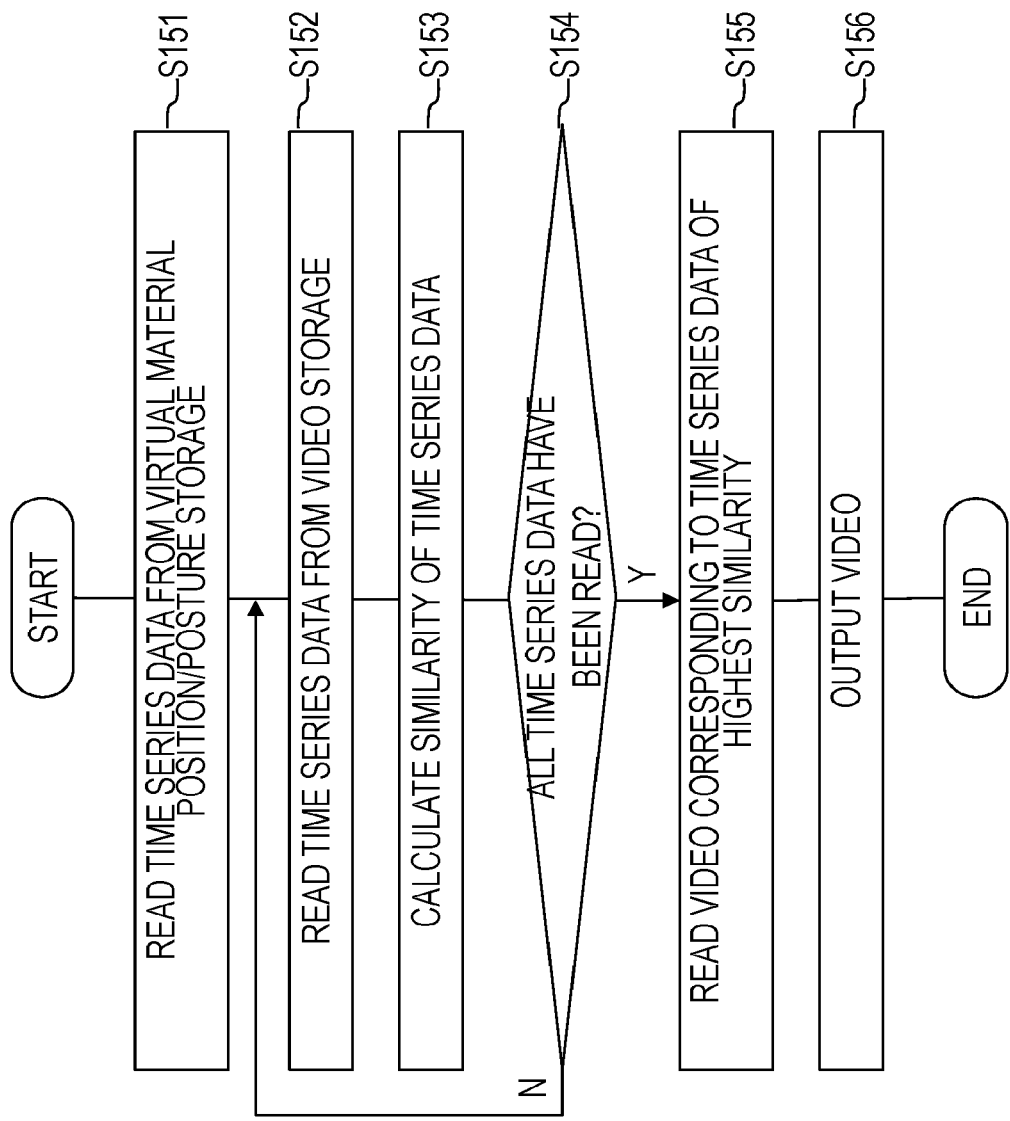
FIG. 36 is a flowchart showing an example of the operation of a similar video retrieval unit.

[Similar Video Retrieval Unit 47]
Input: Time series data obtained in the preliminary preparation phase (source: the video storage 40A), and video V (source: the video storage 40A)
Output: Video V (destination: the virtual special dynamic material generation unit 43)
Processing operation: An exemplary processing flow of the similar video retrieval unit 47 is shown in FIG. 36. The similar video retrieval unit 47 reads time series data (path data) from the virtual material position/posture storage 42A (S151). The similar video retrieval unit 47 reads time series data (path data) from the video storage 40A (S152). The similar video retrieval unit 47 calculates the similarity between the two pieces of time series data (path data) (S153). The similarity of the time series data (path data) at step S153 may be calculated in any way. For example, when the initial velocity of the ball computed from trajectory data i is vs(i), the final velocity is ve(i), the position at which the initial velocity is calculated is Ps(i), the position at which the final velocity is calculated is Pe(i), and acceleration is A(i), the similarity Sij between trajectory data i and trajectory data j is defined as:

$$Sij = kvs*|vs(i)-vs(j)| + kve*|ve(i)-ve(j)| + kps*|Ps(i)-Ps(j)| + kpe*|Pe(i)-Pe(j)| + ka*|A(i)-A(j)|$$

where vs(i), ve(i), Ps(i), Pe(i), and A(i) are all three-dimensional vectors, and |•| represents norm. Further, kvs, kve, kps, kpe, and ka are coefficients for the respective three-dimensional vectors and are predefined.

Next, the similar video retrieval unit 47 determines whether all the time series data (path data) have been read or not (S154). If all the time series data (path data) have not been read (S154N), the processing returns to step S152. If all the time series data (path data) have been read (S154Y), one piece of path data is selected based on the similarities calculated at step S153 repeatedly executed thus far, and video V corresponding to that path data is read from the video storage 40A (S155). The path data may be selected in any manner. For example, path data with the highest similarity may be selected. Alternatively, a certain threshold may be defined and random path data may be selected from pieces of path data having similarity equal to or greater than the threshold. Finally, the similar video retrieval unit 47 outputs the video V it read out to the virtual special dynamic material generation unit 43 (S156).

[Virtual Special Dynamic Material Generation Unit 43]
Input: Video V (source: similar video retrieval unit 47)
Output: Virtual special dynamic materials (destination: the virtual special dynamic material storage 43A)
Processing operation: The virtual special dynamic material generation unit 43 takes a video V output by the similar video retrieval unit 47 as input, pastes part or the all of the video to prepared CG data as texture to thereby create CG data based on live action, and outputs the CG data as a virtual special dynamic material.

Figure 37:
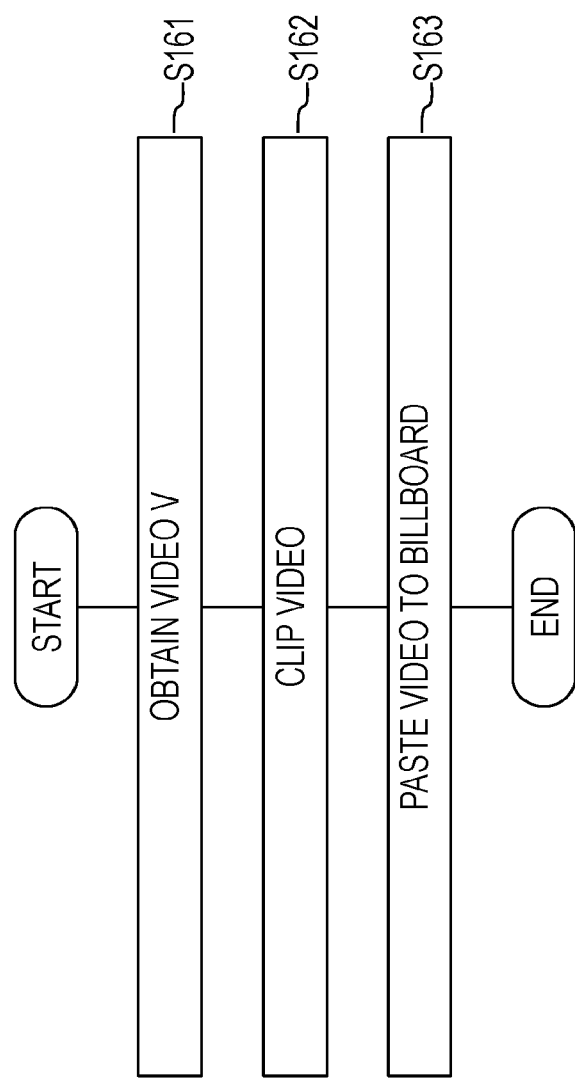
FIG. 37 is a flowchart showing an example of the operation of a virtual special dynamic material generation unit.

As a specific example, FIG. 37 shows the operations of the virtual special dynamic material generation unit 43 in the case of generating a virtual special dynamic material of a baseball pitcher.

In the example of FIG. 37, a rectangular plane (a billboard) is utilized as CG data serving as a base for pasting video. First, the virtual special dynamic material generation unit 43 obtains the video V output by the similar video retrieval unit 47 (S161). The virtual special dynamic material generation unit 43 then clips partial video V' from the video V (S162). An example of the region to be clipped can be a rectangular region containing a region in which the pitcher is present, for example. The size and/or position of the rectangular region may either be manually given in advance by a person viewing the video V or be automatically given. A method for automatically giving the size and/or position of the rectangular region can be background differential method, for example. Using the background differential method, the region in which the pitcher is present can be determined, and then a rectangular region may be defined so that it contains the region. Also, the region to be clipped is not limited to a rectangular region; only a region in which the pitcher is present may be clipped, for example. The aforementioned background differential method or the like can be employed as a method for clipping only the region in which the pitcher is present. Processing for clipping the partial video V' from the video V may be performed or not performed. When processing for clipping the partial video V' is not performed, it is deemed for the sake of convenience that the video V' has been obtained by clipping a rectangular region of the same size as the video V. Finally, the virtual special dynamic material generation unit 43 pastes the video V' on the rectangular plane (billboard) as texture (S163), and outputs the CG data as a virtual special dynamic material to the virtual special dynamic material storage 43A.

[Virtual Special Dynamic Material Storage 43A]
Input: Virtual Special Dynamic Materials (Source: The Virtual Special Dynamic Material Generation Unit 43)
Output: Virtual special dynamic materials (destination: the synchronization unit 44, the virtual environment generation unit 45)
Processing operation: The virtual special dynamic material storage 43A stores the virtual special dynamic material generated at step S43, and outputs a virtual special dynamic material to components in accordance with a request from the components.

[Synchronization Unit 44]
Input: Virtual special dynamic materials (source: the virtual special dynamic material storage 43A), position and posture information of virtual dynamic materials (source: the virtual material position/posture storage 42A), and position and posture information of virtual special dynamic materials (source: the virtual material position/posture storage 42A)
Output: Synchronization information (destination: the virtual material position/posture storage 42A)
Processing operation: The synchronization unit 44 synchronizes a virtual special dynamic material (for example, CG data for a pitcher) and a virtual dynamic material relevant to the virtual special dynamic material (for example, CG data for a ball thrown by a pitcher). Another example of such combination can be CG data for a tennis player and CG data for a tennis ball served by that player. It is assumed that correspondence between a virtual special dynamic material and a virtual dynamic material is predefined. Synchronization is equivalent to determining a start time of synchronization between synchronization materials in the virtual material position/posture information table of FIG. 35.

As a specific example, consider synchronization between CG data for a pitcher and CG data for a ball thrown by that pitcher. In this case, in video V' pasted to a billboard as texture, the time of a moment at which the ball is released from the pitcher's hand may be set as the synchronization start time of the CG data for a ball as a synchronization material. Here, the time of the moment at which the ball is released from the hand may be determined using any method.

For example, template matching of the ball may be performed for each time of the texture (video V') and the time that is detected first may be set as the time of moment of ball release, namely the synchronization start time. Alternatively, template matching may be performed using a template of hand or arm form of the pitcher at the time of release for each time of the texture (video V') and the time that is detected first may be set as the synchronization start time.

Although the above method presumes that the moment of the pitcher releasing the ball is captured in video V', since the speed of swinging of the pitcher's arm is very high, the moment of release might not be captured in the resulting video V' at a common frame rate used for capturing a video (for example, 30 fps, 60 fps). If the moment of release is not captured in the video V', the time of release may be estimated from images before and after the release, instead of performing template matching for a ball, hand, or arm and setting the resulting time as the time of release as described above.

Methods for estimating the time of release from images before and after the release include a learning-based approach, for example. Specifically, the moment (time) of release is determined from images captured at a high frame rate (for example, 1000 fps) such that the moment of release is included, and multiple image pairs each consisting of a pre-release image and a post-release image corresponding to past and future times shifted by a predetermined number of frames relative to the moment (time) of release are created while varying the number of frames being shifted. Using the multiple image pairs and the moment (time) of release as training data, a model for determining the moment (time) of release from an image pair is trained. Using a thus trained model, the moment (time) of release can be estimated when a pair of a pre-release image at a low frame rate (also called a first image) and a post-release image at a low frame rate (also called a second image) is given. The model may be trained in any manner. For example, a linear classifier may be applied using coordinate values of a hand in a pre-release image and a post-release image, the direction of an arm, the position of the ball after release, and the like as feature amounts, or DNN may be applied including feature extraction.

Redefining step S54 with more general expression, the synchronization unit 44 extracts an image pair composed of the first image (a pre-release image), which is an image captured before separation (for example, the release) between a human (for example, a pitcher) and an object (for example, a ball), and the second image (a post-release image), which is an image captured after separation (for example, the release) between the human (for example, a pitcher) and the object (for example, a ball), from a video capturing a real environment (for example, video V'), matches the image pair against an already trained model to estimate the time at which the human (for example, a pitcher) and an object (for example, a ball) separate from each other (for example, the moment of release), and synchronizes a virtual dynamic material (for example, CG data for the ball) and a virtual special dynamic material (for example, CG data for the pitcher) based on the estimated time.

The model used for estimating the time of release from images before and after the release may be trained by the synchronization unit 44 in advance and stored therein, or may be trained by an extrinsic model learning apparatus different from the virtual environment construction apparatus in advance and stored in the synchronization unit 44.

Figure 38:
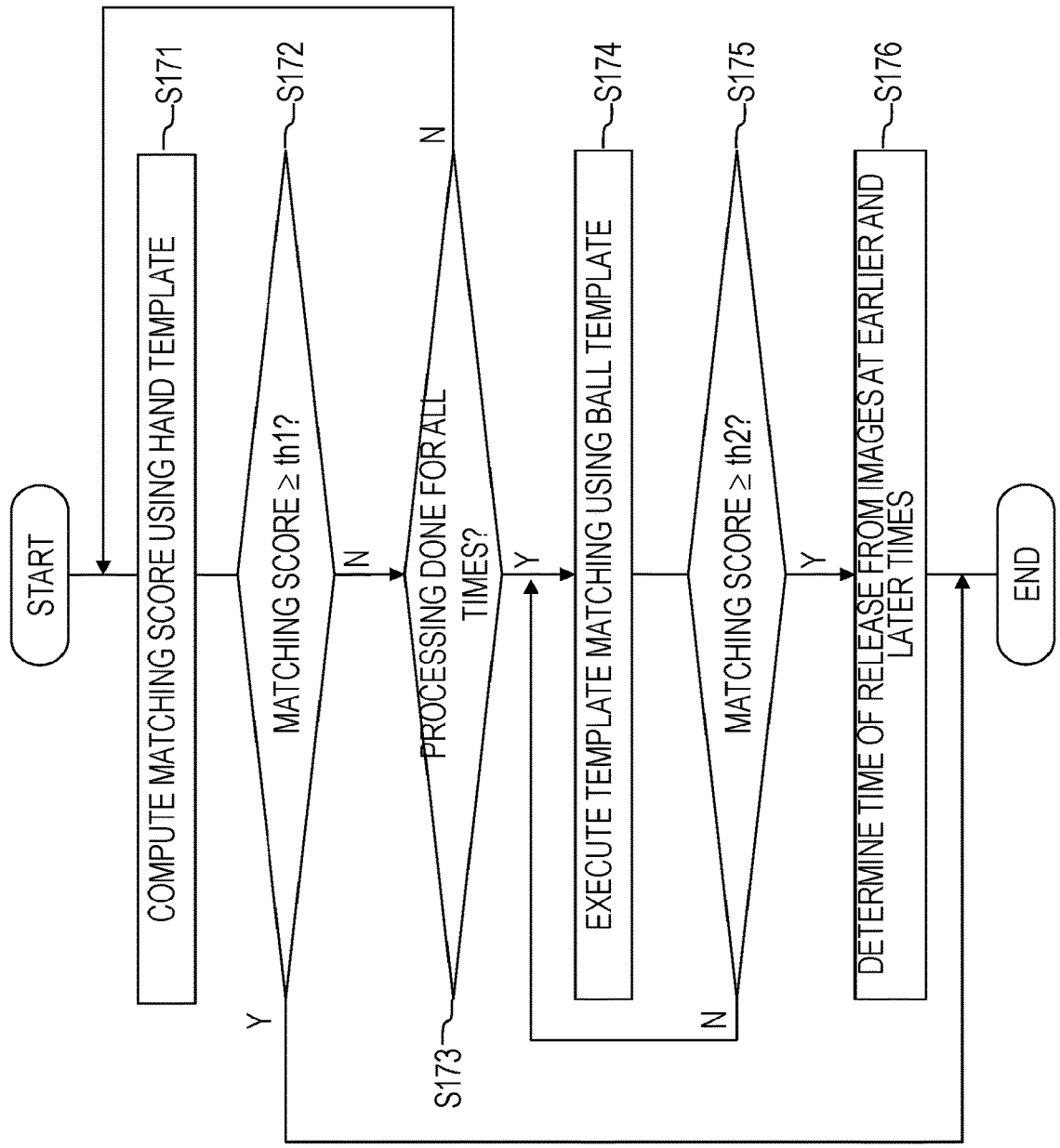
FIG. 38 is a flowchart showing an example of the operation of the synchronization unit.

An example of detection of the time of release using the above-described method is shown in FIG. 38. The synchronization unit 44 performs release determination for all the frames (for every time) of texture (video V') pasted to CG data for a pitcher. Specifically, the synchronization unit 44 executes template matching using a template of a pitcher's hand form at the time of release and computes a matching score (S171). If the matching score is equal to or greater than threshold th1 (S172Y, namely in the case of being similar), the time is set as the synchronization start time for the ball (end). The synchronization unit 44 performs the processing at step S171 for all the frames (for every time) of video V', and if a score equal to or greater than threshold th1 is not obtained for any of the frames of video V' (S173Y), the synchronization unit 44 executes template matching from the first frame (time) using a ball template and computes a matching score (S174). When the matching score is equal to or greater than threshold th2 (S175Y), the synchronization unit 44 sets the first time Ta at which the threshold th2 has been reached as a post-release time, and sets time Ta−1, one time earlier than time Ta, as a pre-release time (S176). The synchronization unit 44 estimates the time of release using an image pair composed of the first image at time Ta-1 and the second image at time Ta, and an already learned model (S176). The threshold th1 and threshold th2 are assumed to be predefined. The synchronization unit 44 sets the time estimated through the above process as the synchronization start time for synchronization materials in the virtual material position/posture information table shown in FIG. 35.

Redefining the operations at step S171 to S176 in the above-described flowchart with more general expression, the synchronization unit 44 estimates the time of separation (for example, the release) between the human (for example, a pitcher) and the object (for example, a ball) by executing template matching on a video capturing a real environment (for example, video V') using a first template (for example, a hand template) prepared in advance as a template for the human (for example, the pitcher)'s body at the moment of separation between the human (for example, the pitcher) and the object (for example, the ball) and a second template (for example, a ball template) prepared in advance as a template for the object (for example, the ball) at the moment of separation between the human (for example, the pitcher) and the object (for example, the ball), and synchronizes a virtual dynamic material and a virtual special dynamic material based on the estimated time. It is also possible to use only one of the first template (for example, a hand template) and the second template (for example, a ball template).

[Virtual Environment Generation Unit 45]
  Input: Virtual static materials (source: the virtual material storage 41A), virtual dynamic materials (source: the virtual material storage 41A), position and posture information of virtual materials (source: the virtual material position/posture storage 42A), virtual special dynamic materials (source: the virtual special dynamic material storage 43A), a virtual material incorporation list (source: the virtual material incorporation list storage 45A)
  Output: Virtual environment data (destination: the drawing unit 46)
  Processing operation: The virtual environment generation unit 45 reads virtual static materials and virtual dynamic materials from the virtual material storage 41A, reads position and posture information of each virtual material from the virtual material position/posture storage 42A, reads virtual special dynamic material from the virtual special dynamic material storage 43A, and merges them in accordance with the virtual material incorporation list to generate virtual environment data (S55).

The generated virtual environment data is sent to the drawing unit 46. The virtual environment data refers to data for a virtual space in which one or more virtual materials are arranged in a certain virtual space. The virtual environment generation unit 45 reads a virtual material incorporation list for generating a virtual environment from the virtual material incorporation list storage 45A. The virtual material incorporation list has a "virtual material ID" uniquely identifying a virtual material, and an "incorporation start time", which is the time at which the virtual material is incorporated into the virtual environment. It is assumed that the virtual material incorporation list is manually prepared in advance and prestored in the virtual material incorporation list storage 45A. The virtual environment generation unit 45 incorporates a virtual material into the virtual environment in accordance with the virtual material incorporation list. In doing so, the virtual environment generation unit 45 reads the position and posture of the virtual material from the virtual material position/posture storage 42A and arranges it on the virtual space based on the position and posture. After the virtual environment generation unit 45 has incorporated all the virtual materials described in virtual material incorporation list into the virtual environment, it ends processing.

[Drawing Unit 46]
  Input: Virtual environment data (source: the virtual environment generation unit 45)
  Output: A video (destination: a video display device (not shown))
  Processing operation: The drawing unit 46 draws virtual environment data generated at step S55 and outputs it in a state viewable by the user, for example, as a video (S56). The video output by the drawing unit 46 may be a video that sees one direction from a certain viewpoint in the virtual environment or a video that allows viewing in all directions like an omnidirectional video. For instance, in the case of outputting a video that sees one direction from a certain viewpoint, a perspective projection camera C may be virtually set at a certain position and CG data present in the virtual environment space may be projected onto the image plane of the camera C. Specifically, when T is a position as an extrinsic parameter of the camera C, R is the posture, and K is an intrinsic parameter, a certain point p within the space in which the virtual environment data exists will be projected as point q on the image plane of the camera C as follows.

$$q = K(Rp+T)$$

Here, the intrinsic parameter K is a 3×3 matrix composed of the focal distance and/or the image center of the camera C.

In the case of outputting an omnidirectional video that allows viewing in all the directions from a certain viewpoint, an omnidirectional camera O may be virtually set at the certain viewpoint and CG data present in the virtual environment space may be projected onto the image plane of the camera O. Specifically, when T is a position as an extrinsic parameter of the camera O, R is the posture, W is the width of the image plane of projection, and H is the height thereof, a certain point p within the space in which the virtual environment data exists will be projected as point $q=(q_x, q_y)^T$ onto the image plane of the camera O as follows.

$$p' = Rp + T = (p'_x, p'_y, p'_z)^T$$
$$q_x = \left(\frac{\theta W}{2\pi}\right) + \frac{W}{2}$$
$$q_y = \frac{\varphi H}{\pi}$$
where
$$\theta = \arctan\left(\frac{p'_z}{p'_x}\right),$$
$$\varphi = \arccos\left(\frac{p'_y}{|p'|}\right)$$

While the present example employs equidistant cylindrical projection as a projection for representing an omnidirectional video as a two-dimensional image, other kinds of projection such as Mercator's projection may be employed.

The virtual environment construction apparatus in the eighth embodiment can generate a virtual environment with low sense of inconsistency.

Ninth Embodiment

In sports, it is very important for improving performance in an actual match to experience a play from the viewpoint position of a player who is actually participating in a match with great sense of realism before a match. However, taking video from the location of a player during a match is difficult as it hinders play.

As a solution to this, there has been an attempt to synthesize a video as seen from a player's position based on a video captured by a camera installed outside a field during a match (see Reference Literature 5, for instance). As a part of the approach, Reference Literature 5 describes a methodology to create a part of a space with a three-dimensional model, create another part with a billboard model and a video pasted to the model, and synthesize a video from a desired viewpoint.

Reference Literature 5: Kosuke Takahashi, Dan Mikami, Mariko Isogawa, and Akira Kojima, "A Study on Virtual Omnidirectional Video Synthesis from Multiple Cameras", IEICE technical report, vol. 115, no. 76, pp. 43-48, June 2015

In a case where part of a space to be synthesized is created with computer graphics (CG) and another part is created with a live-action video, and a video from a virtual viewpoint established in the space is synthesized, an object created with CG could be also contained in a region created with live-action video. In such a case, when viewed from the virtual viewpoint, both the CG-created part and the live-action part of the object are drawn, looking unnatural.

Possible solutions include methods such as 1. removing a background portion from the live-action region by an approach such as segmentation to leave only a foreground object so that the background portion does not appear in the live-action region, and 2. removing an unwanted live-action object portion from the live-action region and making restoration, for example. Although the method of 1 would be effective to a certain degree, it cannot solve the problem when another object is present in the live-action region at a position close to the virtual viewpoint relative to the live-action object.

In view of the foregoing, an object of the ninth embodiment is to improve the reality in a virtual environment constructed by synthesis of an object created with CG and an object captured as live action.

To accomplish the object, virtual environment construction apparatus in the ninth embodiment is a virtual environment construction apparatus that constructs a virtual environment for viewing by a user based on a real environment in which a plurality of objects are present, the virtual environment construction apparatus including: a model construction method decision unit that, for at least one of the plurality of objects as a target object, decides a model construction method indicating whether a model of the object is constructed with CG or with a live-action video based on at least one of a sensing difficulty level and a CG drawing difficulty level of the target object; a state sensing unit that measures a state of the target object in the real environment; an environment model construction unit that constructs an environment model for drawing in the virtual environment in accordance with the model construction method for a static object which does not involve temporal change; and a dynamic object construction unit that constructs a model for drawing in the virtual environment in accordance with the model construction method for a dynamic object which involves temporal change, and synthesizes the model with the environment model.

Figure 39:
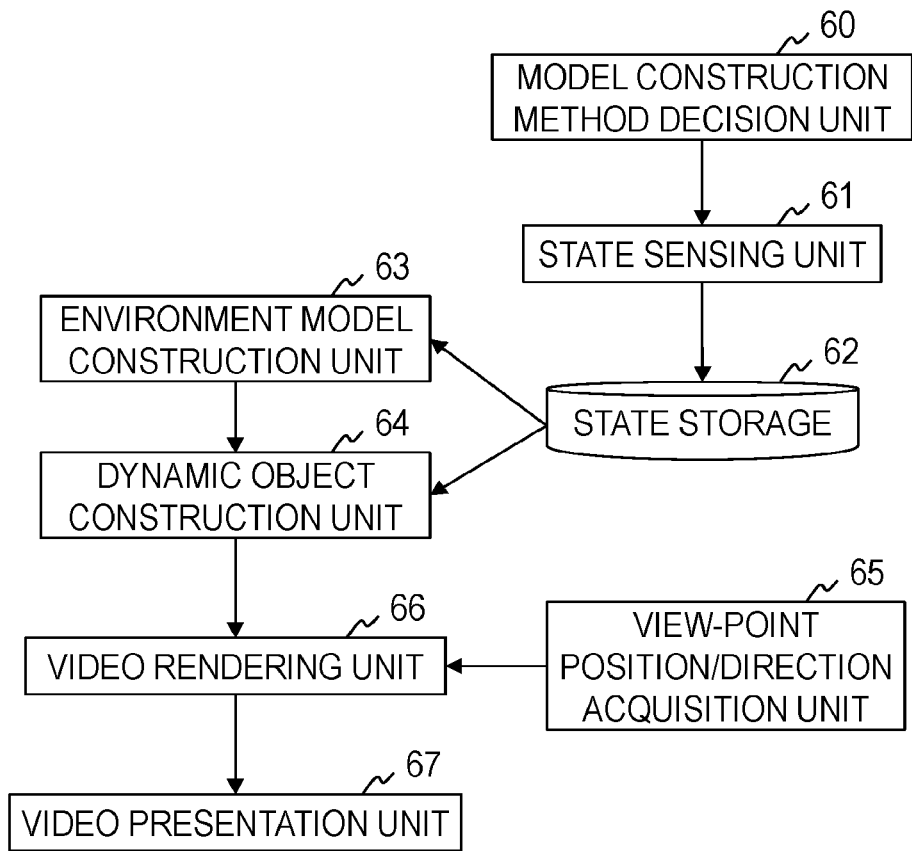
FIG. 39 is a diagram illustrating a functional configuration of a virtual environment construction apparatus in a ninth embodiment.

The virtual environment construction apparatus in the ninth embodiment includes a model construction method decision unit 60, a state sensing unit 61, a state storage 62, an environment model construction unit 63, a dynamic object construction unit 64, a viewpoint position/direction acquisition unit 65, a video rendering unit 66, and a video presentation unit 67, as shown in FIG. 39. By the virtual environment construction apparatus performing the processes at steps shown in FIG. 41, a virtual environment construction method in the ninth embodiment is implemented.

The virtual environment construction apparatus is a special device configured by loading of a special program into a known or dedicated computer having a central processing unit (CPU), main memory (random access memory or RAM), and the like, for example. The virtual environment construction apparatus executes various kinds of processing under control of the central processing unit, for example. Data input to the virtual environment construction apparatus and/or data resulting from various kinds of processing are stored in the main memory, for example, and data stored in the main memory is read as required to be utilized for other processing. Also, at least part of the processing components of the virtual environment construction apparatus may be formed of hardware such as an integrated circuit. The storages provided in the virtual environment construction apparatus may be formed of main memory such as random access memory (RAM), an auxiliary storage device formed of a hard disk, optical disk, or a semiconductor memory device such as a flash memory, or middleware such as a relational database or a key value store, for example. The storages provided in the virtual environment construction apparatus may be each logically partitioned or they may be stored in a single physical storage device.

For some object present in a space to be constructed (hereinafter referred to as target object), the model construction method decision unit 60 decides a model construction method for the target object based on at least one of the sensing difficulty level and the CG drawing difficulty level. The model construction method decision unit 60 may also decide the model construction method for the target object based on a discrepancy between an angle of observation and an angle of viewing in addition to the sensing difficulty level and the CG drawing difficulty level. A model construction method refers to information that indicates whether a model of the target object is constructed with CG or with a live-action video. The sensing difficulty level is an indicator of difficulty in measuring the states of the target object. Here, states refer to those necessary for CG drawing of the target object, including its position and posture. The CG drawing difficulty level is an indicator of difficulty in drawing the target object with CG. CG in this embodiment is assumed to be three-dimensional CG. The discrepancy between the angle of observation and the angle of viewing is the discrepancy between the camera position at the time of capturing a live-action video and the position of the virtual viewpoint of a video presented to the user.

Drawing of an object with three-dimensional CG in a virtual environment and drawing by means of a live-action video have their respective advantages and disadvantages. An advantage of drawing with three-dimensional CG is high freedom of viewpoint setting position because drawing is done based on sensed information, enabling relatively easy drawing even in the case of drawing an object whose position sharply changes in a short time while the user changes his or her viewpoint position and orientation, such as when a baseball is seen from a batter's viewpoint. On the other hand, a disadvantage is that some objects are difficult to sense and the impression of a synthesized video can be unnatural (for example, hairs, flapping of clothes, the posture of a person sensed from a remote location, and the like). An advantage of drawing by means of a live-action video is that the impression of a synthesized video is natural. On the other hand, a disadvantage is that a large number of cameras are required for neat synthesis of an object whose position sharply changes in a short time. The model construction method decision unit 60 decides an optimal model construction method for each object taking these advantages and disadvantages into account. This can improve the reality in the finally constructed virtual environment.

Specifically, the model construction method decision unit 60 decides the model construction method through the following seven steps.

Step 1. Set an object presence range.
Step 2. Set a camera position.
Step 3. Set a virtual viewpoint position.
Step 4. Determine the maximum discrepancy value between the angle of observation and the angle of viewing.
Step 5. Determine the sensing difficulty level.
Step 6. Determine the CG drawing difficulty level.
Step 7. Determine the model construction method.

At step 1, the presence range of each object in a space to be constructed is set. Since in many sports the regions of presence of individual objects are fixed due to limitation of rules or the like, it is possible to set presence ranges based on rules. It is also possible to set the presence ranges of typical objects even if they are not prescribed in rules. Alternatively, in the case of model construction after image capturing, presence ranges may be set in accordance with the scene to be subsequently constructed.

Figure 40:
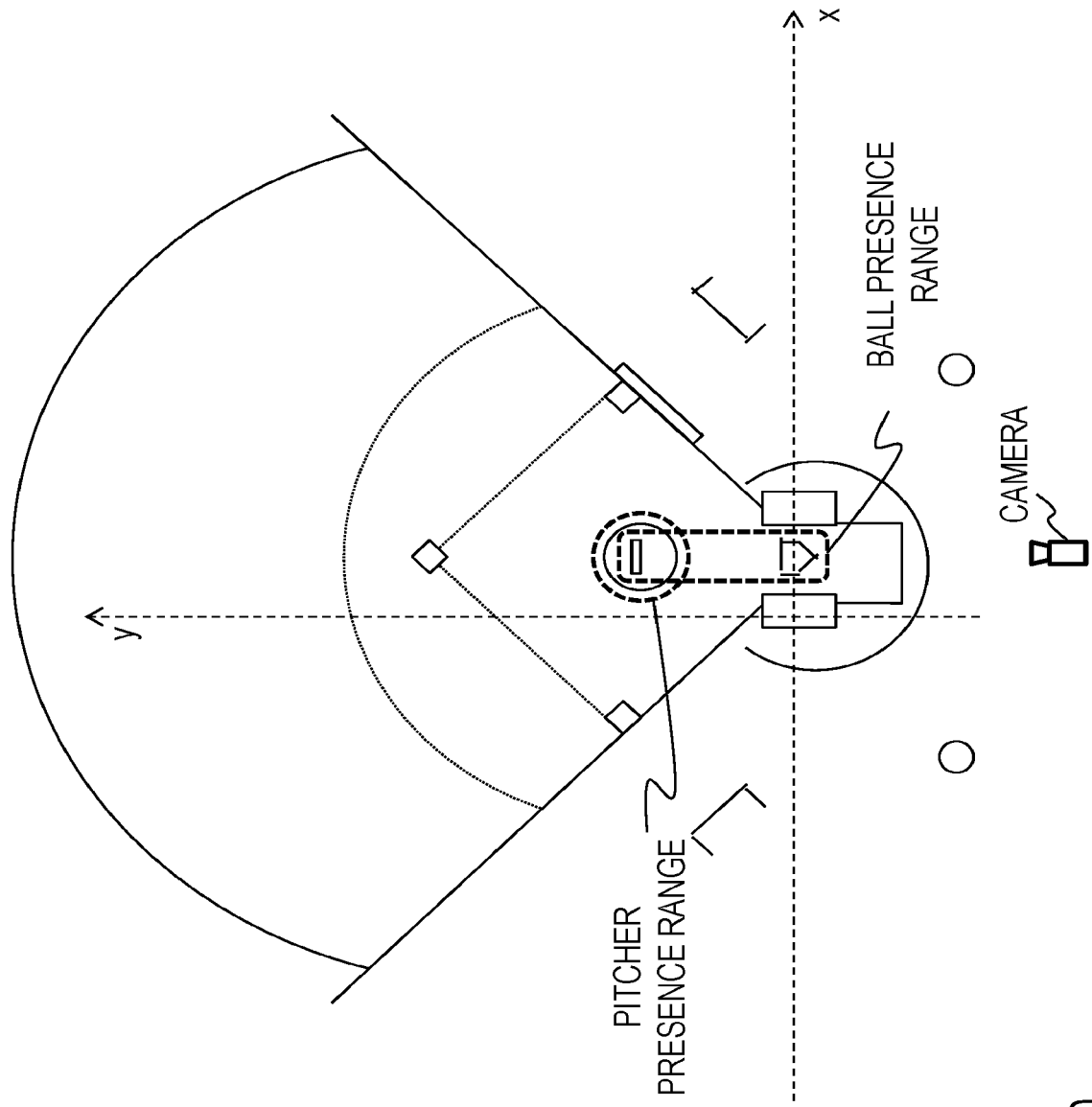
FIG. 40 is a diagram for describing a specific example for baseball.

The description here considers a baseball ground as the space to be constructed. FIG. 40 is a diagram of a baseball ground as the target of construction seen from a viewpoint at a vertically upward position. By the user specifying the presence range of an object on such an illustration representing the space to be constructed by clicking a mouse or the like, the presence range of each object at step 1 can be set. Alternatively, presence ranges may be set by reading ones specified at the time of system utilization. Alternatively, a file describing object presence ranges may be prepared in advance based on the rules and the file may be specified and read at the time of system utilization. For example, in the case of constructing a pitching scene in baseball, objects may include "pitcher", "ball", and the like, for example. In this case, for each object, a file containing settings of information on the object is prepared in advance, the information including the "type" of the object such as "pitcher" or "ball", the "attribute" of the object such as "rigid body" or "articulated object" (its usage will be discussed later), "dynamic/static category" indicating whether the object is a dynamic object or a static object (which may be omitted by being linked with the attribute; its usage will be discussed later), and the "presence range" of the object represented by position information. The model construction method decision unit 60 reads the file and sets the presence ranges of objects. The contents of the file are manually set in advance. For example, when the processing target object is a pitcher, a region around the mound is set as the presence range of the object as shown in FIG. 40. When the processing target object is a ball, a rectangular region connecting between the mound and the home base is set as the presence range of the object as shown in FIG. 40. In the example of FIG. 40, two-dimensional position coordinates on the illustration are used as position information, with the center of the batter's box being the origin, the direction of the centerfield screen being the y-axis, and the direction orthogonal to the y-axis being the x-axis.

At step 2, the respective positions of multiple cameras installed outside the space to be constructed are obtained. The camera positions can be obtained by reading positions specified by the user on an illustration representing the space, like FIG. 40, similarly to the object presence ranges. Alternatively, a separate, previously prepared file describing camera positions may be read by the model construction method decision unit 60 to set the camera positions.

At step 3, a range which may be set as a virtual viewpoint is read. A range which may be set as a virtual viewpoint can be obtained by reading a range specified by the user or a system operator on an illustration like FIG. 40, similarly to the object presence ranges. Alternatively, a separate, previously prepared file describing virtual viewpoint positions may be read by the model construction method decision unit 60 to set a range which may be set as a virtual viewpoint.

Figure 42B:
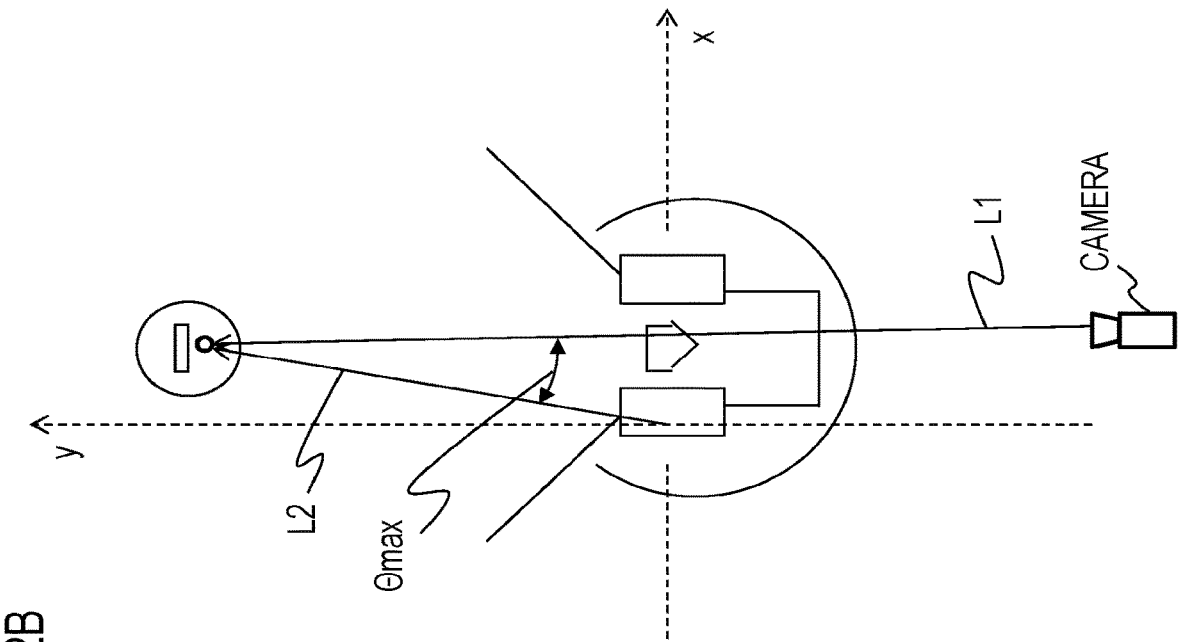
FIG. 42A and FIG. 42B is a diagram for describing a discrepancy between an angle of observation and an angle of viewing.
Figure 42A:
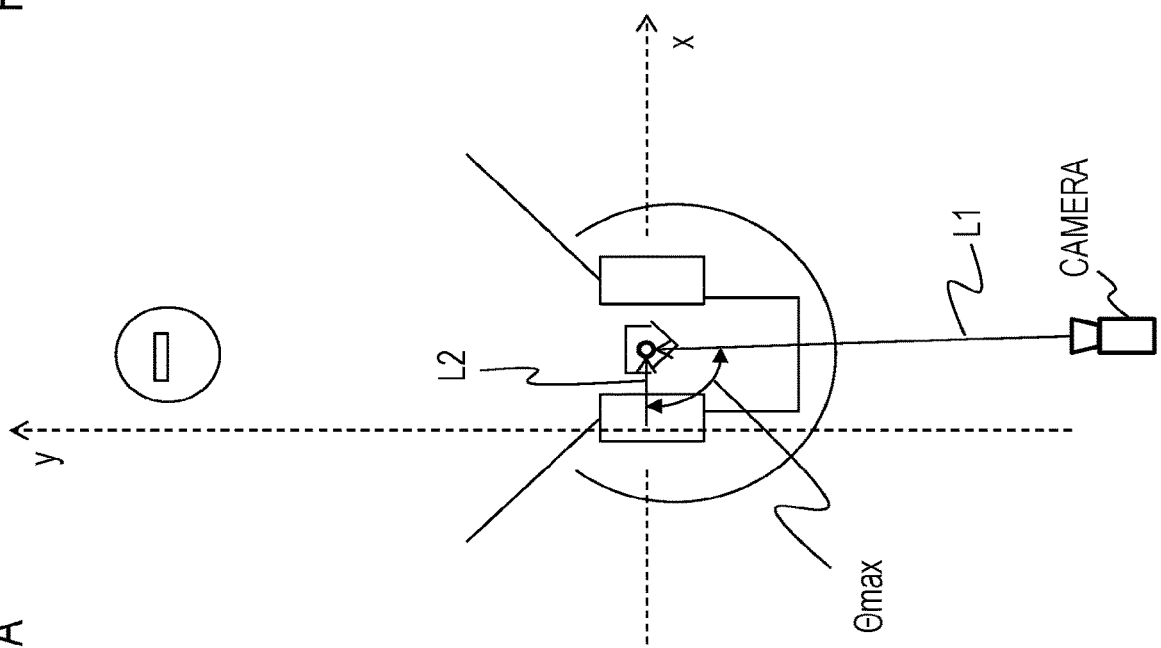

At step 4, the discrepancy between the angle of observation and the angle of viewing are calculated. The angle of observation and the angle of viewing for an object can be determined using the object presence range obtained at step 1, the camera positions obtained at step 2, and the virtual viewpoint position obtained at step 3. For example, FIG. 42(A) shows discrepancy θmax between the angle of observation and the angle of viewing for baseball pitching. L1 is a straight line connecting between a ball passing over the home base and the camera, L2 is a straight line connecting between a virtual viewpoint located at the center of the batter's box and the ball, and the angle formed by the straight line L1 and the straight line L2 is the discrepancy θmax between the angle of observation and the angle of viewing. FIG. 42(B) shows the discrepancy θmax between the angle of observation and the angle of viewing for a pitcher on a mound.

At step 5, the sensing difficulty level is set for each object. The sensing difficulty level is read from a sensing difficulty level table, for example. The sensing difficulty level table is a table describing sensing difficulty levels predefined in accordance with the attributes of objects, as shown in the table below. In the example of the table below, the values of sensing difficulty level are set based on attributes such as whether the object is a rigid body or not, whether it is an articulated object or not, and whether it is a plastic object or not. It is assumed that the attributes of objects have been obtained by being read from a file in which "type", "attribute", "dynamic/static category", and "presence range" are set for the individual objects as described in step 1. Alternatively, the attributes of objects may be obtained by the user specifying attributes of each object to be constructed, for example, by clicking of a mouse.

TABLE 3

| Shape complexity | Rigid body | Articulated object | Plastic object |
|---|---|---|---|
| Simple | a | b | c |
| Complicated | d | e | f |

At step 6, the CG drawing difficulty level is set for each object. The CG drawing difficulty level is read from a CG drawing difficulty level table, for example. The CG drawing difficulty level table is a table describing CG drawing difficulty levels predefined in accordance with the attributes of objects, as shown in the table below. In the example of the table below, the values of CG drawing difficulty level are set based on attributes such as whether the object is a rigid body or not, whether it is an articulated object or not, and whether it is a plastic object or not. The attributes of objects are obtained in a similar manner to the one described in setting of the sensing difficulty level.

TABLE 4

| Shape complexity | Rigid body | Articulated object | Plastic object |
|---|---|---|---|
| Simple | g | h | i |
| Complicated | j | k | l |

At step 7, based on the sensing difficulty level, the CG drawing difficulty level, and the discrepancy between the angle of observation and the angle of viewing, a model construction method for the object is determined. For example, when SE is the sensing difficulty level, CM is the CG drawing difficulty level, and θmax is the discrepancy between the angle of observation and the angle of viewing, determination may be made such that if $$\gamma\theta max/(\alpha SE * \beta CM) > th$$

holds, a model is constructed with CG, otherwise a model is constructed with a live-action video. Here, th is a threshold, and α, β, and γ are predetermined parameters. The above formula is only an example and may be modified in any way as long as it makes determination by comparison with a threshold using one or more of the sensing difficulty level, the CG drawing difficulty level, and the discrepancy between the angle of observation and the angle of viewing.

Instead of following the foregoing steps, it is also possible to prepare a file that predesignates use of either CG or a live-action video for each object and read the file to decide the model construction method.

For each object present in the space to be constructed, the state sensing unit 61 senses the state of the object in that space. The obtained state of the object is stored in the state storage 62. The way of sensing varies depending on the attributes of the target object and the model construction method for that object. For example, in the case of sensing position information as a state for CG drawing of a baseball, tennis ball, or the like, it is widely known that ball position information can be obtained via a well-known PITCHf/x system for baseball or via well-known Hawk-Eye system for tennis.

The environment model construction unit 63 takes as input the states of objects stored in the state storage 62, and for a static object with little temporal change in position or posture among those objects, constructs an environment model for drawing in a virtual environment in accordance with the model construction method decided by the model construction method decision unit 60. The constructed environment model is sent to the dynamic object construction unit 64. For an object for which model construction with CG has been decided, a model composed of three-dimensional geometry and texture is constructed. The three-dimensional geometry may be actually measured, or a typical geometry prescribed by rules may be utilized because the size of a playing field and the like are defined by rules in many sports. For an object for which model construction with a live-action video has been decided, a live-action video captured by a camera is utilized to construct a model.

The dynamic object construction unit 64 takes the states of objects stored in the state storage 62 as input, and for a dynamic object involving temporal change in position or posture among those objects, constructs a model for drawing in the virtual environment in accordance with the model construction method decided by the model construction method decision unit 60 based on its state stored in the state storage 62. The model constructed for the dynamic object is synthesized with the environment model constructed by the environment model construction unit 63. This results in construction of the virtual environment for presentation to the user. The constructed virtual environment is sent to the video rendering unit 66.

Figure 41:
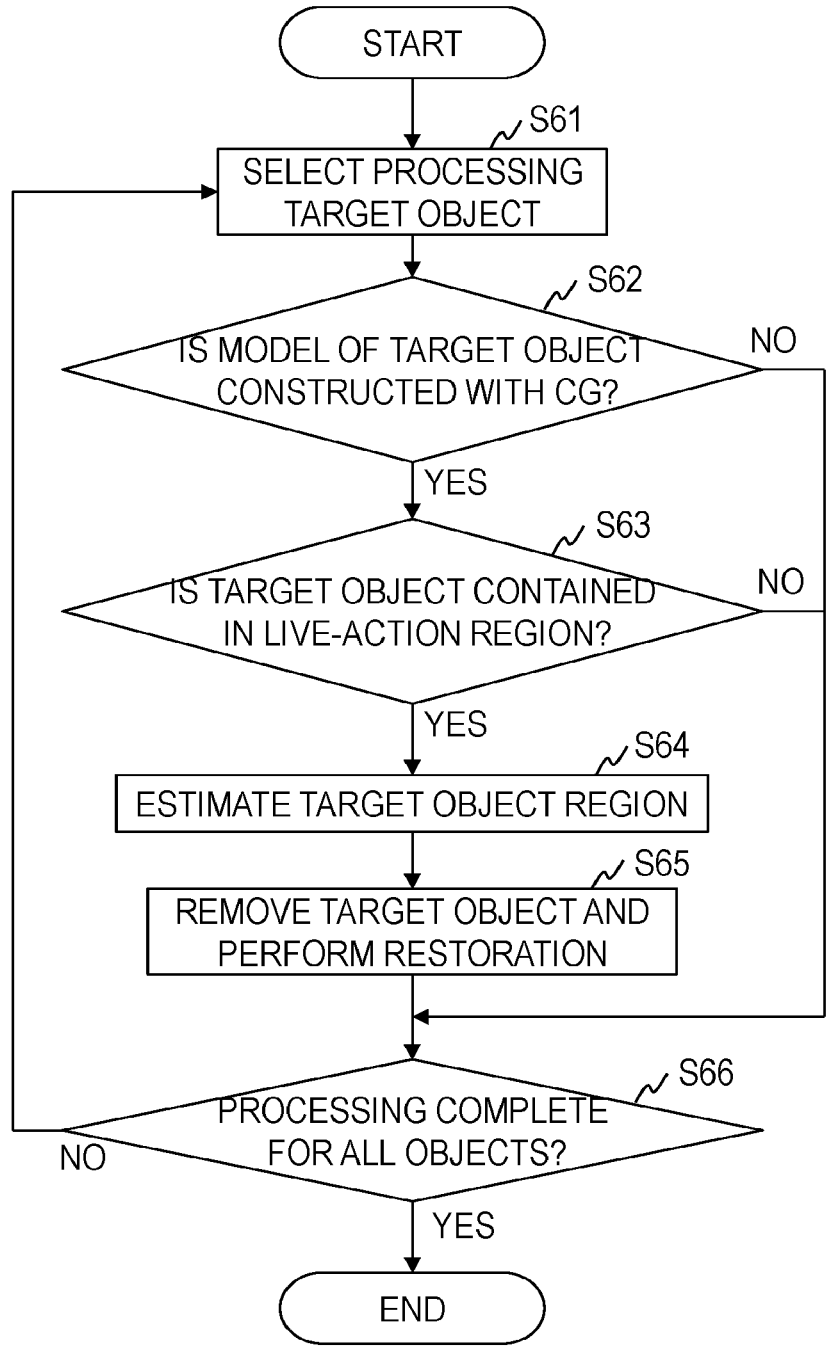
FIG. 41 is a diagram illustrating a processing procedure of a dynamic object construction unit.

Specifically, the dynamic object construction unit 64 constructs a model for a dynamic object through the six steps shown in FIG. 41. At step S61, an unprocessed object among objects is set as a processing target object. At step S62, if a model of the processing target object is constructed with CG (YES), the flow proceeds to step S63. Otherwise (NO), the flow proceeds to step S66. At step S63, it is determined whether the processing target object whose model is constructed with CG is contained in a region which is constructed with a live-action video or not. If it is contained (YES), the flow proceeds to step S64. Otherwise (NO), the flow proceeds to step S66. At step S64, a region where the processing target object whose model is constructed with CG has been pictured is estimated. At step S65, a restoration process is performed on the region where the processing target object is estimated to have been pictured. At step S66, if all the objects have been processed (YES), the processing ends. Otherwise (NO), the flow returns to step S61.

Possible methods for estimating a restoration region at step S64 include 1. detecting an object by image processing, and 2. converting a sensed object position in field space coordinates into an extrinsic camera position by utilizing a camera calibrated with respect to the field space coordinates. These methods will be described below with reference to specific examples.

The method of 1 estimates a restoration region as follows. The following considers a scene where video is synthesized from the batter's box perspective in baseball and assumes that the model of the ball is constructed with CG. Then, a situation is described where a ball being actually captured is present in the region of the pitcher, whose model is constructed with live-action video, and the ball is removed and complemented by a video restoration technique. In this case, it is possible to prepare a ball template and detect the position and size of an object via template matching in each frame. Alternatively, for an object whose shape in a camera image is limited to a circle, such as a ball, its position and size can be detected by performing circular Hough transform after edge detection.

The method of 2 estimates a restoration region as follows. In this approach, the position of an object sensed in the sensor coordinates is converted to a camera coordinate system, and the camera coordinates are in turn converted to a screen coordinate system. Assuming transformation matrices from the sensor coordinates $(x, y, z)^T$ to the camera coordinates $(p, q, r)^T$ are A and B, and transformation matrices to the screen coordinates (s, are C and D, then $$(p,q,r)^T = A(x,y,z)^T + B$$

$$(s,t)^T = C(p,q,r)^T + D$$

In this way, an object region to be removed within a video can be estimated.

Figure 43:
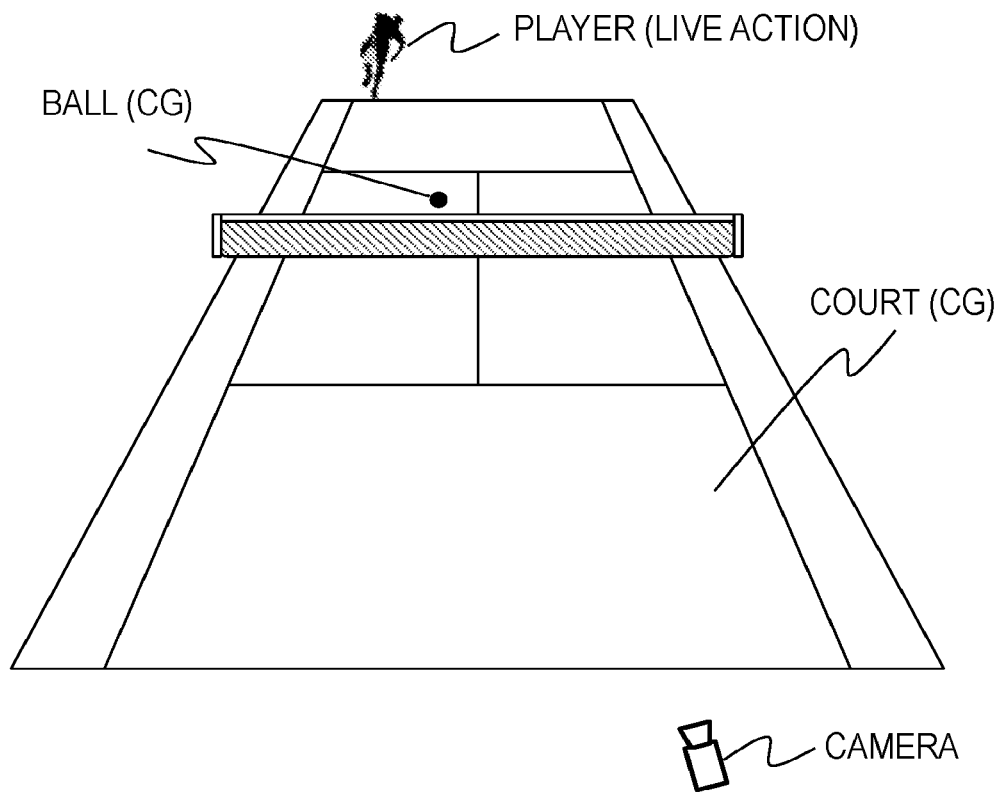
FIG. 43 is a diagram for describing a specific example for tennis.
Figure 44:
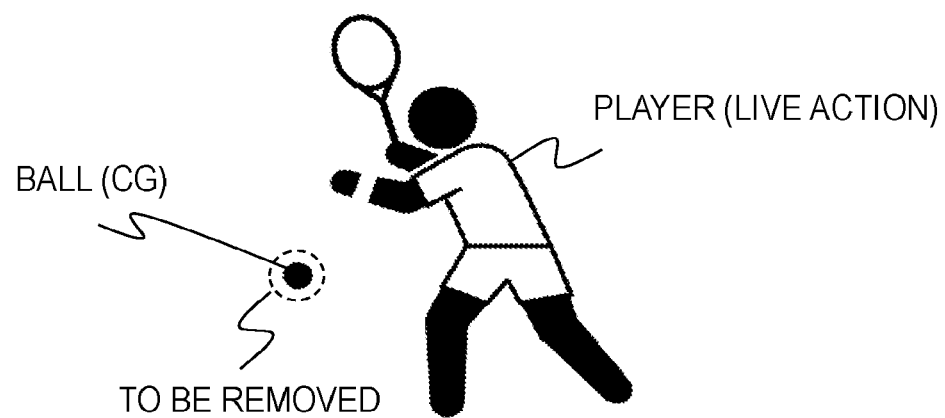
FIG. 44 is a diagram for describing a specific example for tennis.

Estimation of restoration region will be specifically described for the case of tennis as an example. For video synthesis at the viewpoint at a player's position in tennis, the model of the player will be constructed with a live-action video and the models of a ball and a court will be constructed with CG, as shown in FIGS. 43 and 44. In the process, a ball and a court (a net, lines) caught by the camera that captures the player are removed. The trajectory of a ball can be easily obtained via the well-known Hawk-Eye system or the like. The shape of the court is previously known from the rules. Accordingly, the three-dimensional geometry of the objects whose model is constructed with CG can be obtained. If an extrinsic camera and the world coordinates of the court have been calibrated, a restoration region can be estimated in a similar way because at which locations the court and the ball will be captured is known.

For the restoration process at step S65, the image/video restoration technique described in Reference Literature 6 below is applicable, for example.

Reference Literature 6: Mariko Isogawa, Dan Mikami, and Akira Kojima, "Reduction and Synthesis of Feature Values for High Quality of Experience Image Completion", IEICE technical report, vol. 114, no. 239, MVE2014-37, pp. 37-42, October 2014

The viewpoint position/direction acquisition unit 65 obtains virtual viewpoint position and viewpoint direction in the video to be presented to the user. The position of the virtual viewpoint can be arbitrarily set in the range established at step 3 by the model construction method decision unit 60. The viewpoint position/direction acquisition unit 65 obtains virtual viewpoint position and viewpoint direction in the video to be presented to the user, which have been set and input from outside, and sends them to the video rendering unit 66.

The video rendering unit 66 renders a video of a virtual environment to be presented to the user using the virtual environment constructed by synthesis of the environment model and the model of the dynamic object, the virtual environment synthesized by the dynamic object construction unit 64, and the position and direction of the virtual viewpoint obtained by the viewpoint position/direction acquisition unit 65. The rendered video is sent to the video presentation unit 67.

The video presentation unit 67 presents the video rendered by the video rendering unit 66 to the user. The video presentation unit 67 may be a peripheral device connected with the virtual environment construction apparatus via any of various interfaces, and may employ a common liquid crystal display, a projector, a head mounted display (HMD), or the like.

The following describes a specific example where a video of a virtual environment is constructed from the perspective of the batter's box in baseball. In this case, the environment model is a stadium and dynamic objects are assumed to be a pitcher and a ball. A stadium can be subdivided into a batter's box, a home base, a foul line, a stand, and the like in the order of closeness to the batter. For each of these objects, a model construction method is decided by performing the seven steps described for the model construction method decision unit 60. The description here shows a specific example where a ball thrown by a pitcher is the target object.

(Step 1) A ball is thrown by the pitcher from a pitcher plate located at 18.44 meters frontward from the batter's box and is caught by a catcher positioned somewhat behind the home base. That is, given that the approximate position of the batter in the batter's box is the origin, (0.5, 18.44)-(0.5, −1) is the object presence range of the ball.

(Step 2) Assuming that the camera is present at the side of the backstop, set the camera position at (1, −20).

(Step 3) Assuming that the virtual viewpoint position is the viewpoint of a batter standing in the batter's box, set the virtual viewpoint position at (0, 0).

(Step 4) Based on the information set at steps 1 to 3, determine the maximum θmax of the discrepancy that occurs between the angle when the ball is observed by the camera (angle of observation) and the angle when the ball is observed from the virtual viewpoint position (angle of viewing). θmax has positive correlation with the difficulty of model construction using live action. Hereinafter, the discrepancy between the angle of observation and the angle of viewing for ball b will be denoted as θmax(b).

(Step 5) Estimate the difficulty level of sensing for the ball. This is determined based on a sensing difficulty level table. Since a ball is a rigid body and does not change in appearance when it rotates, it is an object of low sensing difficulty level. If a system capable of accurate sensing of a ball state, such as the well-known PITCHf/x, is adopted, the sensing difficulty level would be further lower. Hereinafter, a score of the sensing difficulty level for ball b will be denoted as SE(b).

(Step 6) Estimate the CG drawing difficulty level for the ball. This is determined based on a CG drawing difficulty level table. As a ball has no distortion and is a sphere, creation of a CG model is easy. Hereinafter, a score of the CG drawing difficulty level for ball b will be denoted as CM(b).

(Step 7) Using the information obtained at steps 4 to 6, check the determination formula below. If the determination formula holds, the model is constructed with a live-action video; if the determination formula does not hold, the model is constructed with CG.

$$SE(b)*CM(b)/\theta max(b) \geq th$$

As another example, a specific example where a pitcher is the processing target object is described.

(Step 1) During a pitch, a pitcher makes as small movement as moving forward just a step. Thus, (0.5, 18.44)-(0.5, 17.44) is set as the object presence range of the pitcher.

(Step 2) Assume that the camera position is the same as in the ball example. That is, it is set at (1, −20). However, it is possible to prepare an observation camera on a per-object basis.

(Step 3) Assume that the virtual viewpoint position is the same as in the case of the ball. That is, it is set at (0, 0).

(Step 4) Set the discrepancy θmax(p) between the angle of observation and the angle of viewing for pitcher p. As can be seen from FIGS. 42(A) and (B), θmax(p) in the case of pitcher p is a smaller value than θmax(b) in the case of ball b.

(Step 5) In the case of a pitcher (that is, a human), sensing is difficult because it is an articulated object. Hereinafter, a score of the sensing difficulty level for pitcher p will be denoted as SE(p).

(Step 6) In the case of a pitcher, creation of a realistic CG model is very expensive due to the non-rigidity and complicated deformation of the pitcher's uniform. Hereinafter, a score of the CG drawing difficulty level for pitcher p will be denoted as CM(p).

(Step 7) Using the information obtained at steps 4 to 6, check the determination formula below. If the determination formula holds, the model is constructed with a live-action video; if the determination formula does not hold, the model is constructed with CG.

$$SE(p)*CM(p)/\theta\max(p) \geq th$$

In this way, whether to construct a model with CG or with a live-action video is determined for each object. Since a model construction method optimal for each individual object can be adopted, a realistic virtual environment can be constructed.

Specific examples for other sports are briefly described. In the foregoing example of tennis, models of players and a spectator stand are constructed with live-action video and models of a ball and a court are constructed with CG. The trajectory of a ball can be obtained via the well-known Hawk-Eye system. A camera for capturing the player may be installed outside the court. In the example of soccer, a model of a spectator stand is constructed with live-action video and a model of a ground is constructed with CG. A player can be either live action or CG depending on the situation. The position of a player can be obtained via the well-known TRACAB system and the like.

The virtual environment construction technique in the ninth embodiment constructs a model by a method optimal for each individual object, thus improving the reality of a virtual environment constructed by synthesis of objects created with CG and objects captured as live action.

Tenth Embodiment

When a photograph or moving image is taken, an unwanted item could be pictured over an object of interest. As this can significantly degrade the perceived quality of viewing of the captured photograph or moving image, there is an extremely high demand for a technique for removing such an unwanted pictured item by image processing without causing visual inconsistency. Hereinafter, a region of an image which should be removed, such as an unwanted pictured item, and a region that cannot be observed due to occlusion or the like and should be complemented will be referred to as "complementation target region". Also, a process which receives an image having a complementation target region given as a mask as input and outputs an image having the complementation target region complemented without visual inconsistency with respect to a region outside the complementation target region will be referred to as "complementation process".

A mask indicating the position of a complementation target region is given manually or via an existing approach (for example, Reference Literature 7) regardless of whether a still image or a moving image is concerned. A mask is information indicating whether a region is subject to processing or not during image processing. For example, it can be a mask that indicates a portion to which processing should be applied and the other portion with binary values separately from an input image, as shown in FIG. 45(1), or a mask that explicitly indicates a region to be processed by overlaying a color not used in the image and easily discernible on the input image so that processing will not be applied to regions other than the region indicated by the color, as shown in FIG. 45(2).

Reference Literature 7: Bai, X., Wang, J., Simons, D., Sapiro, G., "Video snapcut: robust video object cutout using localized classifiers," ACM Transactions on Graphics (TOG), vol. 28, Issue 3, August 2009

Approaches to implement a complementation process on an image and video include a method that searches for regions amenable to restoration in an image in units of patch and sequentially performs complementation based on patches (for example, Reference Literature 8), and a method that examines how much patch-wise translation of an image will find a similar region and performs complementation based on the resulting information (for example, Reference Literature 9). For a video, a method that performs complementation in units of three-dimensional patch taking into account not only the same image but chronological direction (for example, Reference Literature 10) is used, for example.

Reference Literature 8: A. Criminisi, P. Perez, and K. Toyama, "Region filling and object removal by exemplar-based inpainting," IEEE Transactions on Image Processing, vol. 13, no. 9, pp. 1200-1212, September 2004.

Reference Literature 9: Kaiming He, and Jian Sun, "Image Completion Approaches Using the Statistics of Similar Patches", IEEE Transactions on pattern analysis and machine intelligence, vol. 36, no. 12, pp. 2423-2435, 2014.

Reference Literature 10: Alasdair Newson, Andres Almansa, Matthieu Fradet, Yann Gousseau, Patrick Perez, "Video Inpainting of Complex Scenes," SIAM Journal of Imaging Science 2014 7:4, 1993-2019

In a video complementation process for removing an unwanted item pictured in a video and complementing it without sense of inconsistency, if the video is under a fixed-camera condition throughout and the region to be complemented is a background region, complementation at high speed and with stable image quality is enabled by complementation using pixel values from other frames in the same video that correspond to the pixel positions of the complementation target region. Such a process is described as "paste synthesis". When a region to be complemented is adjacent to another object (for example, a person) within the frame, however, the above method cannot complement it well because a loss of the object occurs. Thus, conventional practices have been adoption of a method that searches for regions amenable to complementation per frame in units of two-dimensional patch, including the vertical and horizontal axes of an image, and performs complementation, like Reference Literatures 8 and 9, or a method that performs complementation in units of three-dimensional patch also taking into account the chronological direction like Reference Literature 10, for example. These methods are described as "completion process" or "patch-search-based completion process".

The conventional complementation approaches however requires an enormous calculation time for patch search. Thus, for a practical purpose, a long complementation time needs to be accepted, or acceleration needs to be attempted such as by the user manually inputting a complementation approaches or frames to be complemented. This leads to a problem such as occurrence of a lengthy latency or significant reduction of usability due to manual input by the user.

An object of the tenth embodiment is to provide a video presentation technique capable of efficiently complementing a video containing a region that needs complementation due to an unwanted pictured item or the like.

To accomplish the object, the video presentation apparatus according to a first aspect of the tenth embodiment includes: a video input unit that obtains as input a video sequence composed of a plurality of frames and mask information specifying a complementation target region in the video sequence; a complementation method determination unit that separates a frame into a foreground region and a background region based on binary images representing differences between the plurality of frames included in the video sequence, and determines either one of patch-search-based completion and paste synthesis as a complementation method for the complementation target region based on a number of pixels belonging to the foreground region and located within a given distance from a periphery of the complementation target region; and a video complementation unit that complements the complementation target region in accordance with the complementation method.

The video presentation apparatus according to a second aspect of the tenth embodiment includes: a video input unit that obtains as input a video sequence composed of a plurality of frames and mask information specifying a complementation target region in the video sequence; a complementation method determination unit that determines either one of patch-search-based completion and paste synthesis as a complementation method for the complementation target region based on a difference between an average color of pixels located within the complementation target region and an average color of pixels located within a given distance from a periphery of the complementation target region; and a video complementation unit that complements the complementation target region in accordance with the complementation method.

The video presentation apparatus according to a third aspect of the tenth embodiment includes: a video input unit that obtains as input a video sequence composed of a plurality of frames and mask information specifying a complementation target region in the video sequence; a complementation method determination unit that segments each frame in the video sequence to separate the frame into a foreground segment having a predefined feature and a background segment, and determines either one of patch-search-based completion and paste synthesis as a complementation method for the complementation target region based on a number of pixels belonging to the foreground segment and located within a given distance from a periphery of the complementation target region; and a video complementation unit that complements the complementation target region in accordance with the complementation method.

As a way to accomplish the object, the tenth embodiment makes use of the characteristics of a fixed camera video of facilitating fast and good results of complementation via paste synthesis process, which pastes pixels located at corresponding positions in preceding or subsequent frames. That is, if the complementation target region does not overlap another object (for example, a person) in the frame and pixel values at corresponding positions in neighboring frames can be used without modification, complementation is performed by pasting pixel values from another frame corresponding to the pixel positions that require complementation. On the other hand, if the complementation target region overlaps another object in the frame and paste synthesis process using other frames is difficult, a patch-search-based completion process is performed. By thus automatically determining a suitable complementation method depending on the characteristics of the complementation target region, fast, automated, and efficient complementation of video is performed.

Figure 46:
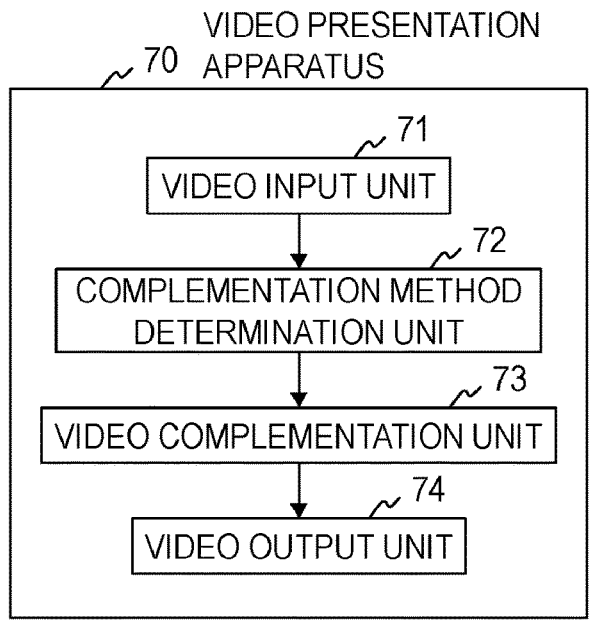
FIG. 46 is a diagram illustrating a functional configuration of a video presentation apparatus in a tenth embodiment.

A video presentation apparatus 70 in the tenth embodiment includes a video input unit 71, a complementation method determination unit 72, a video complementation unit 73, and a video output unit 74 as shown in FIG. 46. By the video presentation apparatus performing the processes at steps shown in FIG. 47, the video presentation method in the tenth embodiment is implemented.

The video presentation apparatus is a special device configured by loading of a special program into a known or dedicated computer having a central processing unit (CPU), main memory (random access memory or RAM), and the like, for example. The video presentation apparatus executes various kinds of processing under control of the central processing unit, for example. Data input to the video presentation apparatus and/or data resulting from various kinds of processing are stored in the main memory, for example, and data stored in the main memory is read as required to be utilized for other processing. Also, at least part of the processing components of the video presentation apparatus may be formed of hardware such as an integrated circuit.

Figure 47:
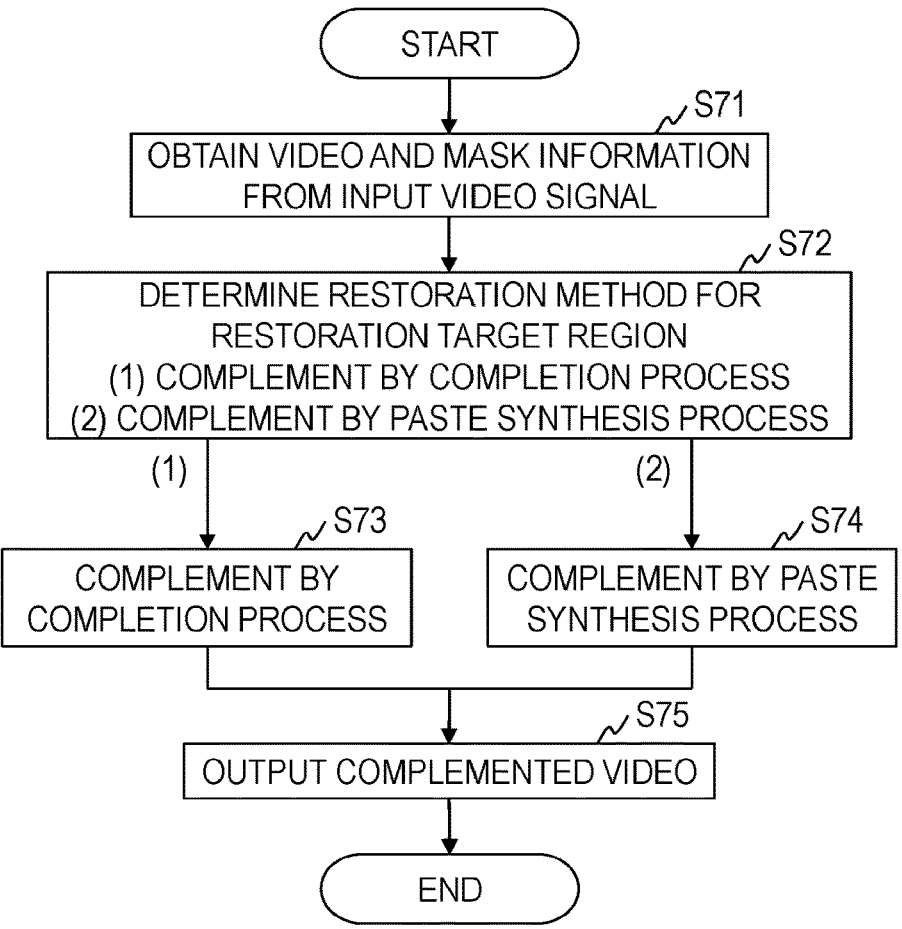
FIG. 47 is a diagram illustrating a processing procedure of a video presentation method in the tenth embodiment.

Referring to FIG. 47, the processing procedure of the video presentation method in the tenth embodiment will be described.

At step S71, the video input unit 71 receives as input a video sequence $V_{orig}$ composed of multiple frames and mask information D designating a complementation target region in the video sequence $V_{orig}$ The video sequence $V_{orig}$ and mask information D both have three-dimensional information on x (information on the x-axis in the frames), y (information on the y-axis in the frames), and t (time axis information), which are denoted as $V_{orig}(x, y, t)$, or as $V_{orig}(t)$ when designating only the time axis information. The mask information D may be either represented by a set of the positions of the pixels designated as the complementation target $\{(d_{x1}, d_{y1}, d_{t1}), (d_{x2}, d_{y2}, d_{t2}), \ldots, (d_{xn}, d_{yn}, d_{tn})\}$, or may be maintained as a binary moving image which indicates a lost region with 1 and other region with 0 in a video sequence of the same size as the video sequence $V_{orig}$ The video sequence $V_{orig}$ and mask information D are sent to the complementation method determination unit 72.

At step S72, the complementation method determination unit 72 receives the video sequence $V_{orig}$ and mask information D from the video input unit 71, and decides complementation method P(t) for complementing $V_{orig}(t)$ and reference region R(t) for use in complementation in each frame t forming the video sequence $V_{orig}$ ($1<t<n$, where n is the total number of frames in the video sequence $\backslash T_{orig}$). The complementation method P(t) represents the complementation method for frame t, indicating either of patch-search-based completion process or paste synthesis process with 0 or 1, for example. The reference region R(t) is represented as R(t)=t', where t' is a reference frame vector for frame t. The reference frame vector t' is a scalar vector with one or more elements, having the frame ID of the reference frame.

Specific methods for deciding the reference frame includes the following ones, for example. In this embodiment, however, any approach that can decide the reference frame may be used without being limited to the following methods.

A first method for deciding the reference frame is one that decides based on likeliness of being foreground. This method determines whether or not a region to be complemented (a complementation target region) of frame t that should be complemented is adjacent to an object which is likely to be foreground, such as a person, in the frame. If the region is adjacent to such an object, completion process is performed using the inside of the frame as the reference region, and otherwise paste synthesis process is performed using another frame in which the pixel positions of the complementation target region are not adjacent to a foreground object.

The reason for determination based on the likeliness of being foreground will be described. If the complementation target region is adjacent to an object which is likely to be foreground in the frame, such as a person, synthesis of pixels at the corresponding positions from another frame via a paste synthesis process results in part of the object, such as a person, being synthesized with background pixels and lost. In contrast, the patch-search-based completion process finds a region suitable for filling in the loss from other regions in the image and performs a complementation process based on the resulting information, so that a complementation process with lower visual inconsistency is likely to be performed. Thus, determination based on whether or not the complementation target region is adjacent to a region which is likely to be foreground is effective.

First, it is determined whether the complementation target region of the complementation target frame t is adjacent to another object in the frame or not. As this determination requires knowledge of the pixel positions of a region likely to be foreground in the frame, the background and the foreground are separated in some way and a foreground image S is generated. Although the approach to foreground-background separation is not specifically limited in this embodiment, a separation process can be performed in the following manner, for example.

First, k key frames F in the video sequence $V_{orig}$ are prepared. A "key frame" refers to a frame in a video sequence that is to be used as a reference in execution of the foreground-background separation process. While k may be set to any number as long as it satisfies 0<k<n (where n is the total number of frames in the video sequence $V_{orig}$), for a practical purpose, a number equivalent to about 10% of the total number of frames in the video sequence $V_{orig}$ may be set. The method for obtaining key frame F may be determined depending on the application, such as random acquisition or acquisition at constant intervals, for example. Then, differential images between the complementation target frame t and all of the key frames constituting the key frame F are determined and binarized. By this processing, the foreground and the background can be represented as binary values 1 and 0 (which is 0 and which is 1 is arbitrary). The total number of the binary images is also k, the same as the total number of key frames. Then, only those pixels that indicate the foreground in all of the k binary images are set as the foreground (specifically, the logical products (AND) of the k binary images are determined), and a foreground image S is generated.

Once the foreground image S has been generated, the number of pixels indicating the foreground on the foreground image S and located within a given distance d from the complementation target region of the complementation target frame t is counted, and the total number of them is set as C. If C is smaller than a certain threshold $C_{th}$, it is determined that no other object is present in the vicinity of the complementation target region, and a completion process is applied using the inside of the frame as the reference region with R(t)=t. Otherwise, a reference frame is decided from the frames in the video sequence $V_{orig}$ and paste synthesis process is performed using the frame as the reference region. Although the distance d may be set to any value equal to or greater than 0 and smaller than the vertical and horizontal resolutions of the image, it may be set to a relatively small value, such as 0<=d<5 [pixel], because it is intended to check for the presence or absence of an adjacent foreground. For strict checking of adjacency or non-adjacency, it is set at d=0. While the threshold $C_{th}$ may be set to any value from 0 to 255 inclusive, it may be set to about 50 to 150 for a practical purpose. Although the method for deciding the reference frame from the video sequence \$T_{orig}$ is not specifically limited herein, the following methods are possible, for example.

A frame (denoted as t') close to the complementation target frame t on the chronological axis is searched in sequence (the search may start either forward or backward in time), and the foreground-background separation process described above is performed on the frame t' to be searched per frame, obtaining a foreground image S'. Then, the number of pixels indicating the foreground on the foreground image S' and located within a given distance d from the complementation target region of the complementation target frame t is counted, and the total number of them is set as C. If C is smaller than a certain threshold $C_{th}$, it is determined that no other object is present in the vicinity of the complementation target region, and completion process is performed using the frame t' as the reference region with R(t)=t'. Otherwise, search is continued until frame t' satisfying the foregoing conditions is found.

A second method for deciding the reference frame is one that is based on difference in the amount of color feature from surroundings. In principle, this method is similar to the first method for deciding the reference frame, but it decides the reference frame and complementation method as described below based only on the amount of color feature.

First, it is checked whether an object to be restored positionally overlaps another object present in the frame or not based on the amount of color feature.

An average color of the video sequence $V_{orig}$(t) at pixel positions corresponding to the inside of the complementation target region R(t) of a certain frame t is denoted as $U_{in}$. Also, an average color of neighborhood pixels that are located within a given distance d from the complementation target region R(t) is denoted as $U_{out}$. The distance d may be set as in the above-described method. $U_{in}$ and $U_{out}$ are determined as in the formulae below.

$$U_{in}(t) = \frac{\sum_{(x,y)\in\Omega} u(x, y, t)}{\sum_{(x,y)\in\Omega} 1},$$

$$U_{out}(t) = \frac{\sum_{(x,y)\in\bar\Omega\cap\Theta} u(x, y, t)}{\sum_{(x,y)\in\bar\Omega\cap\Theta} 1}$$

Here, $\Omega$ represents a region of the reference region R(t) that is indicated by mask information D, and $\Theta$ represents a region of the reference region R(t) that is located within the given distance d from the region indicated by mask information D. u(x, y, t) represents the color information (for example, RGB) of $V_{orig}$(x, y, t).

If the difference $U_{diff}$ between the average colors $U_{in}$ and $U_{out}$ thus determined is smaller than a predefined threshold Th, the reference region is set only in the current frame and a completion process is performed using the inside of the frame as the reference region with R(t)=t. Otherwise, among frames t' that output $U_{out}$ which makes $U_{diff}$ smaller than threshold Th, a frame closest to the current frame t on the chronological axis is selected, and a paste synthesis process is performed using frame t' as the reference region with R(t)=t'. Although Th may be set to any value from 0 to 255 inclusive, it may be set to about 50 to 150 for a practical purpose. If there are multiple frames t'. only one of them may be selected by random decision, for example, or multiple frames may be kept as reference regions.

A third method for deciding the reference frame is one that employs segmentation. A known approach to group pixels in an image or video is a segmentation approach, such as Reference Literature 11. Segmentation is a technique to group regions that are similar based on similar colors or structures into one unitary region with an image as input. Using such an approach, a segment occupying a large number of pixels in an image can be identified, allowing the in-image positions of background pixels in frame t to be known. For example, a tag (for example, mound, player, fence, or the like) is first manually assigned by the user to each segment in the first frame of a sequence, and segments classified into the same tags as those tags are checked in the remaining frames, thereby knowing whether a segment of interest is the background or the foreground.

Reference Literature 11: Chen, L. Cao, Y. Wang, J. Liu, and X. Tang, "Image Segmentation by MAP-ML Estimations," IEEE Transactions on Image Processing (TIP), vol. 19, no. 9, pp. 2254-2264, 2010.

Utilizing such segmentation, when neighborhood pixels located within the given distance d from the complementation target region R(t) of a certain frame t is found to be background, it is determined that complementation only from in-frame information would be easy, and a completion process is performed using the inside of the frame as the reference region with R(t)=t. Otherwise, among frames t' in which pixels at pixel positions corresponding to the complementation target region R(t) of another frame are background, the frame closest to the current frame t on the chronological axis is selected, and paste synthesis process is applied using frame t' as the reference region with R(t)=t'. The distance d may be set as in the method described above. If there are multiple frames t', only one of them may be selected by random decision, for example, or multiple frames may be kept as reference regions.

At step S73, if the restoration method P received from the complementation method determination unit 72 indicates patch-search-based completion process, the video complementation unit 73 receives video sequence $V_{orig}$, mask information D, and reference region R from the complementation method determination unit 72, and complements the complementation target region in the video sequence $V_{orig}$ indicated by the mask information D using the reference region R via a patch-search-based completion process, and generates a complemented video sequence $V_{out}$. The complemented video sequence $V_{out}$ is sent to the video output unit 74.

At step S74, if the restoration method P received from the complementation method determination unit 72 indicates paste synthesis process, the video complementation unit 73 receives the video sequence $V_{orig}$, mask information D, and reference region R from the complementation method determination unit 72, and complements the complementation target region in the video sequence $V_{orig}$ indicated by the mask information D using the reference region R via paste synthesis process, and generates a complemented video sequence $V_{out}$. The complemented video sequence $V_{out}$ is sent to the video output unit 74.

At step S75, the video output unit 74 receives the complemented video sequence $V_{out}$ from the video complementation unit 73 and outputs it through an extrinsic video output means. The video output means may be a head mounted display, a liquid crystal display, a projector, and the like connected to a video output terminal of the video presentation apparatus, for example.

Experimental Results with the Tenth Embodiment

With reference to the experimental results concerning actual calculation time shown in FIG. 48, improvement in calculation time and image quality in particular compared to complementation solely by a conventional technique (in-frame completion process or paste synthesis process) is described. The results shown in (1) to (4) of FIG. 48 are as follows. (1) (He+2014) is an experimental result based on the in-frame completion process described in Reference Literature 9. (2) (Paste synthesis) is an experimental result with paste synthesis process. (3) (Newson+2014) is an experimental result with the moving image completion process based on three-dimensional patch described in Reference Literature 10. (4) (The present technique) is an experimental result with the video presentation apparatus of the tenth embodiment. The results shown in (A) and (B) of FIG. 48 are experimental results for the following video sequences, respectively. (A) A video with its sequence including a frame in which a ball as the restoration target region is adjacent to a pitcher as a foreground region, thus making paste synthesis process difficult, whereas sense of inconsistency is less likely to occur in the result of applying in-frame completion because the background is uniform. (B) A video with no frame in which a ball as the restoration target region is adjacent to or overlaps a pitcher as a foreground region in a sequence, thus making paste synthesis process relatively easy, whereas in-frame completion is difficult because the background contains complicated texture such as a fence.

Image quality obtained when the calculation times in FIG. 48(A) were computed in experiments is described below. (A) is an experimental result using a scene that cannot be complemented well by paste synthesis process in the frame of interest because it includes a frame in which a ball as the complementation target region is adjacent to a person (pitcher), but on the other hand causes low sense of inconsistency even with in-frame completion because the background is uniform. When the background does not contain texture complicated by soil of a mound or the like, sense of inconsistency upon application of in-frame completion is low; thus, the in-frame completion process of (1) is effective for this scene. In contrast, with the paste synthesis process of (2), if the removal target region is adjacent to a foreground, pasting of pixels from another frame results in part of the pitcher's body being complemented with pixels of a mound soil region, leading to significant degradation of image quality. The moving image completion process of (3) is also effective, but it incurs an enormous calculation time (see FIG. 48). The present technique of (4) determines which one of (1) and (2) is an appropriate complementation approach per frame; the in-frame completion process of (1) was determined to be appropriate for frames whose image quality significantly degraded with the paste synthesis process of (2), whereas the faster process, namely (2), was selected for the other frames. Consequently, the image quality was significantly improved relative to (2).

Image quality obtained when the calculation times in FIG. 48(B) were computed in experiments is described below. (B) is an experimental result using a scene that causes low sense of inconsistency even with complementation using paste synthesis process because a ball as the complementation target region is not adjacent to a person, whereas the background contains complicated texture structures and in-frame completion is likely to fail. When the background has a complicated texture structure, such as a fence, the in-frame completion of (1) is likely to fail in complementation of the background texture, causing a frame complemented with a loss of a linear structure of the fence. Consequently, temporal consistency is not maintained, which can cause significant sense of inconsistency when it is viewed as a moving image sequence. In contrast, with the paste synthesis process of (2), synthesis with low sense of inconsistency was possible because it can use a correct texture structure present in another frame. As with the example (A), the moving image completion process of (3) is also effective, but it incurs an enormous calculation time (see FIG. 48). The present technique of (4) performs complementation using the method of (2) when the ball as the complementation target region is not adjacent to the foreground (the pitcher), so that the approach (2), which performs complementation from another frame, was determined to be appropriate also for a frame that was complemented with a loss of a linear structure of the fence with the approach of (1). Consequently, the image quality was significantly improved relative to (1).

In the examples of FIGS. 48 (A) and (B), either the paste synthesis process or the completion process failed, respectively, resulting in complementation with sense of inconsistency. By using either of the two approaches depending on the frame via automated determination, the present technique is capable of automatically performing successful complementation of even a scene which was difficult to complement previously.

FIG. 48 shows the results of comparing the execution times for the scenes shown in (A) and (B), respectively. The paste synthesis process of (2) requires the smallest execution time in all the cases, but can be insufficient in terms of image quality as mentioned above. In contrast, the present technique shown in (4) improves the image quality while having the next smallest calculation time to (2) (an execution time of 31.1% of (1) in (A), and an execution time of 2.5% of (1) in (B)). Therefore, the present technique is considered to be effective in that it can shorten the calculation time while improving the image quality.

With the configuration described above, the tenth embodiment performs complementation by a patch-search-based completion process if a foreground object is present in the vicinity of the complementation target region and by a paste synthesis process if there is no foreground object in the vicinity of the complementation target region. It can thus efficiently complement a video containing a region that requires complementation due to an unwanted pictured item or the like.

Eleventh Embodiment

In these years, cameras capable of capturing a 360° panoramic image (hereinafter referred to as "omnidirectional cameras") have been increasingly popular. A panoramic image (hereinafter referred to as "omnidirectional image") captured by an omnidirectional camera can be captured by installing an omnidirectional camera at a desired viewpoint position. However, since it hinders players in play, an omnidirectional camera cannot be installed in a sports court such as a soccer court or a basket court. Thus, it is not possible to capture an omnidirectional image during play at a desired viewpoint position in a sports court.

Accordingly, one proposed technique sets a virtual viewpoint, which is an imaginary viewpoint, at a location where an omnidirectional camera cannot be installed and obtains an omnidirectional image looking like one captured by an omnidirectional camera at the virtual viewpoint by synthesizing images captured by multiple cameras installed outside the court (see Reference Literature 5, for instance). In the following description, an omnidirectional image at a virtual viewpoint is described as a virtual omnidirectional image.

A specific example of a system that obtains a virtual omnidirectional image by synthesis of images captured by multiple cameras is described.

Figure 61:
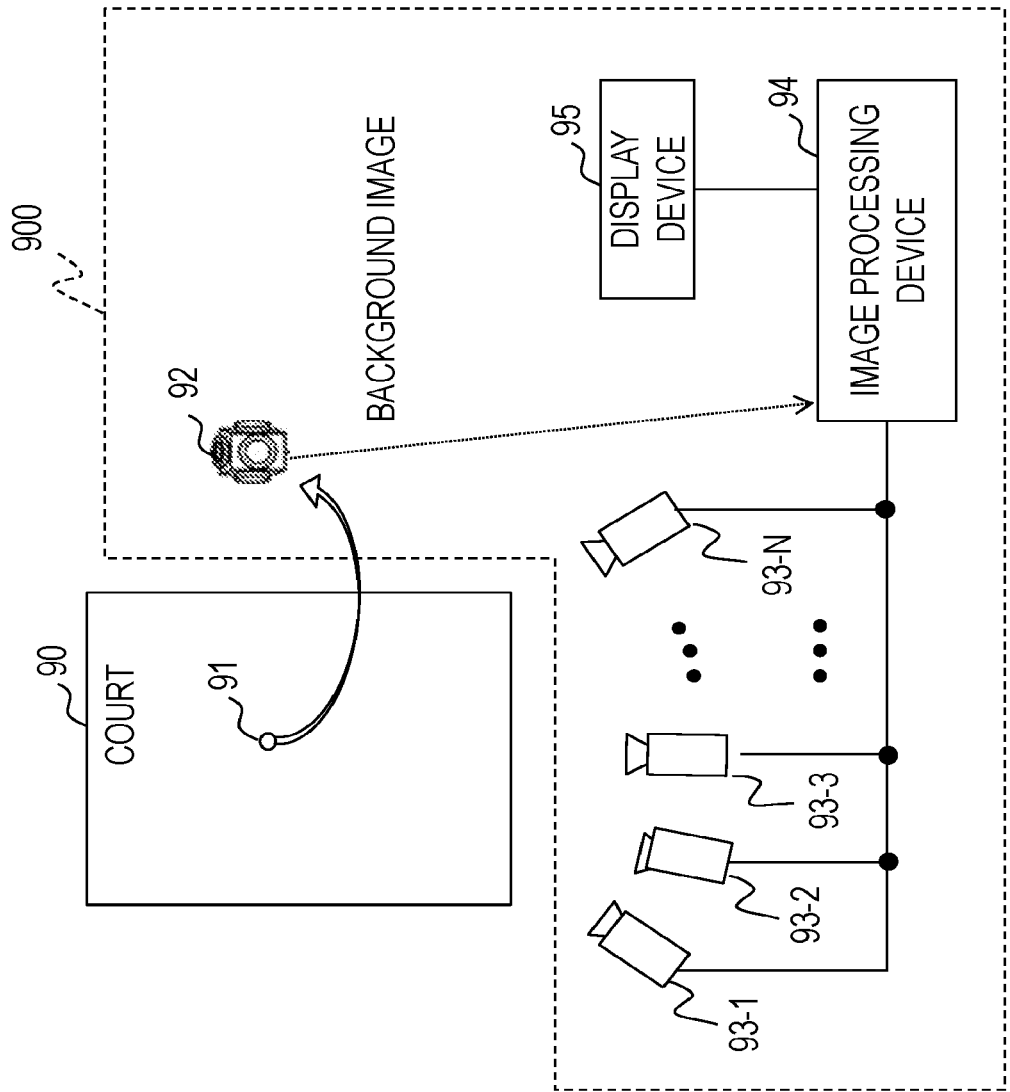
FIG. 61 is a diagram showing a system for obtaining a virtual omnidirectional image in a conventional system.

FIG. 61 is a diagram showing a system for obtaining a virtual omnidirectional image with a conventional system. As shown in FIG. 61, an image processing system 900 includes an omnidirectional camera 92, multiple cameras 93-1, 93-2, 93-3, . . . , 93-N (hereinafter referred to as "camera group 93") (N being an integer equal to or greater than 4), an image processing device 94, and a display device 95. In a case where a virtual viewpoint 91 is set within a sports court 90, the image processing system 900 obtains a virtual omnidirectional image at the virtual viewpoint 91 by synthesis of images captured by the camera group 93 installed outside the sports court 90.

The omnidirectional camera 92 is a camera for capturing omnidirectional images. The omnidirectional camera 92 is installed at the position of the virtual viewpoint 91 in the sports court 90 at a timing prior to play. The omnidirectional camera 92 captures an image to be a background in a virtual omnidirectional image from the position of the virtual viewpoint 91 (hereinafter referred to as "background image"). The background image captured by the omnidirectional camera 92 is input to and accumulated in the image processing device 94. In this manner, the image processing device 94 accumulates background images beforehand.

Around the sports court 90, the camera group 93 is installed. The cameras 93-1, 93-2, 93-3, . . . , 93-N of the camera group 93 are installed around the sports court 90 such that each has an angle of view including the virtual viewpoint 91. The camera group 93 captures a region including the virtual viewpoint 91. The image processing device 94 applies image processing to images captured by the cameras 93-1, 93-2, 93-3, . . . , 93-N of the camera group 93 and synthesizes the images after the image processing with a background image to generate a virtual omnidirectional image. The display device 95 is an image display device, such as a liquid crystal display, an organic electro luminescence (EL) display, or a cathode ray tube (CRT) display. The display device 95 displays the virtual omnidirectional image generated by the image processing device 94.

Figure 62:
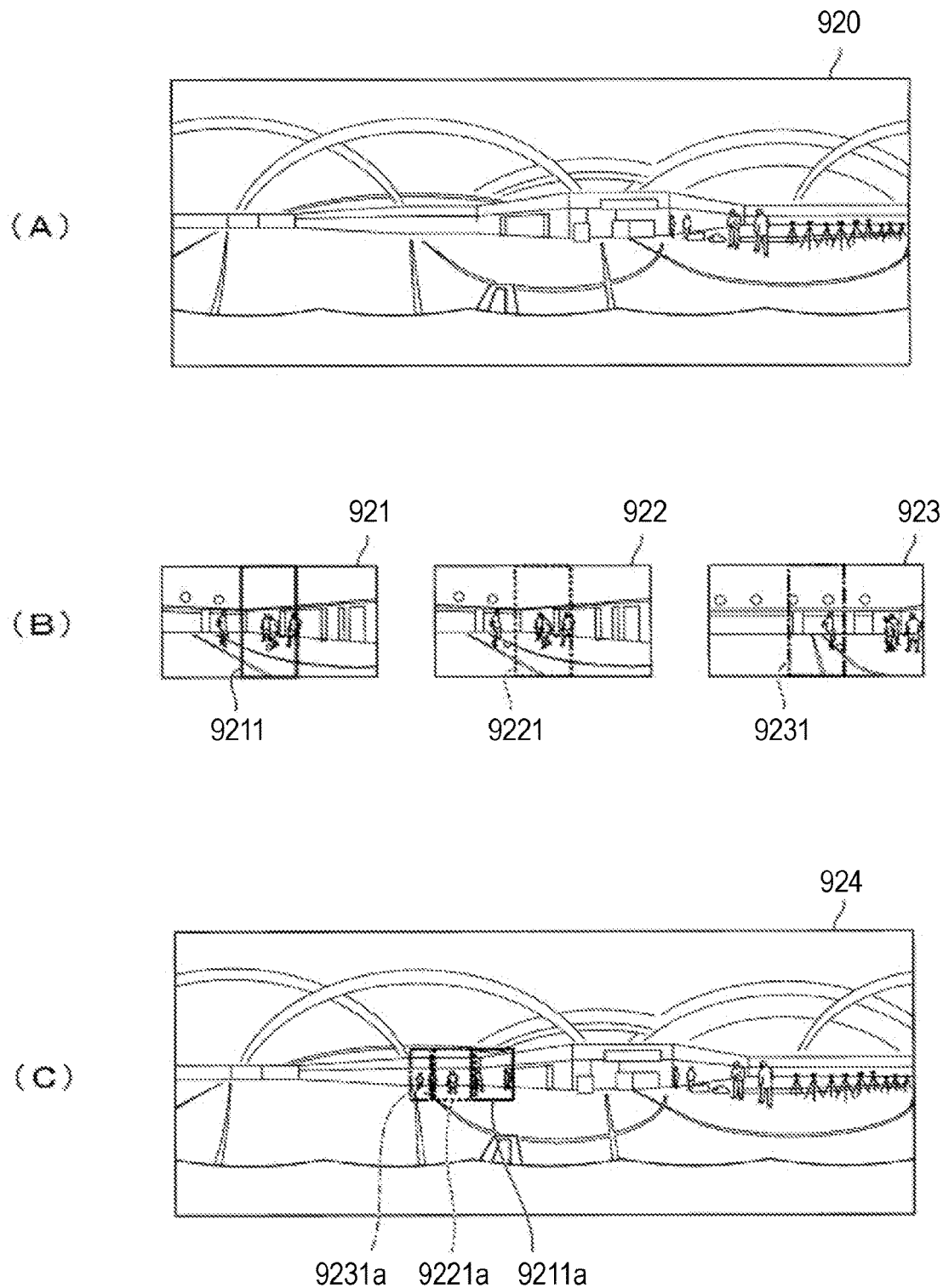
FIG. 62 is a diagram for describing a flow of image processing in an image processing system.

Next, a specific example of image processing in the image processing system 900 is described with FIG. 62.

FIG. 62 is a diagram for describing a flow of image processing in the image processing system 900. FIG. 62(A) is a diagram showing a specific example of a background image 920. In the background image 920, subjects in all directions (360 degrees) about the virtual viewpoint 91 are captured. Since the background image 920 is an image captured when there are no people in the sports court 90, no people are captured in the sports court 90.

FIG. 62(B) is a diagram showing images captured by cameras 93-1, 93-2, and 93-3. In FIG. 62(B), from the left, an image 921 captured by the camera 93-1, an image 922 captured by the camera 93-2, and an image 923 captured by the camera 93-3 are shown. The image processing device 94 extracts regions 9211, 9221, 9231 including the virtual viewpoint 91 from the images 921 to 923, respectively. The image processing device 94 performs image processing on the images of the extracted regions 9211, 9221, 9231, thereby generating partial images 9211a, 9221a, 9231a, which can be synthesized with the background image 920.

The image processing device 94 synthesizes the partial images 9211a, 9221a, 9231a with the background image 920 to thereby generate a virtual omnidirectional image 924. FIG. 62(C) is a diagram showing an example of a virtual omnidirectional image 924 generated by the image processing device 94. As shown in FIG. 62(C), in predetermined regions of the virtual omnidirectional image 924, the partial images 9211a, 9221a, 9231a have been synthesized. Consequently, an image with subjects (for example, people) captured on the sports court 90 is generated as the virtual omnidirectional image 924. In the conventional image processing system 900, the optical centers of the camera group 93 used for synthesis and the optical center of the omnidirectional camera 92 imagined at the virtual viewpoint 91 are different from each other. Thus, a synthesized virtual omnidirectional image 924 contains a geometrically incorrect image. To prevent this, the image processing device 94 needs to perform image processing on the partial images 9211a, 9221a, 9231a so as to maintain consistency at a point in depth, which indicates the distance from the virtual viewpoint 91, and synthesize them with the background image 920.

However, when a partial image of a subject (for example, a person) that is not present at a depth at which consistency can be maintained but present at another depth is synthesized with the background image 920, the consistency of depth cannot be maintained through image processing. Such a subject lacking depth consistency causes phenomena such as its image becoming a multi-image or disappearing in the virtual omnidirectional image 924. Thus, when the depth of a subject is not known, there is the problem of appropriate synthesis being impossible. This problem is common to all cases of synthesizing images captured by multiple image capturing devices.

In view of the situation, an object of the eleventh embodiment is to provide a technique capable of deciding an optimal depth for an image captured by each of multiple image capturing devices.

An aspect of the eleventh embodiment is an optimal depth decision apparatus including a decision unit that, using a plurality of input images respectively captured by at least two image capturing device installed around a region including a predetermined position such that the region including the predetermined position will be an image capturing range, and assuming that the predetermined position is a virtual viewpoint which is an imaginary viewpoint, generates synthetic images with a plurality of different depths representing distances from the virtual viewpoint, computes a contrast from each of multiple synthetic images generated, and decides a depth of a synthetic image with a highest contrast among the multiple synthetic images as an optimal depth for each input image based on the computed contrasts.

The eleventh embodiment will be described below with reference to drawings.

Figure 49:
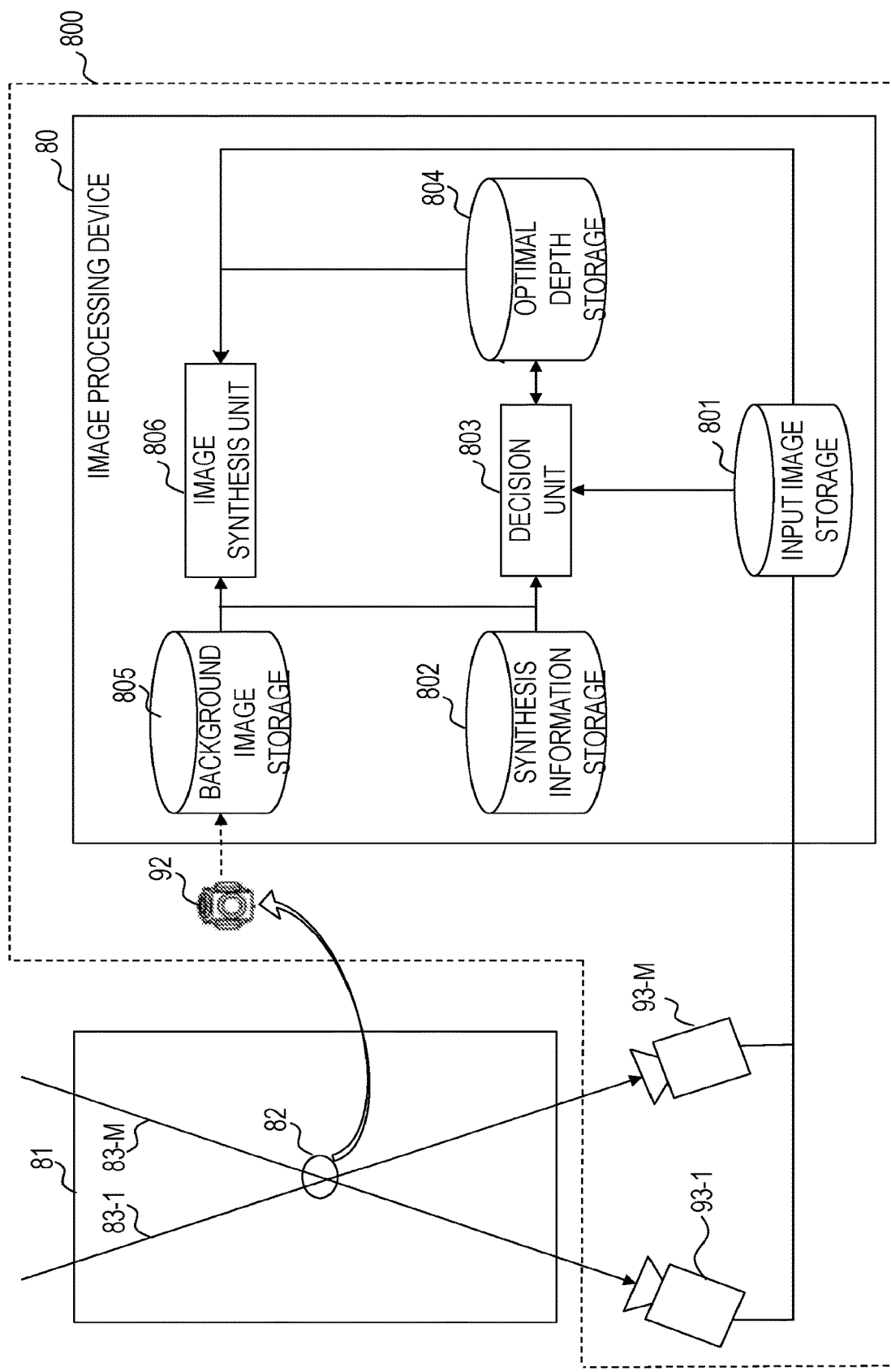
FIG. 49 is a diagram showing a system configuration of an image processing system.

FIG. 49 is a diagram showing a system configuration of an image processing system 800 in the eleventh embodiment.

The image processing system 800 includes an omnidirectional camera 92, multiple cameras 93-1 to 93-M (M being an integer equal to or greater than 2), and an image processing device 80. In the following description, the cameras 93-1 to 93-M will be described as camera 93 when they are not specifically distinguished.

The omnidirectional camera 92 is installed at the position of a virtual viewpoint 82 in an image-capturing target region 81. The image-capturing target region 81 is a sports court such as a soccer court or a basket court, for example. The virtual viewpoint 82 is a viewpoint virtually set in a predetermined region (the image-capturing target region 81 in this embodiment). The omnidirectional camera 92 captures an omnidirectional image at the position of the virtual viewpoint 82. An omnidirectional image in this embodiment includes the entire image-capturing target region 81 around the virtual viewpoint 82. Processing by the omnidirectional camera 92 is performed before start of processing by the image processing device 80. The omnidirectional camera 92 outputs a captured omnidirectional image to the image processing device 80 as a background image.

The M cameras 93-1, 93-2, . . . , 93-M are cameras provided outside the image-capturing target region 81 for capturing images as moving images (video), and they capture regions including the virtual viewpoint 82. Moving images captured by the M cameras 93-1, 93-2, . . . , 93-M are composed of multiple-frame images. As shown in FIG. 49, a ray 83-1 passing over the position of the virtual viewpoint 82 is input to the camera 93-1, while a ray 83-2 passing over the position of the virtual viewpoint 82 is input to the camera 93-2. Hereinafter, a ray input to the camera 93 will be described as actual ray. Although not shown in FIG. 49, the cameras 93 are installed around the image-capturing target region 81. That is, the cameras 93 are installed so as to surround the image-capturing target region 81 such that each has an angle of view including the virtual viewpoint 82. In FIG. 49, M is an integer equal to or greater than 2 and is a greater value as the image-capturing target region 81 is larger if a virtual omnidirectional image of similar image quality is to be obtained. Also, given the image-capturing target region 81 of the same size, a greater value of M results in a larger area of a synthetic region (a region where images from the M cameras 93 are synthesized in a virtual omnidirectional image), or given the synthetic region of the same size, a greater value of M is required for yielding higher image quality of a virtual omnidirectional image, which in turn improves the image quality of the synthetic region.

The image processing device 80 obtains input images from moving images respectively captured by the M cameras 93-1, 93-2, . . . , 93-M beforehand. The captured moving images are each composed of multiple-frame images, and the image processing device 80 in this embodiment obtains as an input image an image of a frame to be processed. The image processing device 80 generates a virtual omnidirectional image based on an omnidirectional image captured by the omnidirectional camera 92 and on input images obtained respectively from moving images captured by the M cameras 93-1, 93-2, . . . , 93-M respectively. Specifically, the image processing device 80 decides the optimal depth from an input image, extracts a region from the input image based on the depth decided, and overlays the extracted region on the omnidirectional image, thereby generating a virtual omnidirectional image.

The eleventh embodiment is described for the case where two neighboring cameras 93 (cameras 93-1 and 93-2) are provided in the image processing system 800 as an example. In the following description, the set of the neighboring cameras 93 (for example, the set of cameras 93-1 and 93-2) will be described as camera pair.

The image processing device 80 has a central processing unit (CPU), memory, an auxiliary storage device, and the like connected by a bus, and executes an image processing program. By executing the image processing program, the image processing device 80 functions as a device including an input image storage 801, a synthesis information storage 802, a decision unit 803, an optimal depth storage 804, a background image storage 805, and an image synthesis unit 806. All or some of the functions of the image processing device 80 may be implemented with hardware, such as an application specific integrated circuit (ASIC), a programmable logic device (PLD), or a field programmable gate array (FPGA). The image processing program may be recorded in a computer-readable recording medium. A computer-readable recording medium is a storage device such as a portable medium like a flexible disk, magneto-optical disk, ROM, or CD-ROM, or a hard disk built in a computer system, for example. The image processing program may also be transmitted and received via a telecommunication line.

The input image storage 801 is configured with a storage device such as a magnetic hard disk device or a semiconductor storage device. The input image storage 801 stores input images from each camera 93 in chronological order in association with a camera ID identifying the camera 93. An input image includes the time of its capturing and image data of a moving image.

The synthesis information storage 802 is configured with a storage device such as a magnetic hard disk device or a semiconductor storage device. The synthesis information storage 802 stores a synthesis information table. The synthesis information table is composed of records (hereinafter "synthesis information records") representing information used for overlaying an image on a background image (hereinafter "synthesis information").

FIG. 50 is a diagram showing a specific example of the synthesis information table.

The synthesis information table has multiple synthesis information records. A synthesis information record has the values of camera ID and synthesis information. The value of camera ID represents identification information for identifying a camera 93. For example, the camera 93 identified by camera ID "$C_1$" in FIG. 50 is camera 93-1, and the camera 93 identified by camera ID "$C_2$" is camera 93-2.

The value of synthesis information represents information used for overlaying an image generated from an image (an input image) captured by the camera 93 identified by the camera ID of the same synthesis information record on a background image. Specific examples of synthesis information include depth, extraction region information, and conversion information.

The depth value of a certain synthesis information record represents the distance of the camera 93 identified by the camera ID from the virtual viewpoint 82. In the example shown in FIG. 50, N levels of depth are registered in the synthesis information table per camera ID. N is an integer equal to or greater than 2. Depth 1 to depth N are set between the virtual viewpoint 82 and an edge of the image-capturing target region 81. The number of depths being set is preferably a number that ensures the accuracy of optimal depth decision to a certain degree.

The value of extraction region information in a certain synthesis information record represents information concerning a region to be extracted from an image (input image) captured by camera 93 identified by the camera ID (hereinafter referred to as "extraction region"). Specific examples of extraction region information include upper left coordinates, width, and height. The upper left coordinates represents coordinates at the upper left corner of the extraction region. The width represents the width of the extraction region. The height represents the height of the extraction region. The width and height are set in a range that is referenced to the upper left coordinates of the extraction region and that includes the virtual viewpoint 82. The extraction region is desirably set as a region such that no gap is formed between images from neighboring cameras 93 in an image overlaid on a background image. In the following description, an image of a partial region extracted from an input image in accordance with extraction region information is described as partial region image.

The value of conversion information in a certain synthesis information record represents information for converting a partial region image extracted in accordance with the extraction region information to a partial image. A partial image is generated by applying a deformation process, such as zooming up, zooming down, and rotation, on a partial region image in accordance with conversion information in order to overlay the partial region image on a corresponding region of a background image without sense of inconsistency. The deformation process is performed by applying affine transformation to the image, for example. Conversion information in the case of applying affine transformation to an image is an affine transformation matrix, for example. While the following shows an example of using affine transformation as the deformation process on a partial region image, the deformation process needs not be limited to affine transformation but may be any kind of processing that performs transformation of an image, such as by zooming up, zooming down, and rotation, in accordance with conversion information. The affine transformation matrix includes information indicating a region on which a partial image is overlaid in a background image (hereinafter referred to as "overlay information").

An affine transformation matrix is derived in advance in the manner shown below and stored in the synthesis information storage 802. For example, a chessboard with a grid pattern is placed at each of positions located at different distances (depths) (depth 1 to depth N in the example of FIG. 50) from the virtual viewpoint 82, and an image including the chessboard captured by the omnidirectional camera 92 installed at the virtual viewpoint 82 is compared with an image including the chessboard captured by the camera 93. Then, for each grid of the chessboard, an affine transformation matrix is determined that converts the images such that the grid of the chessboard in the image captured by the omnidirectional camera 92 and the grid of the chessboard in the image captured by the camera 93 correspond to each other. In this manner, an affine transformation matrix corresponding to each of depth 1 to depth N, at which the chessboard is placed, is determined.

As shown in FIG. 50, in the synthesis information table, N levels of depth are registered per camera ID, and conversion information is registered for each of depths 1 to N. In FIG. 50, the synthesis information record registered in the topmost row of the synthesis information table has a camera ID value of "$C_1$", a depth value of "depth 1", an upper left coordinate value of "(A, B)", a width value of "C", a height value of "D", and a conversion information value of "$A1_{j1}$" (j is an integer equal to or greater than 1). That is, it indicates that in the case of depth 1 for the camera 93-1 identified by camera ID "$C_1$", the partial region represented by the upper left coordinates (A, B), the width C, and the height D is extracted from an input image, and the deformation process "$A1_{j1}$" is applied to the extracted partial region.

Referring back to FIG. 49, description on the image processing device 80 is continued.

The decision unit 803 takes input images of the camera pair stored in the input image storage 801 and the synthesis information table stored in the synthesis information storage 802 as input. The decision unit 803 decides the optimal depth for each input image of each camera 93 based on the input images of the camera pair and the synthesis information table input to it. Here, an optimal depth represents a depth at which a multi-image or disappearance is less visible than at other depths in relation to a subject captured in an input image.

Next, specific processing by the decision unit 803 will be described.

The decision unit 803 first generates a partial region image of each input image by extracting a partial region from the input image based on extraction region information corresponding to one depth (for example, depth 1) in the synthesis information table. The decision unit 803 then performs a deformation process based on the affine transformation matrix in conversion information corresponding to the one depth (for example, depth 1) in the synthesis information table on the generated partial region image of each input image, thereby generating a partial image of each input image. The decision unit 803 then uses the generated partial image of each input image to generate a synthetic image for deciding the optimal depth for each input image (hereinafter referred to as "depth decision synthetic image"). For example, the decision unit 803 generates a depth decision synthetic image based on overlay information included in conversion information. The decision unit 803 computes a contrast of an overlapping region of the generated depth decision synthetic image. In this embodiment, a case where contrast is determined as luminance difference is described by way of example. For determination of contrast as luminance difference, Formula 1 discussed later is used. The decision unit 803 performs the above process on all of the depths 1 to N. The decision unit 803 then decides the depth of the depth decision synthetic image with the highest contrast among the contrasts computed at all the depths 1 to N as the optimal depth for each input image of the camera pair. The decision unit 803 decides the optimal depth for each input image of each camera 93 from the optimal depth decided for each input image of the camera pair. When there is a single camera pair as in this embodiment, the decision unit 803 may decide the optimal depth for each input image of the camera pair as the optimal depth for input image of each camera 93. A case with multiple camera pairs is described later. The decision unit 803 stores the decided optimal depth information for each input image of each camera 93 in the optimal depth storage 804. The decision unit 803 performs the above process on the input images of the camera pair at each time.

The optimal depth storage 804 is configured with a storage device such as a magnetic hard disk device or a semiconductor storage device. The optimal depth storage 804 stores the optimal depth information table. The optimal depth information table is composed of records representing information about the optimal depth for each input image of each camera 93 (hereinafter referred to as "optimal depth information record").

FIG. 51 is a diagram showing a specific example of the optimal depth information table.

The optimal depth information table has multiple optimal depth information records. An optimal depth information record has the values of time and optimal depth. The value of time represents the time at which the input image was captured. The value of optimal depth in a certain optimal depth information record represents the optimal depth for the input image of each camera 93 captured at a certain time.

In the example shown in FIG. 51, information on optimal depth at each time is registered in the optimal depth information table. In FIG. 51, the optimal depth information record registered in the topmost row of the optimal depth information table has a time value of "t", an optimal depth value for the input image of camera 93-1 of "d1(t)", and an optimal depth value for the input image of camera 93-2 of "d2(t)". That is, it indicates that the optimal depths for the images (input images) captured by cameras 93-1 and 93-2 at time t are "d1 (t)" and "d2(t)" respectively.

The background image storage 805 is configured with a storage device such as a magnetic hard disk device or a semiconductor storage device. The background image storage 805 stores an omnidirectional image captured by the omnidirectional camera 92 as a background image.

The image synthesis unit 806 takes as input an input image of each camera 93 stored in the input image storage 801, the synthesis information table stored in the synthesis information storage 802, the optimal depth information table stored in the optimal depth storage 804, and a background image stored in the background image storage 805. The image synthesis unit 806 generates a virtual omnidirectional image based on the input image of each camera 93, the synthesis information table, the optimal depth information table, and the background image input to it. Specifically, the image synthesis unit 806 references the optimal depth information table to obtain information on the optimal depth for the input image of a certain camera 93 (for example, camera 93-1) at a certain time (for example, time t). The image synthesis unit 806 obtains extraction region information corresponding to the optimal depth for the certain camera 93 (for example, camera 93-1) from the synthesis information table based on the obtained optimal depth for the input image of the camera 93. The image synthesis unit 806 extracts a partial region from the input image based on the obtained extraction region information to thereby generate a partial region image.

The image synthesis unit 806 obtains conversion information corresponding to the optimal depth for the certain camera 93 (for example, camera 93-1) from the synthesis information table. The image synthesis unit 806 performs a deformation process based on the affine transformation matrix in the obtained conversion information on the generated partial region image to thereby generate a partial image of the input image. The image synthesis unit 806 performs processing up to generation of a partial image on the input image of each camera 93 at a certain time.

Subsequently, the image synthesis unit 806 overlays the generated partial image on the background image based on the overlay information included in the affine transformation matrix, thereby generating a virtual omnidirectional image. More specifically, the image synthesis unit 806 generates a virtual omnidirectional image by replacing the pixel values in a region of the background image onto which the partial image is to be overlaid with the pixel values of the partial image. The image synthesis unit 806 performs processing for generating a virtual omnidirectional image on input images at each time, thereby generating a virtual omnidirectional image at each time. The image synthesis unit 806 outputs the generated virtual omnidirectional image.

In the following description, the entire processing by the image synthesis unit 806 described above will be described as image synthesis process step.

Figure 52:
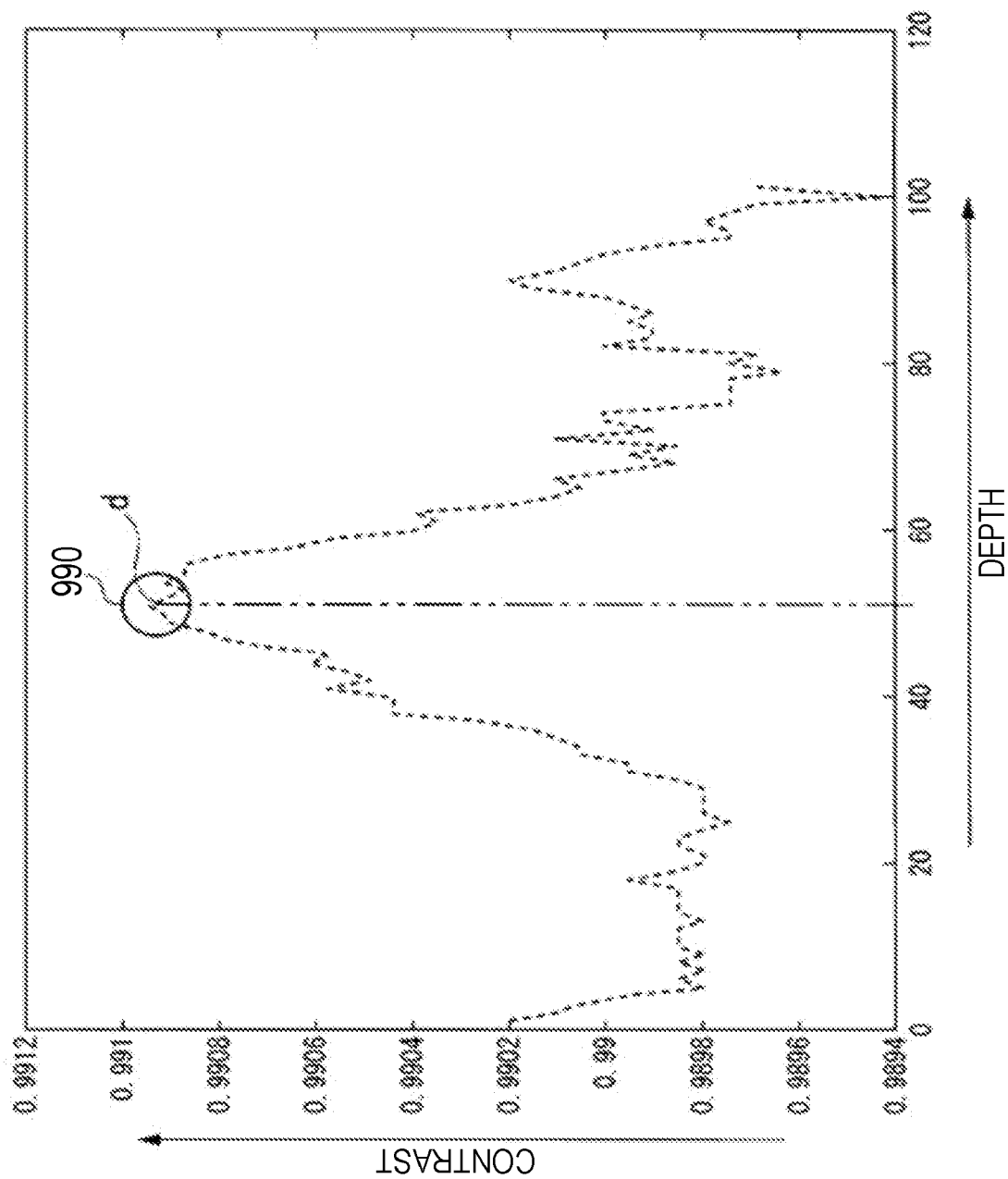
FIG. 52 is a diagram showing a specific example of contrast computation results.

FIG. 52 is a diagram showing a specific example of contrast computation results.

In FIG. 52, the vertical axis represents contrast and the horizontal axis represents depth. A depth value closer to 0 represents a depth at a shorter distance from the virtual viewpoint 82, and a higher depth value represents a depth at a longer distance from the virtual viewpoint 82. In FIG. 52, the contrast at depth d, indicated by a circle 990, is highest. In this case, the decision unit 803 decides depth d as the optimal depth for each input image of the camera pair.

Figure 53:
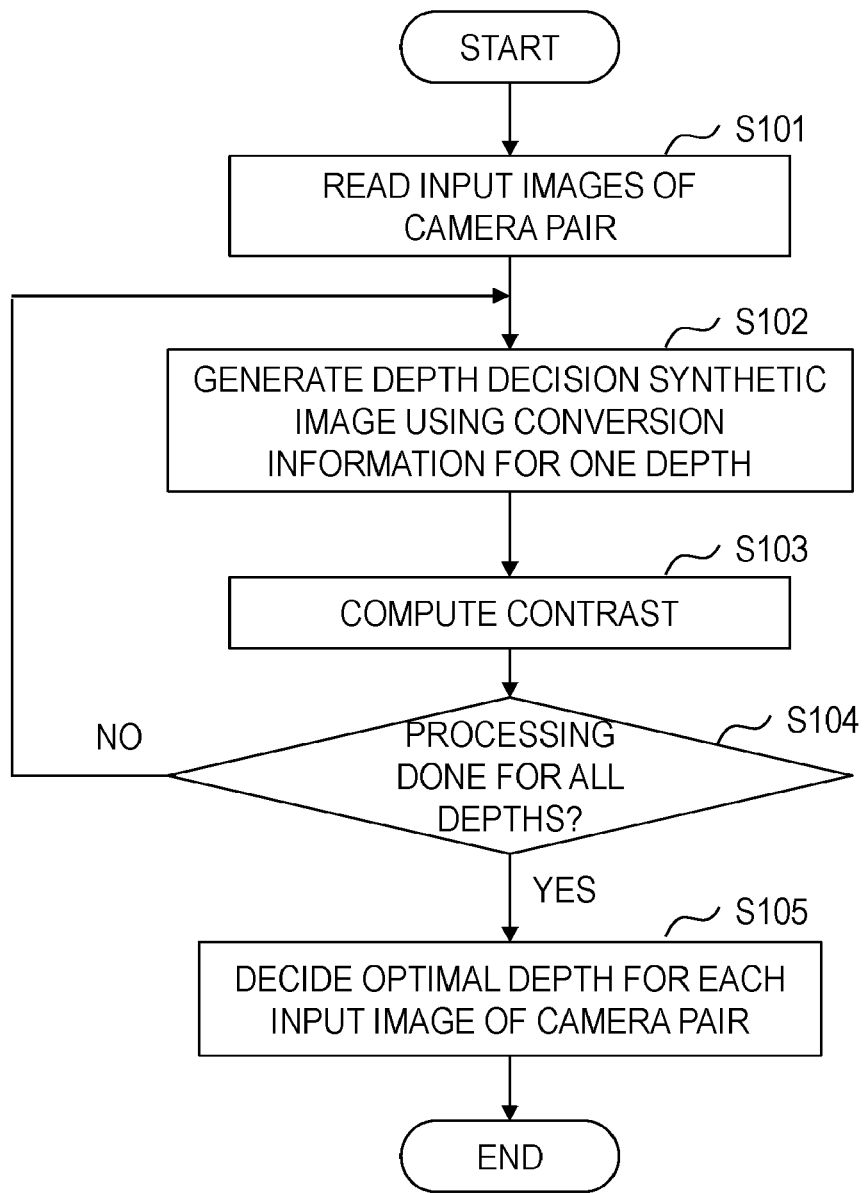
FIG. 53 is a diagram illustrating a processing procedure of an image processing device in an eleventh embodiment.

FIG. 53 is a flowchart showing a flow of processing by the image processing device 80.

The decision unit 803 reads input images of the camera pair at an identical time from the input image storage 801 (step S101). The decision unit 803 then generates a depth decision synthetic image using conversion information for one depth based on the input images it read out and the synthesis information table stored in the synthesis information storage 802 (step S102). For selection of one depth, any method that can select a depth not already processed may be used. For example, the decision unit 803 may select depths in sequence starting from a depth closer to the virtual viewpoint 82, randomly select depths, or otherwise select depths. The decision unit 803 then computes a contrast of an overlapping region of the generated depth decision synthetic image based on Formula 1 below (step S103). Formula 1 is an example of the way of determining a contrast. In Formula 1, $L_{min}$ represents the minimum luminance value of an overlapping region in an image, and $L_{max}$ represents the maximum luminance value of the overlapping region in the image.

$$\text{Contrast} = \frac{L_{max} - L_{min}}{L_{max} + L_{min}} \quad \text{(Formula 1)}$$

Subsequently, the decision unit 803 determines whether the contrast computation process has been performed on all the depths or not (step S104). If the contrast computation process has not been performed on all the depths (step S104: NO), the decision unit 803 repeatedly executes the processing at step S102 onward.

In contrast, if the contrast computation process has been performed on all the depths (step S104: YES), the decision unit 803 decides the optimal depth for each input image of the camera pair based on the contrasts computed for all the depths (step S105).

In the following description, the process from step S102 to step S105 in FIG. 53 will be described as camera pair depth decision process.

The image processing device 80 configured as described above can decide the optimal depth for an image captured by each of multiple image capturing devices. This effect will be described in detail below.

The image processing device 80 uses input images of the camera pair to generate depth decision synthetic images for all depths. The image processing device 80 then computes a contrast from each of the depth decision synthetic images generated for all depths, and selects the depth decision synthetic image with the highest contrast computed. When contrast is low, the image is likely to be blurry. That is, it is likely to be an image with occurrence of a multi-image or disappearance associated with synthesis. Accordingly, the image processing device 80 can select an image less likely to have occurrence of a multi-image or disappearance by selecting the depth decision synthetic image with the highest contrast. Thus, the optimal depth for an image captured by each of multiple image capturing devices can be decided.

Modification of the Eleventh Embodiment

The input image storage 801, the synthesis information storage 802, the decision unit 803, and the optimal depth storage 804 of the image processing device 80 may be configured as an optimal depth decision apparatus.

Although this embodiment describes a case with a single camera pair, two optimal depths would be present for each camera 93 when there are multiple camera pairs. For example, for a certain camera $C_i$ (i is an integer equal to or greater than 2), there are $(C_{i-1}, C_i)$ pair and $(C_1, C_{i+1})$ pair, and an optimal depth is decided for each of the camera pairs. Thus, when there are multiple camera pairs, the decision unit 803 decides the optimal depth for camera C, based on optimal depths decided with the respective pairs (for example, $(C_{i-1}, C_1)$ pair and $(C_1, C_{i+1})$ pair). Methods for this include one that decides one of the two optimal depths closer to the virtual viewpoint 82 as the optimal depth for camera C. By performing this processing on all camera pairs, the decision unit 803 can decide the optimal depth for each input image of each camera 93 even when there are multiple camera pairs. The decision unit 803 then stores information on the optimal depth decided for each input image of each camera 93 in the optimal depth storage 804. Subsequently, the image synthesis unit 806 may execute the image synthesis process step, may execute the image synthesis process step at the timing of input of an instruction for synthetic image generation, or may execute the image synthesis process step at another timing.

In selection of a camera pair, a method that prevents presence of two optimal depths for one camera 93, such as selecting $(C_{i-1}, C_i)$ pair and $C_{i+1}, C_{i+2})$ pair, may be adopted.

Twelfth Embodiment

The twelfth embodiment achieves faster processing than the eleventh embodiment. Specifically, the eleventh embodiment performs the contrast computation process for all of N depths, whereas in the twelfth embodiment, the image processing device decides the optimal depth for each input image of a camera pair based on a smaller number of depths than in the eleventh embodiment. More specifically, in the twelfth embodiment, the image processing device creates a new depth candidate group such that the intervals between depths included in the depth candidate group becomes narrower on each iteration of processing, and decides the optimal depth from the depths included in the final depth candidate group at a point when it has been repeated a predetermined number of times. Also, the twelfth embodiment will be described for the case where two cameras 93 (cameras 93-1 and 93-2) are provided in the image processing system 800 as a camera pair, as in the eleventh embodiment.

Figure 54:
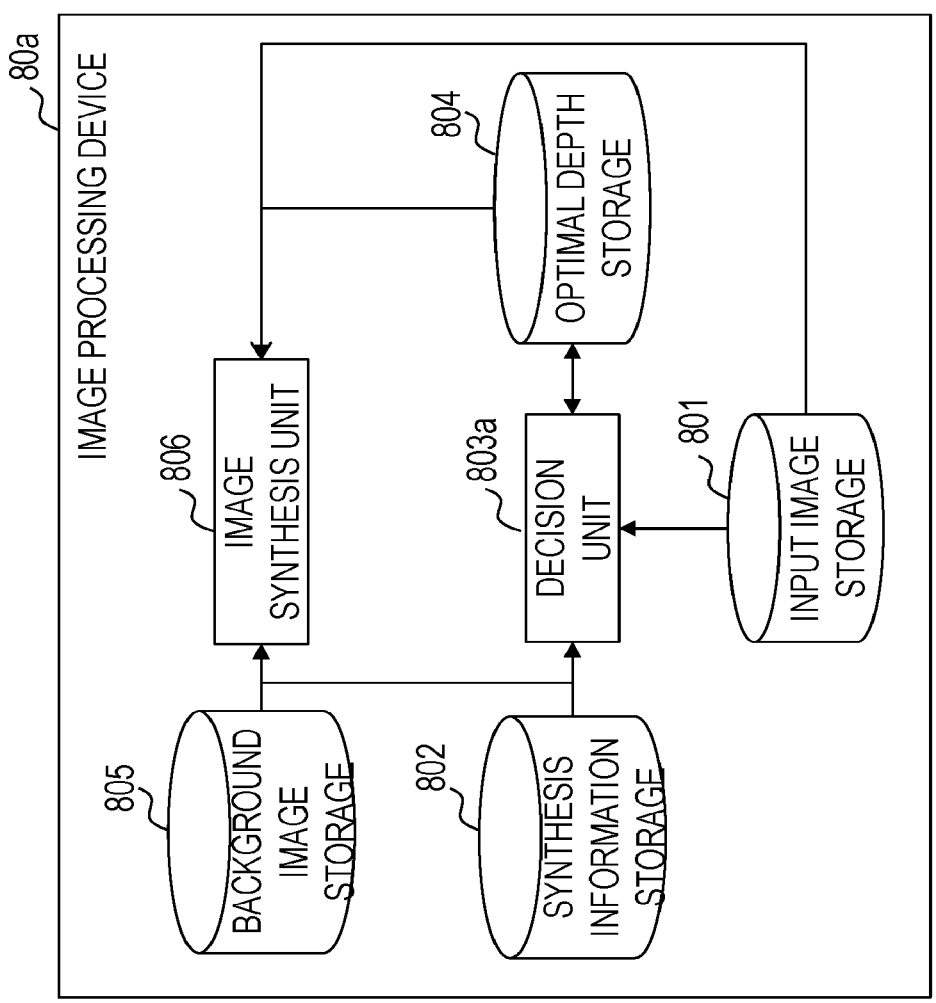
FIG. 54 is a diagram illustrating a functional configuration of an image processing device in a twelfth embodiment.

FIG. 54 is a schematic block diagram representing a functional configuration of an image processing device 80a in the twelfth embodiment. The image processing device 80a has a CPU, memory, and an auxiliary storage device connected by a bus, and executes an image processing program. By executing the image processing program, the image processing device 80a functions as a device including the input image storage 801, the synthesis information storage 802, the decision unit 803a, the optimal depth storage 804, the background image storage 805, and the image synthesis unit 806. All or some of the functions of the image processing device 80a may be implemented with hardware, such as an ASIC, a PLD, or a FPGA. The image processing program may be recorded in a computer-readable recording medium. A computer-readable recording medium is a storage device such as a portable medium like a flexible disk, magneto-optical disk, ROM, or CD-ROM, or a hard disk built in a computer system, for example. The image processing program may also be transmitted and received via a telecommunication line.

The image processing device 80*a* differs from the image processing device 80 in configuration in that it includes a decision unit 803*a* instead of the decision unit 803. For the remaining configuration, the image processing device 80*a* is similar to the image processing device 80. Thus, description on the image processing device 80*a* as a whole is omitted and only the decision unit 803*a* is described.

The decision unit 803*a* takes input images of the camera pair stored in the input image storage 801 and the synthesis information table stored in the synthesis information storage 802 as input. The decision unit 803*a* decides the optimal depth for each input image of each camera 93 based on the input images of the camera pair and the synthesis information table input to it.

Next, specific processing by the decision unit 803*a* is described.

The decision unit 803*a* first selects particular depths (for example, S depths) out of N depths. Here, methods for selecting particular depths include one that selects depths at equal intervals (at intervals of N/S). Hereinafter, such processing for selecting particular depths out of N depths will be described as initial processing. Depths selected in the initial processing are described as initial depth candidate group. The decision unit 803*a* then references the synthesis information table to generate a depth decision synthetic image for each depth included in the initial depth candidate group, and computes the contrast of the generated depth decision synthetic image. Processing relating to generation of depth decision synthetic images and computation of contrast is similar to the eleventh embodiment. By this processing, the decision unit 803*a* generates a depth decision synthetic image and computes a contrast at each depth included in the initial depth candidate group. The decision unit 803*a* then creates a new depth candidate group including the depth with the highest contrast among the computed contrasts. When creating a new depth candidate group, the decision unit 803*a* creates a new depth candidate group from a range centered at the depth with the highest contrast. The range of centering is predefined.

Processing for creating a new depth candidate group including the depth with the highest contrast will be described below. The description here discusses processing for creating a new depth candidate group while showing an example of how to define a range centered at the depth with the highest contrast. As an example, assume that there are five depths (N=5; five depths S1, S2, S3, S4, S5 (S1<S2<S3<S4<S5)).

The decision unit 803*a* selects a predetermined number of depths between the depth with the highest contrast and depths neighboring the depth with the highest contrast. For example, if the depth with the highest contrast is S3, the neighboring depths are S2 and S4. In this manner, the decision unit 803*a* sets the range between depths neighboring the depth with the highest contrast (for example, between S2 and S4) as a "range centered at the depth with the highest contrast". Then, the decision unit 803*a* selects T (T is an integer equal to or greater than 1) depths from the "range centered at the depth with the highest contrast" (for example, between S2 and S4). For example, T depths may be selected at equal intervals from among depths between the depths neighboring the depth with the highest contrast (in the range centered at the depth with the highest contrast) stored in the synthesis information table. Subsequently, the decision unit 803*a* creates a new depth candidate group that includes the depth with the highest contrast (for example, S3) and T depths selected from the depths between the depths neighboring the depth with the highest contrast (for example, between S2 and S4). That is, the decision unit 803*a* creates a new depth candidate group including T+1 depths.

The decision unit 803*a* generates a depth decision synthetic image for each of the depths included in the new depth candidate group created, and computes a contrast of the generated depth decision synthetic image. In doing so, the decision unit 803*a* does not have to perform processing on depths for which contrast is already computed. The decision unit 803*a* performs the above process a predetermined number of times. Then, it decides the depth with the highest contrast in the depth candidate group after the predetermined number of executions as the optimal depth for each input image of the camera pair. The decision unit 803*a* performs the above process on the input images of the camera pair at each time.

Figure 55:
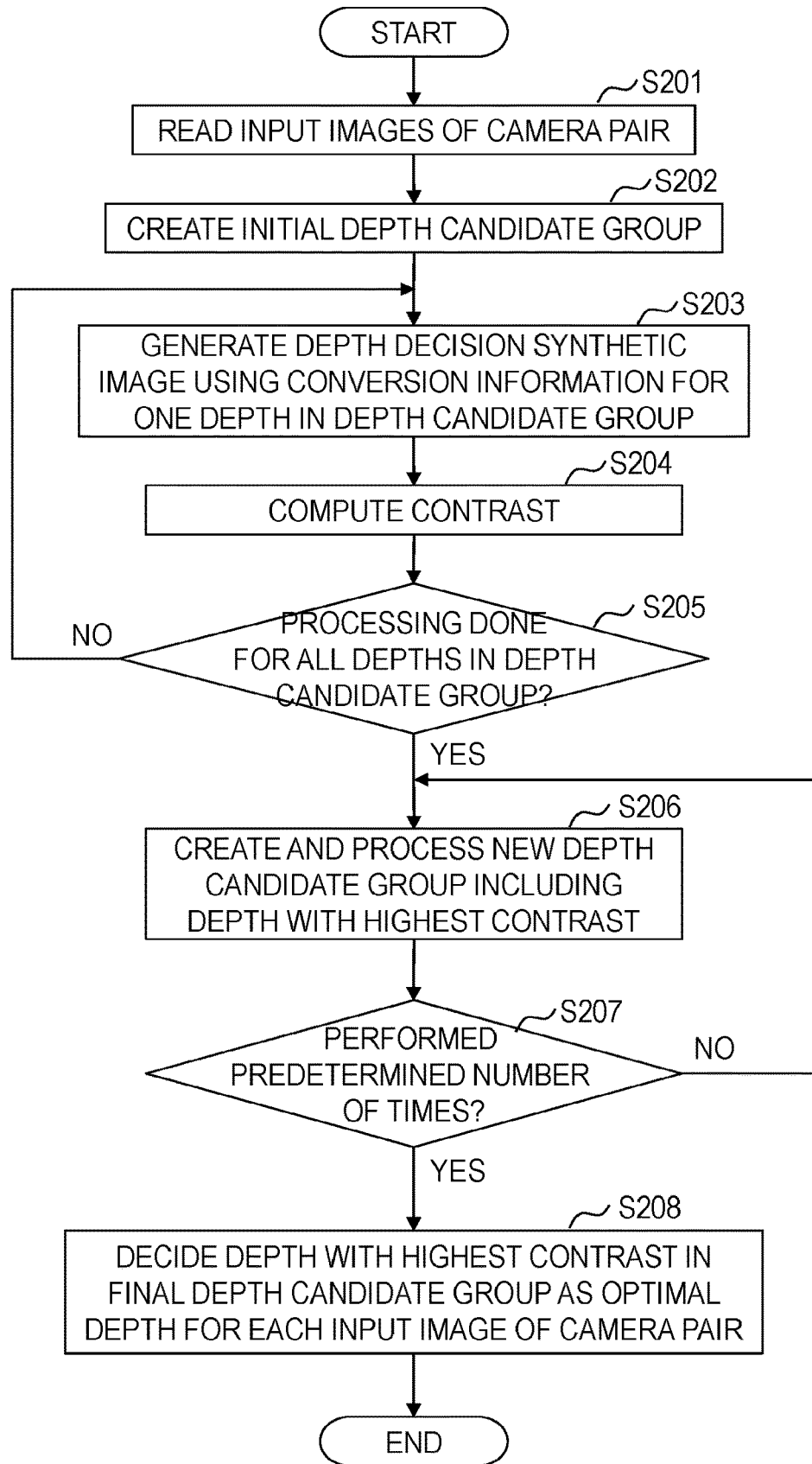
FIG. 55 is a diagram illustrating a processing procedure of the image processing device in the twelfth embodiment.

FIG. 55 is a flowchart showing a flow of processing by the image processing device 80*a*.

The decision unit 803*a* reads input images of the camera pair at an identical time from the input image storage 801 and inputs them (step S201). The decision unit 803*a* then creates an initial depth candidate group by selecting S depths out of N depths (step S202). Specifically, the decision unit 803*a* creates an initial depth candidate group by selecting a particular number of depths from preset multiple depths. The processing for creating the initial depth candidate group is performed only in the initial processing. The decision unit 803*a* generates a depth decision synthetic image using the conversion information for one of the depths included in the depth candidate group based on the input image it read out and the synthesis information table stored in the synthesis information storage 802 (step S203). The decision unit 803*a* computes the contrast of an overlapping region of the generated depth decision synthetic image based on Formula 1 above (step S204). Subsequently, the decision unit 803*a* determines whether the contrast computation process has been performed on all the depths included in the depth candidate group or not (step S205). If the contrast computation process has not been performed on all the depths included in the depth candidate group (step S205: NO), the decision unit 803*a* repeatedly executes the processing at steps S203 and S204 until the contrast computation process has been performed on all the depths included in the depth candidate group.

In contrast, if the contrast computation process has been performed on all the depths included in the depth candidate group (step S205: YES), the decision unit 803*a* creates a new depth candidate group including the depth with the highest contrast in the latest depth candidate group. Selection of depth candidates for creating a new depth candidate group is made in the above-described manner. That is, the decision unit 803*a* creates a new depth candidate group that includes the depth with the highest contrast and T depths that have been selected. Subsequently, the decision unit 803*a* performs processing from step S203 to S205 on each depth included in the new depth candidate group created (step S206). Subsequently, the decision unit 803*a* determines whether the processing at step S206 has been performed a predetermined number of times or not (step S207). If the processing at step S206 has not been performed the predetermined number of times (step S207: NO), the decision unit 803*a* repeatedly executes the processing at step S206 until the predetermined number of times is reached.

In contrast, if the processing at step S206 has been performed the predetermined number of times (step S207: YES), the decision unit 803*a* decides the depth with the highest contrast in the final depth candidate group as the optimal depth for each input image of the camera pair (step S208). Here, the final depth candidate group represents a depth candidate group after the processing at step S206 has been performed the predetermined number of times.

The image processing device 80a configured as described above can provide a similar configuration to the eleventh embodiment.

Also, the image processing device 80a decides optimal depths through estimation based on a smaller number of depths than in the eleventh embodiment. Thus, it enables faster processing than the eleventh embodiment.

Modification of the Twelfth Embodiment

The twelfth embodiment may be modified similarly to the eleventh embodiment.

A coarse-to-fine method or simplex method may be employed as a process to create a new depth candidate group upon each iteration of processing and decide an optimal solution from the new candidate group created (an optimal depth in this embodiment).

While this embodiment showed an example where the processing at step S208 is executed after the processing at step S206 is performed a predetermined number of times, the processing at step S208 may instead be performed when a minimum unit of stored depth candidates has been reached.

While this embodiment showed a configuration that creates a depth candidate group by selecting from depths registered in the synthesis information table, the decision unit 803a may instead be configured to create a depth candidate group so as to include depths other than the depths registered in the synthesis information table. For example, if depth α at a distance of 1 from the virtual viewpoint 82 (depth α=1) and depth β at a distance of 3 from the virtual viewpoint 82 (depth β=3) are registered in the synthesis information table, the decision unit 803a creates a depth candidate group so as to include depth γ at a distance of 2 from the virtual viewpoint 82 (a depth between depth α and depth β, γ=2), namely a depth between the two depths. In this manner, when depths other than the depths registered in the synthesis information table are included in the depth candidate group and used, the decision unit 803a determines conversion information for a depth other than the depths registered in the synthesis information table such as by interpolation from conversion information for a registered depth. For example, assuming that conversion information is an affine transformation matrix and the affine transformation matrix when depth α=1 is $A1_{j1}$, and the affine transformation matrix when depth β=3 is $A1_{j2}$, then the elements of the affine transformation matrix for depth γ between depth α and depth β may be determined by averaging the elements of the $A1_{j1}$ matrix and the elements of the $A1_{j2}$ matrix, for example. This example is only illustrative; the decision unit 803a may also create a depth candidate group so as to include more than one depth as depths between two depths (for example, between depth α and depth β).

The decision unit 803a may also create a new depth candidate group in the following manner. The foregoing example of five depths (N=5; five depths S1, S2, S3, S4, S5) will be discussed as an example.

(First Method)

A first method is to select a predetermined number of depths between the depth with the highest contrast and each of the depths neighboring the depth with the highest contrast, and create a new depth candidate group including the respective sets of predetermined number of selected depths and the depth with the highest contrast. This will be described specifically below.

The decision unit 803a first defines a "range centered at the depth with the highest contrast" as described above. That is, if the depth with the highest contrast is S3, the neighboring depths are S2 and S4, and the range between S2 and S4 is the "range centered at the depth with the highest contrast". Here, the range between the depth with the highest contrast (for example, S3) and one (for example, S2) of the depths neighboring the depth with the highest contrast is defined as a first range, and the range between the depth with the highest contrast and the other (for example, S4) of the depths neighboring the depth with the highest contrast is defined as a second range. The decision unit 803a then selects U (U is an integer equal to or greater than 1) depths in the first range, and selects V (V is an integer equal to or greater than 1) depths in the second range. For example, U depths may be selected at equal intervals from the depths in the first range stored in the synthesis information table. Likewise, V depths may be selected at equal intervals from the depths in the second range stored in the synthesis information table, for example. U and V may be the same value or different values. Subsequently, the decision unit 803a creates a new depth candidate group including the depth with the highest contrast (for example, S3), the U depths selected from the depths in the first range, and the V depths selected from the depths in the second range. That is, the decision unit 803a creates a new depth candidate group including U+V+1 depths.

(Second Method)

A second method is to select a predetermined number of depths between the depth with the highest contrast and one of the depths neighboring the depth with the highest contrast, and create a new depth candidate group including the predetermined number of selected depths and the depth with the highest contrast. This will be described specifically below.

The decision unit 803a first defines a "range centered at the depth with the highest contrast" as described above. That is, if the depth with the highest contrast is S3, the neighboring depths are S2 and S4, and the range between S2 and S4 is the "range centered at the depth with the highest contrast". Here, the range between the depth with the highest contrast (for example, S3) and one (for example, S2) of the depths neighboring the depth with the highest contrast is defined as a third range. The decision unit 803a then selects Z (Z is an integer equal to or greater than 1) depths in the third range. For example, Z depths may be selected at equal intervals from the depths in the third range stored in the synthesis information table. Subsequently, the decision unit 803a creates a new depth candidate group including the depth with the highest contrast (for example, S3) and the Z depths selected from the depths in the third range. That is, the decision unit 803a creates a new depth candidate group including Z+1 depths.

Thirteenth Embodiment

The eleventh and twelfth embodiments described configurations that decide the optimal depth for each input image of each camera 93 at each time. When a synthetic image generated based on optimal depths thus decided (a virtual omnidirectional image) is reproduced as a video, the video can have sense of inconsistency because the optimal depth at each time is different. Thus, in the thirteenth embodiment, the image processing device performs a smoothing process so that the optimal depth for each input image of each camera 93 at each time smoothly changes in time direction. The thirteenth embodiment is described for the case where multiple camera pairs are present in the image processing system 800 as an example.

Figure 56:
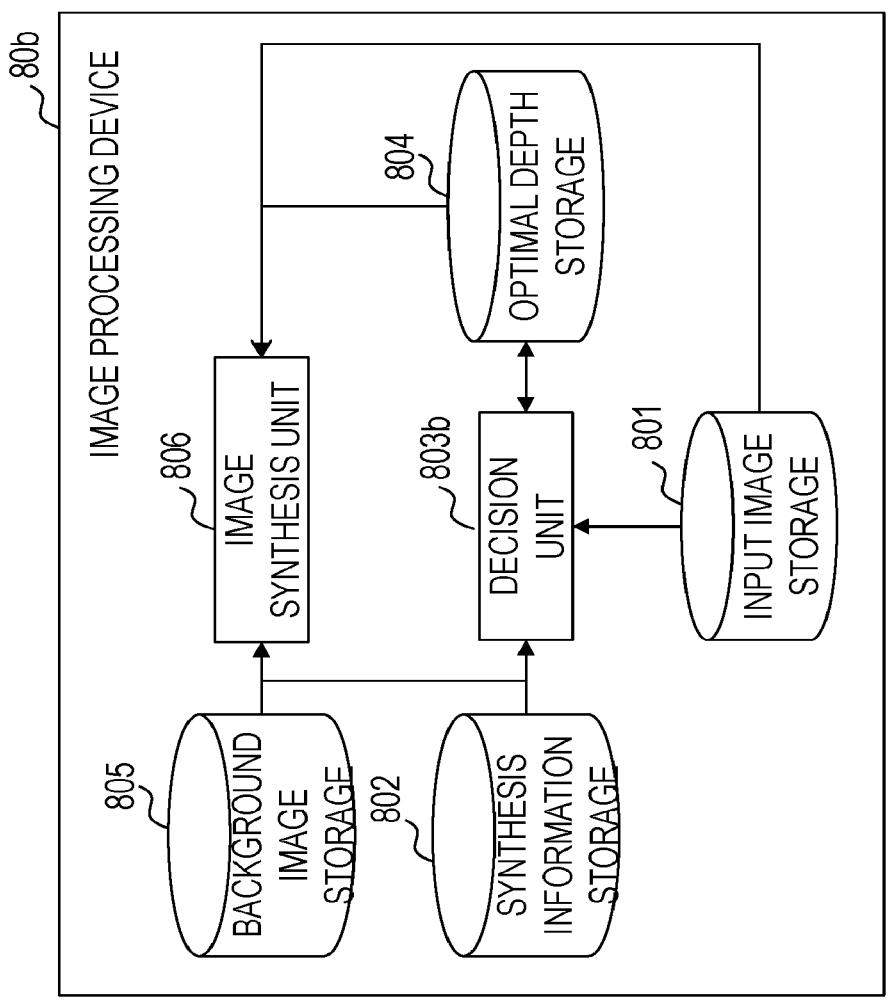
FIG. 56 is a diagram illustrating a functional configuration of an image processing device in a thirteenth embodiment.

FIG. 56 is a schematic block diagram showing a functional configuration of the image processing device 80b in the thirteenth embodiment. The image processing device 80b has a CPU, memory, and an auxiliary storage device connected by a bus, and executes an image processing program. By executing the image processing program, the image processing device 80b functions as a device including the input image storage 801, the synthesis information storage 802, the decision unit 803b, the optimal depth storage 804, the background image storage 805, and the image synthesis unit 806. All or some of the functions of the image processing device 80b may be implemented with hardware, such as an ASIC, a PLD, or a FPGA. The image processing program may be recorded in a computer-readable recording medium. A computer-readable recording medium is a storage device such as a portable medium like a flexible disk, magneto-optical disk, ROM, or CD-ROM, or a hard disk built in a computer system, for example. The image processing program may also be transmitted and received via a telecommunication line.

The image processing device 80b differs from the image processing device 80 in configuration in that it includes a decision unit 803b instead of the decision unit 803. For the remaining configuration, the image processing device 80b is similar to the image processing device 80. Thus, description on the image processing device 80b as a whole is omitted and only the decision unit 803b is described.

The decision unit 803b takes input images of a camera pair stored in the input image storage 801 and the synthesis information table stored in the synthesis information storage 802 as input. The decision unit 803b decides the optimal depth for each input image of each camera 93 by performing similar processing to that by the decision unit 803 of the eleventh embodiment based on the input images of the camera pair and the synthesis information table input to it. The decision unit 803b stores the decided optimal depth in the optimal depth storage 804 as a provisional optimal depth. The decision unit 803b takes the provisional optimal depth stored in the optimal depth storage 804 as input. The decision unit 803b decides the optimal depth for each input image of each camera 93 at each time by smoothing the provisional optimal depth for each camera 93 in the time direction based on the input provisional optimal depth. Specific processing by the decision unit 803b will be described with FIG. 57.

Figure 57:
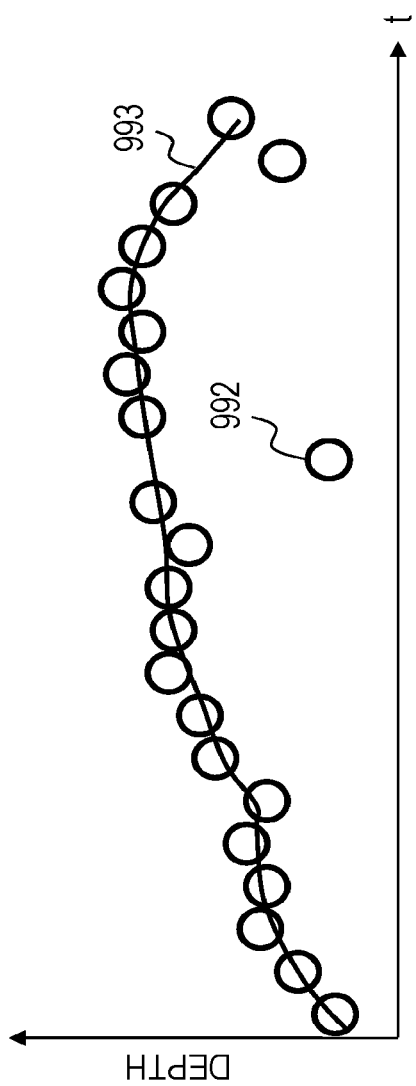
FIG. 57 is a diagram for describing specific processing by a decision unit in the thirteenth embodiment.

FIG. 57 is a diagram for describing the specific processing by the decision unit 803b.

In FIG. 57, the vertical axis represents depth and the horizontal axis represents time. The multiple circles shown in FIG. 57 represent the provisional optimal depths at the individual times. FIG. 57 shows an example of provisional optimal depth at each time for a certain camera 93. Since the provisional optimal depth is decided at each time, there can be a provisional optimal depth that significantly deviates from provisional optimal depths around it, like a circle 992 shown in FIG. 57. In such a case, the resulting video can have sense of inconsistency when reproduced as a video. Accordingly, the decision unit 803b arranges the value of the provisional optimal depth at each time on the time axis and smooths the values so as to be gradual. For example, the decision unit 803b determines an estimated value of an optimal depth from the provisional optimal depth at each time by polynomial approximation such that sense of inconsistency is reduced in reproduction as a video. A line 993 shown in FIG. 57 indicates the estimated value of the optimal depth at each time obtained by polynomial approximation. The decision unit 803b decides the estimated value of the optimal depth at each time obtained by this processing as the optimal depth for a certain camera 93 at each time. The decision unit 803b then updates the optimal depth by overwriting the provisional optimal depth stored in the optimal depth storage 804 with the decided optimal depth.

Figure 58:
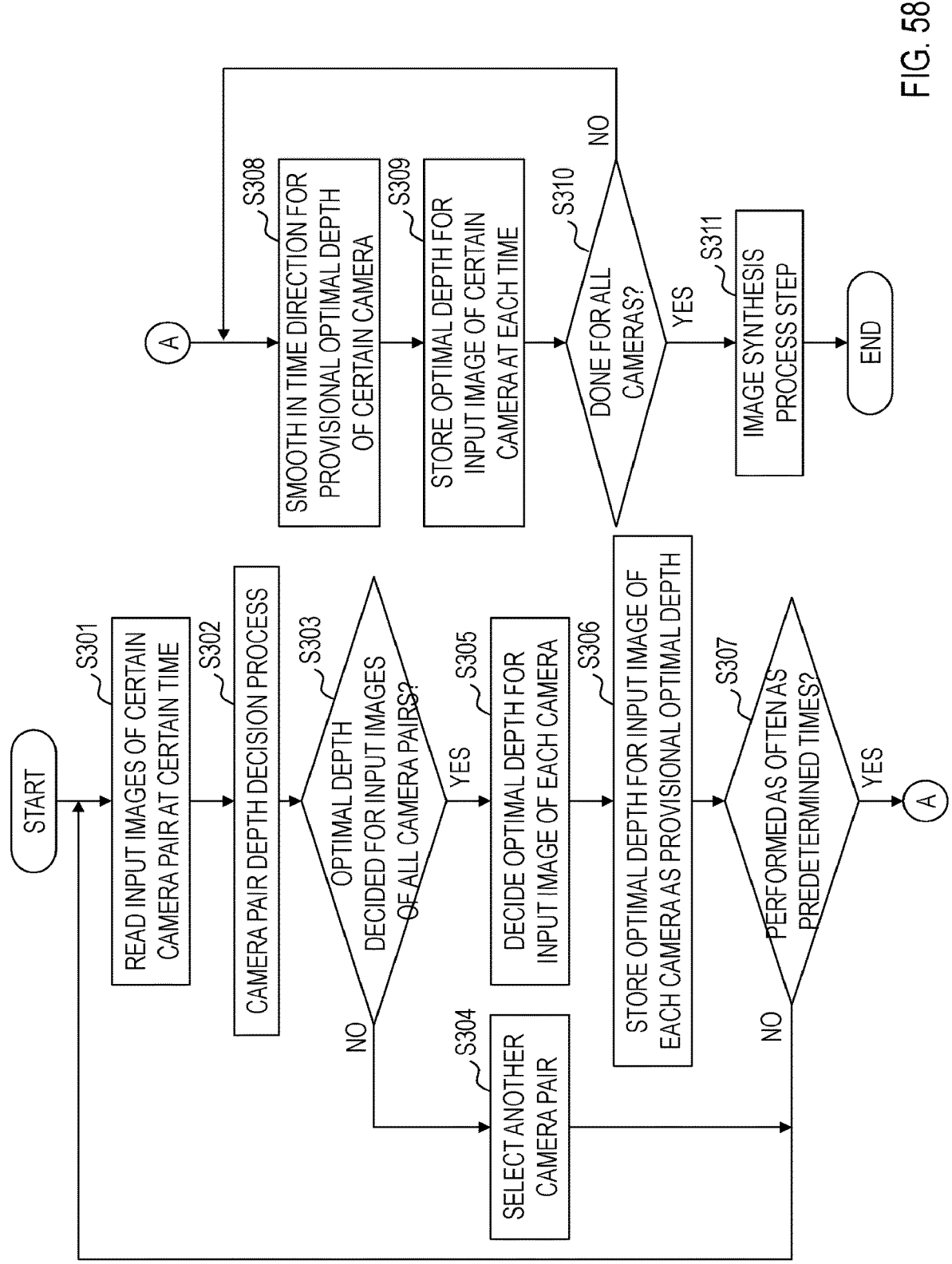
FIG. 58 is a diagram illustrating a processing procedure of the image processing device in the thirteenth embodiment.

FIG. 58 is a flowchart showing a flow of processing by the image processing device 80b.

The decision unit 803b reads input images of a certain camera pair at a certain time from the input image storage 801 (step S301). The decision unit 803b then performs a camera pair depth decision process based on the input image it read out and the synthesis information table stored in the synthesis information storage 802 (step S302). The decision unit 803b determines whether the optimal depths for the input images of all the camera pairs have been decided or not (step S303). If the optimal depths for the input images of all the camera pairs have not been decided (step S303: NO), the decision unit 803b selects another camera pair (step S304). Here, another camera pair to be selected is a camera pair on which the camera pair depth decision process is not performed yet. Subsequently, the decision unit 803b performs processing from step S301 to step S302 on the other camera pair selected.

In contrast, if the optimal depths for the input images of all the camera pairs have been decided (step S303: YES), the decision unit 803b decides the optimal depth for each input image of each camera 93 based on the decided optimal depth for each input image of the camera pair (step S305). Subsequently, the decision unit 803b stores the optimal depth for each input image of each camera 93 decided in the processing at step S305 in the optimal depth storage 804 as a provisional optimal depth (step S306). The decision unit 803b determines whether the processing from step S301 to step S306 has been performed as often as predetermined times or not (step S307). If the processing from step S301 to step S306 has not been performed as often as the predetermined times (step S307: NO), the decision unit 803b repeatedly executes the processing at step S301 onward.

In contrast, if the processing from step S301 to step S306 has been performed as often as the predetermined times (step S307: YES), the decision unit 803b performs smoothing in the time direction for provisional optimal depths corresponding to the predetermined times for a certain camera 93 stored in the optimal depth storage 804 (step S308). For example, the decision unit 803b determines an estimated value of the optimal depth for a certain camera 93 by polynomial approximation from the provisional optimal depths corresponding to the predetermined times. Subsequently, the decision unit 803b stores the estimated value of the optimal depth for the certain camera 93 as the optimal depth for the certain camera 93 at each time in the optimal depth storage 804 (step S309). The decision unit 803b determines whether the processing at step S308 and step S309 has been performed on all the cameras 93 or not (step S310). If the processing at step S308 and step S309 has not been performed on all the cameras 93 (step S310: NO), the decision unit 803b repeatedly executes the processing at step S308 and step S309 until it has been performed on all the cameras.

In contrast, the processing at step S308 and step S309 has been performed on all the cameras 93 (step S310: YES), the image synthesis unit 806 executes an image synthesis process step (step S311).

The image processing device 80b configured as described above can reduce sense of inconsistency that can occur when virtual omnidirectional images respectively generated using input images at each time are output as video. This effect will be described in detail below.

The image processing device 80b performs smoothing using information on the provisional optimal depth at each time so that the optimal depth values at the individual times are gradual. Thus, even if the optimal depth at a certain time significantly deviates from other optimal depths, the image processing device 80b can correct the optimal depth at the significantly deviating time from optimal depths at times around it. Accordingly, it is possible to reduce sense of inconsistency that can occur when virtual omnidirectional images respectively generated using input images at each time are output as a video.

Modification of the Thirteenth Embodiment

The input image storage 801, the synthesis information storage 802, the decision unit 803b, and the optimal depth storage 804 of the image processing device 80b may be configured as an optimal depth decision apparatus.

While this embodiment showed a configuration that decides the optimal depth for each input image of each camera 93 by the decision unit 803b performing similar processing to that by the decision unit 803, the decision unit 803b may also be configured to decide the optimal depth for each input image of each camera 93 by performing similar processing to that by the decision unit 803a.

Fourteenth Embodiment

The fourteenth embodiment describes a case of outputting a virtual omnidirectional image as video in real time. Specifically, the fourteenth embodiment decides the optimal depth for the input image of camera 93 at a certain time t based on the optimal depth at a preceding time (for example, time t-1, t-2). The fourteenth embodiment is also described for the case where multiple camera pairs are present in the image processing system 800 as an example.

Figure 59:
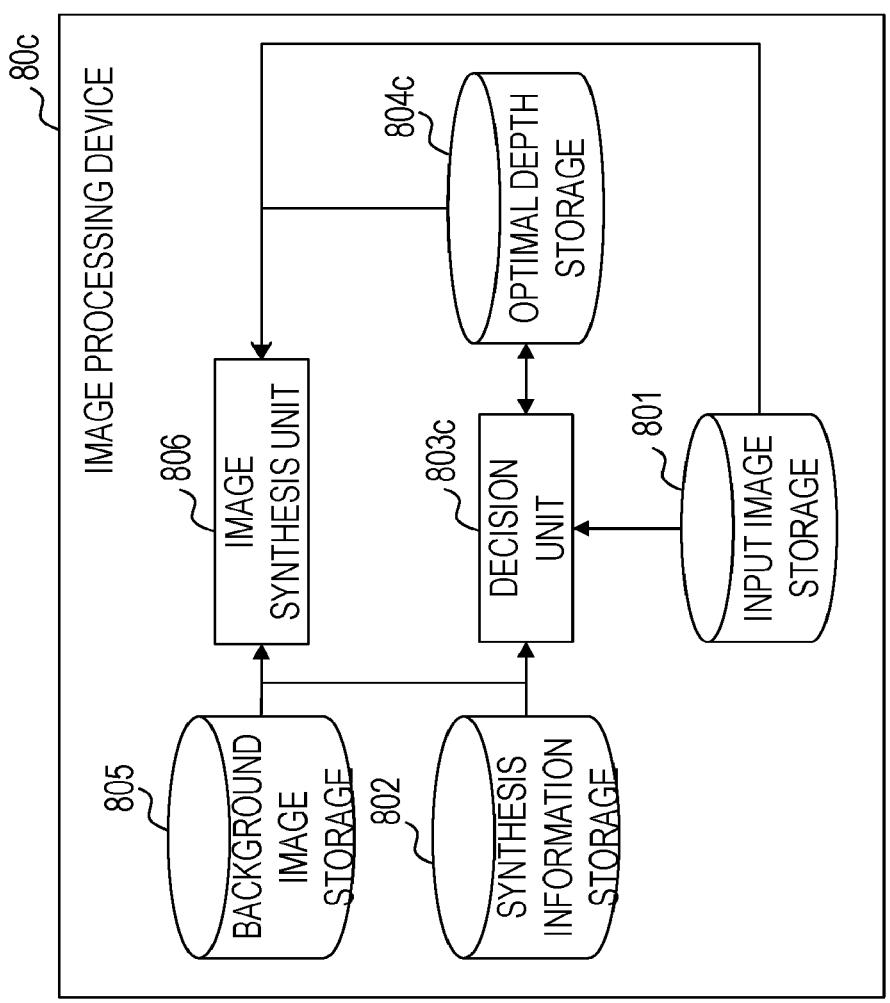
FIG. 59 is a diagram illustrating a functional configuration of an image processing device in a fourteenth embodiment.

FIG. 59 is a schematic block diagram representing a functional configuration of an image processing device 80c in the fourteenth embodiment. The image processing device 80c has a CPU, memory, and an auxiliary storage device connected by a bus, and executes an image processing program. By executing the image processing program, the image processing device 80c functions as a device including the input image storage 801, the synthesis information storage 802, the decision unit 803c, the optimal depth storage 804c, the background image storage 805, and the image synthesis unit 806. All or some of the functions of the image processing device 80c may be implemented with hardware, such as an ASIC, a PLD, or a FPGA. The image processing program may be recorded in a computer-readable recording medium. A computer-readable recording medium is a storage device such as a portable medium like a flexible disk, magneto-optical disk, ROM, or CD-ROM, or a hard disk built in a computer system, for example. The image processing program may also be transmitted and received via a telecommunication line.

The image processing device 80c differs from the image processing device 80 in configuration in that it includes a decision unit 803c and an optimal depth storage 804c instead of the decision unit 803 and the optimal depth storage 804. For the remaining configuration, the image processing device 80c is similar to the image processing device 80. Thus, description on the image processing device 80c as a whole is omitted and only the decision unit 803c and the optimal depth storage 804c are described.

The optimal depth storage 804c is configured with a storage device such as a magnetic hard disk device or a semiconductor storage device. The optimal depth storage 804c stores an optimal depth information table. In the optimal depth information table stored by the optimal depth storage 804 in the eleventh to thirteenth embodiments, optimal depth information for each input image of each camera 93 at each time is registered. In contrast, in the optimal depth information table stored by the optimal depth storage 804c in the fourteenth embodiment, optimal depth information for each input image of each camera 93 at the present time (for example, a time when a virtual omnidirectional image for real-time output is generated) t is not registered (stored) at the start of processing, but optimal depth information for each input image of each camera 93 at a time earlier than the present time t (for example, time t-1, t-2, and the like) is registered (stored).

The decision unit 803c takes the input images of a camera pair stored in the input image storage 801 and the synthesis information table stored in the synthesis information storage 802 as input. The decision unit 803b decides the optimal depth for each input image of each camera 93 by performing similar processing to that by the decision unit 803 of the eleventh embodiment based on the input images of the camera pair and the synthesis information table input to it. The decision unit 803c also decides the optimal depth at the present time t based on optimal depth information at a time earlier than the present time t (for example, time t-1, t-2, and the like). As a method for decision based on optimal depth information at a time earlier than the present time t, the fourteenth embodiment describes an implementation method with a particle filter, a kind of time series filter. Assume that the number of particles to be created in the following processing is P.

Figure 60:
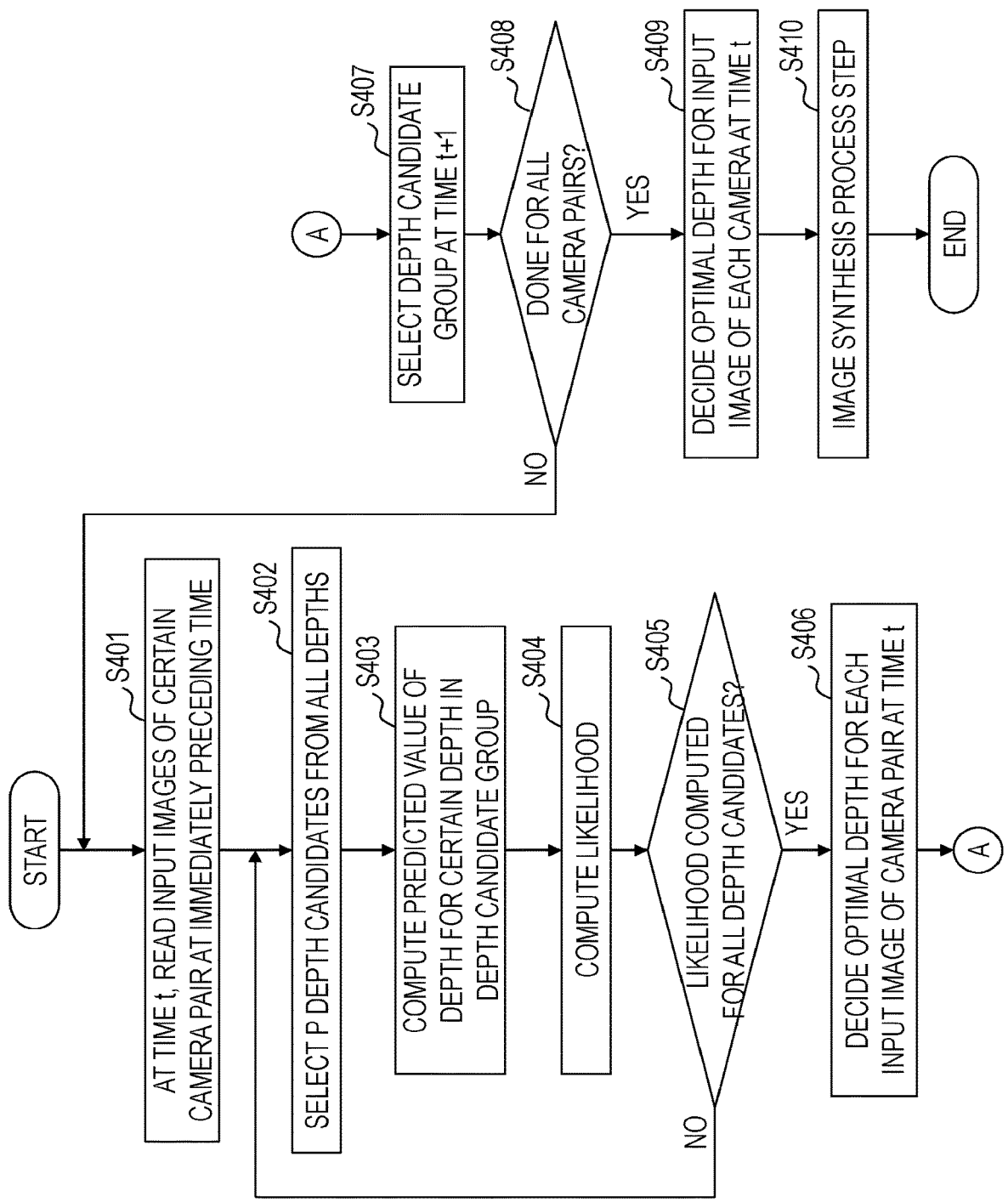
FIG. 60 is a diagram illustrating a processing procedure of the image processing device in the fourteenth embodiment.

FIG. 60 is a flowchart showing a flow of processing by the image processing device 80c.

The decision unit 803c reads input images of the camera pair that were captured at time t from the input image storage 801 (step S401). At the start of processing, time t is an initial time. Although the initial time is typically set to the first time among all times, the idea of time-series filtering introduced herein can converge to an undesirable value as a result of error accumulation (which is called drift). In such a case, time t+1 may be set as the initial time when an appropriate condition is satisfied, for example, when maximum likelihood has become equal to or smaller than a threshold at time t.

For the input image which has been read out, the decision unit 803c selects P depth candidates from all depths (for example, depth 1 to depth N) (step S402). A method for selecting P depths from all depths at the initial time may be randomly selecting P depths, or dividing all the depths equally into P groups and selecting P depths. At times other than the initial time, basically the depth candidate group selected at the preceding time may be used. The decision unit 803c computes a predicted value of depth using a prediction model for a depth in the depth candidate group (step S403). Prediction models include uniform linear motion, uniform acceleration motion, and random walk (this is a step equivalent to the "prediction" of a common particle filter).

Subsequently, the decision unit 803c computes a likelihood for the predicted value of depth computed in the processing at step S303 (step S404). A method for determining a likelihood may be a contrast with respect to an overlapping region of a depth decision synthetic image generated based on synthesis information corresponding to a certain depth. In this case, it is assumed that the higher the contrast, the greater the likelihood will be (this is a step equivalent to "weighting" of a common particle filter). The decision unit 803c determines whether likelihood has been computed for all depth candidates or not (step S405). If likelihood has not been computed for all depth candidates or not (step S405: NO), the decision unit 803c repeatedly executes the processing at steps S402 to S404 until likelihood has been computed for all depth candidates.

In contrast, if likelihood has been computed for all depth candidates (step S405: YES), the decision unit 803c decides the optimal depth for each input image of the camera pair at time t based on the likelihood computed in the processing at step S404 (step S406). Methods for determining an optimal depth include one that determines the depth with the highest likelihood as the optimal depth, or one that sets a weighted average of likelihoods as the optimal depth (this is a step equivalent to the "state estimation" of a common particle filter). The decision unit 803c then selects a depth candidate group at time t+1 based on the likelihood computed in the processing at step S404 (step S407). A method for selecting a depth candidate group at time t+1 based on likelihood is one that employs the magnitude of likelihood. Specifically, for each depth, the number of candidates to be selected around that depth is varied based on the magnitude of likelihood. For example, few candidates are selected near a depth with low likelihood, while a large number of candidates are selected near a depth with high likelihood. The selection is made so that the total number of candidates is P (this is a step equivalent to the "resampling" of a common particle filter).

The decision unit 803c determines whether the processing at step S401 to step 407 has been performed on all the camera pairs or not (step S408). If the processing at step S401 to step 407 has not been performed on all the camera pairs (step S408: NO), the decision unit 803c performs processing at step 401 onward on all the camera pairs.

In contrast, if the processing at step S401 to step 407 has been performed on all the camera pairs (step S408: YES), the decision unit 803c decides the optimal depth for each input image of each camera 93 from the optimal depth for each input image of the camera pair at time t (step S409). Subsequently, the decision unit 803c stores the optimal depth for each input image of each camera 93 at time t in the optimal depth storage 804c. Subsequently, the image synthesis unit 806 executes the image synthesis process step (step S410).

The image processing device 80c configured as described above can decide the optimal depth for an input image of each camera 93 in real time. This effect will be described in detail below.

The image processing device 80c estimates an optimal depth for the input image of each camera 93 at time t from the optimal depth for the input image at a past time (for example, the immediately preceding time). Specifically, the image processing device 80c first computes a predicted value of depth using a prediction model for a depth included in the depth candidate group for deciding the depth for each input image of the camera pair at time t. The image processing device 80c then computes the likelihood of the computed predicted value of depth. Then, the image processing device 80c decides the optimal depth for the input images of the camera pair at time t based on the computed likelihood. Subsequently, the image processing device 80c performs similar processing on the input images of all the camera pairs. Accordingly, the optimal depth for an input image of each camera 93 can be decided in real time.

Modification of the Fourteenth Embodiment

The input image storage 801, the synthesis information storage 802, the decision unit 803c, and the optimal depth storage 804c of the image processing device 80c may be configured as an optimal depth decision apparatus.

In the following, modifications common to the eleventh to fourteenth embodiments are described.

These embodiments are applicable to generation of a synthetic image by overlaying of images captured by multiple cameras 93 on a background image, in addition to an omnidirectional image.

Although in these embodiments the values of width registered in the synthesis information table are the same for all camera IDs, the value of width may be different from one camera ID to another or different for some camera IDs.

The decision unit 803 may also decide the optimal depth for each predetermined region of one input image.

The eleventh to fourteenth embodiments make it possible to decide the optimal depth for an image captured by each of multiple image capturing devices.

While the embodiments of the present invention have been described, specific configurations are not limited to these embodiments, but design modifications and the like within a range not departing from the spirit of the invention are encompassed in the scope of the invention, of course. The various processes described in the embodiments may be executed in parallel or separately depending on the processing ability of an apparatus executing the process or on any necessity, rather than being executed in time series in accordance with the described order.

[Program and Recording Medium]

When various types of processing functions in the devices described in the above embodiment are implemented on a computer, the contents of processing function to be contained in each device is written by a program. With this program executed on the computer, various types of processing functions in the above-described devices are implemented on the computer.

This program in which the contents of processing are written can be recorded in a computer-readable recording medium. The computer-readable recording medium may be any medium such as a magnetic recording device, an optical disc, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage of a server computer and transferred from the server computer to other computers via a network so as to be distributed.

A computer which executes such program first stores the program recorded in a portable recording medium or transferred from a server computer once in a storage device thereof, for example. When the processing is performed, the computer reads out the program stored in the recording medium thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program according to the present embodiment includes information which is provided for processing performed by electronic calculation equipment and which is equivalent to a program (such as data which is not a direct instruction to the computer but has a property specifying the processing performed by the computer).

In the present embodiment, the present device is configured with a predetermined program executed on a computer. However, the present device may be configured with at least part of these processing contents realized in a hardware manner.

What is claimed is:

1. A virtual reality system that includes a virtual environment construction apparatus that constructs a virtual environment to be used for generating a video based on a real environment in which a plurality of objects are present, the virtual reality system comprising:
    the virtual environment construction apparatus which includes circuitry configured to
    for at least one of the plurality of objects as a target object, decide a model construction method indicating whether a model of the object is constructed with computer graphics (CG) or with a live-action video based on at least one of a sensing difficulty level and a CG drawing difficulty level of the target object,
    measure a state of the target object in the real environment,
    construct an environment model for drawing in the virtual environment in accordance with the model construction method for a static object which does not involve temporal change, and
    construct a model for drawing in the virtual environment in accordance with the model construction method for a dynamic object which involves temporal change, and synthesizes the model with the environment model; and
    a virtual reality head mounted display which presents a video to the user based on the synthesized model constructed by the virtual environment construction apparatus.

2. A non-transitory computer readable recording medium on which a program recorded thereon for causing a computer to function as the virtual environment construction apparatus according to claim 1.

3. The virtual environment construction apparatus according to claim 1, wherein
    when SE is the sensing difficulty level, CM is the CG drawing difficulty level, θmax is a discrepancy between an angle of observation and an angle of viewing, th is a predefined threshold, and α, β, and γ are predefined parameters, the model construction method decision unit decides the model construction method based on a formula $\gamma \theta max/(\alpha SE*\beta CM) > th$.

4. The virtual environment construction apparatus according to claim 3, wherein
    if a dynamic object whose model is constructed with CG has been pictured on an object whose model is constructed with live-action video, the dynamic object construction unit uses the live-action video modified so as not to contain the dynamic object instead of the live-action video, for a region of the live-action video where the dynamic object has been pictured.

5. A non-transitory computer readable recording medium on which a program recorded thereon for causing a computer to function as the virtual environment construction apparatus according to claim 4.

6. A non-transitory computer readable recording medium on which a program recorded thereon for causing a computer to function as the virtual environment construction apparatus according to claim 3.

7. The virtual environment construction apparatus according to claim 1, wherein
    if a dynamic object whose model is constructed with CG has been pictured on an object whose model is constructed with live-action video, the dynamic object construction unit uses the live-action video modified so as not to contain the dynamic object instead of the live-action video, for a region of the live-action video where the dynamic object has been pictured.

8. A non-transitory computer readable recording medium on which a program recorded thereon for causing a computer to function as the virtual environment construction apparatus according to claim 7.

9. A virtual environment construction method for constructing a virtual environment for viewing by a user based on a real environment in which a plurality of objects are present, the virtual environment construction method comprising:
    for at least one of the plurality of objects as a target object, deciding a model construction method indicating whether a model of the object is constructed with computer graphics (CG) or with a live-action video based on at least one of a sensing difficulty level and a CG drawing difficulty level of the target object by processing circuitry of a virtual environment construction apparatus;
    measuring a state of the target object in the real environment by the processing circuitry of the virtual environment construction apparatus;
    constructing an environment model for drawing in the virtual environment in accordance with the model construction method for a static object which does not involve temporal change by the processing circuitry of the virtual environment construction apparatus; and
    constructing a model for drawing in the virtual environment in accordance with the model construction method for a dynamic object which involves temporal change, and synthesizing the model with the environment model, by the processing circuitry of the virtual environment construction apparatus
    presenting a video to the user based on the synthesized model, by a virtual reality head mounted display.

* * * * *